United States Patent
Li et al.

(10) Patent No.: US 11,936,476 B2
(45) Date of Patent: Mar. 19, 2024

(54) DATA PROCESSING METHOD, APPARATUS, AND DEVICE

(71) Applicant: Huawei Technologies Co., Ltd., Shenzhen (CN)

(72) Inventors: Bin Li, Shenzhen (CN); Jiaqi Gu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/046,255

(22) Filed: Oct. 13, 2022

(65) Prior Publication Data

US 2023/0113300 A1 Apr. 13, 2023

Related U.S. Application Data

(63) Continuation of application No. PCT/CN2021/082192, filed on Mar. 22, 2021.

(30) Foreign Application Priority Data

Apr. 14, 2020 (CN) .......................... 202010291987.2

(51) Int. Cl.
- *H04L 1/00* (2006.01)
- *H04L 1/1607* (2023.01)
- *H04L 5/00* (2006.01)

(52) U.S. Cl.
CPC .......... *H04L 1/0057* (2013.01); *H04L 1/1621* (2013.01); *H04L 5/0046* (2013.01)

(58) Field of Classification Search
CPC ... H04L 1/0057; H04L 1/1621; H04L 5/0046; H04L 1/1893; H04L 1/00; H04L 1/1812; H04L 1/0045
See application file for complete search history.

(56) References Cited

U.S. PATENT DOCUMENTS

| 2018/0199359 A1* | 7/2018 | Cao | H04L 1/1896 |
| 2023/0030044 A1* | 2/2023 | Li | H04L 1/0048 |

* cited by examiner

*Primary Examiner* — Thien Nguyen
(74) *Attorney, Agent, or Firm* — Slater Matsil, LLP

(57) ABSTRACT

Embodiments of this application disclose a data processing method, an apparatus, and a device. The data processing method may be performed by a first communication device, and the first communication device is a transmit end of encoded data. During each time of transmission, the first communication device places information bits into code blocks according to a specified order.

20 Claims, 25 Drawing Sheets

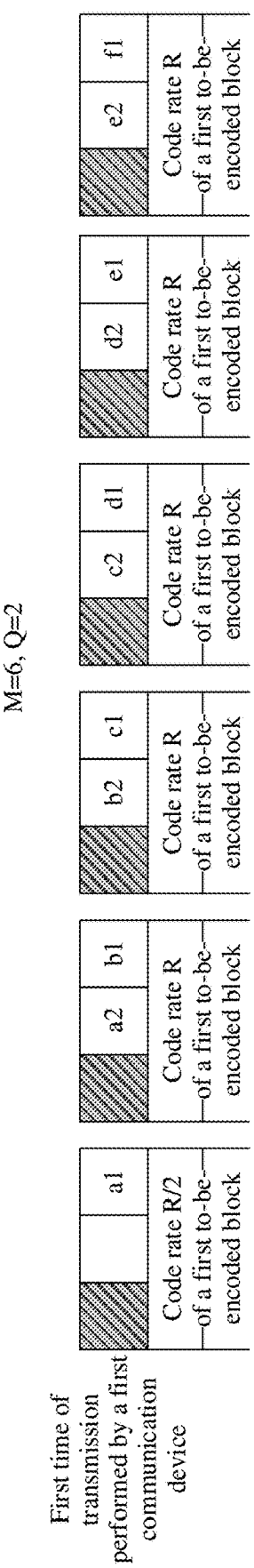
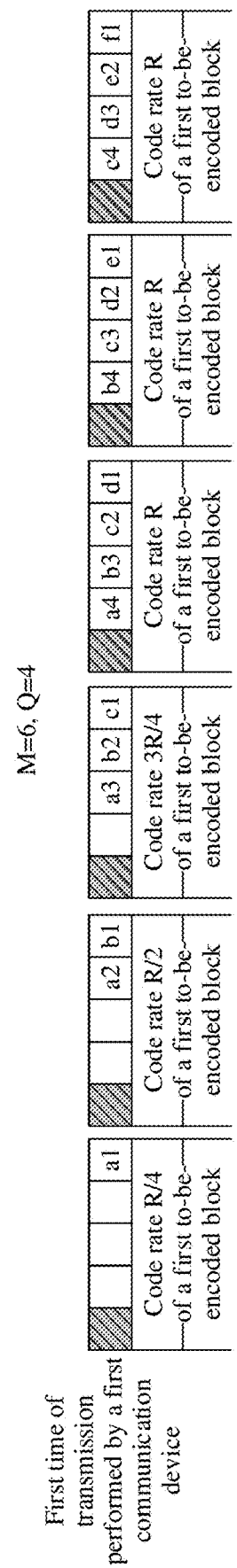
FIG. 7c
FIG. 7d

DATA PROCESSING METHOD, APPARATUS, AND DEVICE

CROSS-REFERENCE TO RELATED APPLICATIONS

This application is a continuation of International Application No. PCT/CN2021/082192, filed on Mar. 22, 2021, which claims priority to Chinese Patent Application No. 202010291987.2, filed on Apr. 14, 2020. The disclosures of the aforementioned applications are hereby incorporated by reference in their entireties.

TECHNICAL FIELD

This application relates to the field of communications technologies, and in particular, to a data processing method, an apparatus, and a device.

BACKGROUND

In a communication system, because a wireless channel has a problem of signal fading, a receive end of a radio signal may fail to correctly decode received information, and therefore cannot obtain accurate information. A hybrid automatic repeat request (HARQ) technology is a technology formed by combining forward error correction (FEC) encoding and an automatic repeat request (ARQ). A working principle of a conventional HARQ is as follows: When a receive end cannot correctly decode received information, the receive end retains received data, and requires a transmit end to resend previously transmitted information. After receiving the retransmitted information, the receive end combines the retransmitted information and the previously received information, and then decodes the combined information. It can be learned that, to correctly decode all bits sent by the transmit end, the receive end may need to perform a plurality of times of retransmission. However, the conventional HARQ has a low transmission efficiency due to the plurality of times of retransmission.

SUMMARY

Embodiments of this application provide a data processing method, an apparatus, and a device. According to the data processing method, transmission close to a channel capacity can be implemented provided that the method meets a condition in which a sum of channel capacities of a plurality of times of transmission is greater than or equal to an information transmission rate.

According to a first aspect, an embodiment of this application provides a data processing method, and the method may be performed by a first communication device. The first communication device may be a transmit end of encoded data. The first communication device may obtain X information bit blocks, where one information bit block includes K information bits, and one information bit block is divided into Q information bit subblocks. One information bit subblock is a binary sequence whose length is $K/Q$. The first communication device places Q information bit subblocks of each information bit block into Q first to-be-encoded blocks in M first to-be-encoded blocks according to a first order. The first order is that a $q^{th}$ information bit subblock of each information bit block is located at $((q-1)*K/Q+1)^{th}$ to $(q*K/Q)^{th}$ reliable positions of the first to-be-encoded blocks, q meets $1 \le q \le Q$, and M meets $M=X+Q-1$. The first communication device separately performs polar code encoding on the M first to-be-encoded blocks to obtain M first code blocks, and send the M first code blocks to a second communication device.

When retransmission is required, the first communication device places the Q information bit subblocks of each information bit block into Q second to-be-encoded blocks in M second to-be-encoded blocks according to a second order, where the second order and the first order meet a mapping relationship; The first communication device separately performs polar code encoding on the M second to-be-encoded blocks to obtain M second code blocks, and send the M second code blocks to the second communication device.

It can be learned that when the first communication device initially transmits the M first code blocks to the second communication device, a plurality of information bit subblocks in the M first code blocks are arranged according to the first order. This helps the second communication device correctly perform decoding. If the second communication device fails in decoding, the first communication device may retransmit the M second code blocks to the second communication device. A plurality of information bit subblocks in the M second code blocks are arranged according to the second order, and the second order and the first order meet the mapping relationship. This helps the second communication device correctly perform decoding based on the first code block and the second code block. The first communication device can implement transmission close to a channel capacity provided that the device meets a condition that a sum of channel capacities of a plurality of times of transmission is greater than or equal to an information transmission rate.

In a possible design, the second order is that the $q^{th}$ information bit subblock of each information bit block is located at $((Q-q)*K/Q+1)^{th}$ to $((Q-q+1)*K/Q)^{th}$ reliable positions of the second to-be-encoded blocks. It can be learned that for information bit subblocks in each information bit block, the second order is a reverse order of the first order. Information bit subblocks in the second to-be-encoded block are arranged according to the second order. This helps the second communication device correctly perform decoding.

In a possible design, the first order and the second order meet the following mapping relationship:

$$[A_1, A_2, \ldots, A_{2^P}] = [0, 0, \ldots, 0, a_1, a_2, \ldots, a_Q] F^{\otimes (J+P)},$$

where $a_q$ is any information bit subblock in Q information bit subblocks of any information bit block, $A_t$ is an information bit subblock corresponding to any mapped information bit subblock, F is a generator matrix of a polar code, J is a positive integer and meets $K/Q=2^J$, P is a positive integer and meets $2^{P-1} \le Q \le 2^P$, and t meets $1 \le t \le 2^P$.

It can be learned that for sorting of information bit subblocks in each information bit block, the second order is obtained by mapping the first order based on the mapping relationship. The mapping relationship may be obtained by mapping the first order based on the generator matrix of the polar code. This helps the second communication device correctly perform decoding.

In a possible design, when retransmission is required, the first communication device places the Q information bit subblocks of each information bit block into Q third to-be-encoded blocks in M third to-be-encoded blocks according to a second order. The second order used in the third to-be-encoded blocks is different from the second order used in the second to-be-encoded blocks. The first communication device separately performs polar code encoding on the M third to-be-encoded blocks to obtain M third code blocks, and sends the M third code blocks to the second communication device.

It can be learned that when the first communication device retransmits the M third code blocks again, a plurality of information bit subblocks in the M third code blocks may also be arranged according to the second order. This helps the second communication device correctly perform decoding based on the first code block, the second code block, and the third code block.

In a possible design, when retransmission is required, the first communication device maps the Q information bit subblocks of each information bit block from a binary field to a $2^w$ number system field, and obtains any mapped information bit block $[\bar{a}_1, \bar{a}_2, \ldots, \bar{a}_Q]$, where $\bar{a}_q$ is any information bit subblock in the any mapped information bit block, $\bar{a}_q$ is a $2^w$ number system sequence whose length is K/wQ, and w is a positive integer greater than 1.

The first communication device converts Q information bit subblocks of each mapped information bit block, where Q information bit subblocks of the any mapped information bit block and the converted corresponding Q information bit subblocks meet the following relationship:

$$[\bar{A}_{n,1}, \bar{A}_{n,2}, \ldots, \bar{A}_{n,Q}] = [\bar{a}_1, \bar{a}_2, \ldots, \bar{a}_Q] * H_n, \text{ where}$$

$\bar{A}_{n,q}$ is a corresponding information bit subblock after $\bar{a}_q$ is converted, $H_n$ is a universal decoding matrix UDM of K/w×K/w in the $2^w$ number system field, and n indicates an $n^{th}$ time of transmission, n meets $n \in [1, 2, \ldots, N]$, is a total quantity of time of transmission performed by the first communication device, and N is a positive integer greater than 3.

The first communication device performs reverse mapping on $[\bar{A}_{n,1}, \bar{A}_{n,2}, \ldots, \bar{A}_{n,Q}]$ to obtain a corresponding information bit block $[A_{n,1}, A_{n,2}, \ldots, A_{n,Q}]$ after $[\bar{A}_{n,1}, \bar{A}_{n,2}, \ldots, \bar{A}_{n,Q}]$ is reversely mapped, where $A_{n,Q}$ is a binary sequence whose length is K/Q.

The first communication device places Q information bit subblocks of any reversely-mapped information bit block into M $n^{th}$ to-be-encoded blocks according to the first order.

The first communication device separately performs polar code encoding on the M $n^{th}$ to-be-encoded blocks to obtain M $n^{th}$ code blocks, and send the M $n^{th}$ code blocks to the second communication device.

It can be learned that when a quantity of times of transmission performed by the first communication device exceeds three, because three or more times of retransmission are performed in a multi-number system field, the first communication device needs to perform corresponding processing on a plurality of information bit subblocks in the M $n^{th}$ to-be-encoded blocks, and then encode the M $n^{th}$ to-be-encoded blocks.

In a possible design, any one of code blocks carries at least one information bit subblock and at most Q information bit subblocks, and the code blocks includes the first code block and the second code block.

In a possible design, the code blocks are sequentially arranged based on identifiers of the code blocks, and a first code block carries one information bit subblock. Quantities of information bit blocks carried in a first code block to a $Q^{th}$ code block successively increase by one based on an arrangement order of the code blocks, and the $Q^{th}$ code block carries Q information bit subblocks. Quantities of information bit subblocks carried in a $(Q+1)^{th}$ code block to an $M^{th}$ code block successively decrease by one based on the arrangement order of the code blocks, and the $M^{th}$ code block carries one information bit subblock.

It can be learned that when a code ` rate loss is not considered, the quantities of the information bit subblocks carried in the code block successively increases from 1 to Q, and then successively decreases from Q to 1. In this arrangement manner, the M code blocks may carry the complete X information bit blocks.

In a possible design, Q is a quantization order of a code rate R, and Q is a positive integer. A code rate of an $i^{th}$ code block is $r_i = i \times R/Q$, where i meets $1 \leq i \leq Q$. A code rate of a $j^{th}$ code block is $r_j = (M-j+1) \times R/Q$, where j meets $Q+1 \leq j \leq M$. It can be learned that when a code rate loss is not considered, the code rate of the code block gradually increases from R/Q to R, and then gradually decreases from R to R/Q.

According to a second aspect, an embodiment of this application provides a data processing method, and the method may be performed by a second communication device. The second communication device may be a receive end of encoded data. The second communication device receives M first code blocks initially transmitted by a first communication device, where the M first code blocks are obtained through polar code encoding on M first to-be-encoded blocks. The M first to-be-encoded blocks carry X information bit blocks, and each information bit block is divided into Q information bit subblocks. The Q information bit subblocks of each information bit block are placed into Q first to-be-encoded blocks in the M first to-be-encoded blocks according to a first order. The first order is that a $q^{th}$ information bit subblock of each information bit block is located at $((q-1)*K/Q+1)^{th}$ to $(q*K/Q)^{th}$ reliable positions of the first to-be-encoded blocks, q meets $1 \leq q \leq Q$, and M meets M=X+Q−1.

The second communication device receives M second code blocks retransmitted by the first communication device again, where the M second code blocks are obtained through polar code encoding on M second to-be-encoded blocks. The Q information bit subblocks of each information bit block are placed into Q second to-be-encoded blocks in the M second to-be-encoded blocks according to a second order, and the second order and the first order meet a mapping relationship. The second communication device may combine and decode the M first code blocks and the M second code blocks to obtain decoded data.

It can be learned that when the second communication device receives the M first code blocks initially transmitted by the first communication device, a plurality of information bit subblocks in the M first code blocks are arranged according to the first order. This helps the second communication device correctly perform decoding. If the second communication device fails in decoding, the second communication device may receive the M second code blocks initially transmitted by the first communication device. A plurality of information bit subblocks in the M second code blocks are arranged according to the second order, and the second order and the first order meet the mapping relationship. This helps the second communication device correctly perform decoding based on the first code block and the second code block.

In a possible design, the second order is that the $q^{th}$ information bit subblock of each information bit block is located at $((Q-q)*K/Q+1)^{th}$ to $(Q-q+1)*K/Q)^{th}$ reliable positions of the second to-be-encoded blocks.

In a possible design, the first order and the second order meet the following mapping relationship:

$$[A_1, A_2, \ldots, A_{2^P}] = [0, 0, \ldots, 0, a_1, a_2, \ldots, a_Q] F^{\otimes (J+P)},$$
where $a_q$ is any information bit subblock in Q information bit subblocks of any information bit block, $A_t$ is an information bit subblock corresponding to any mapped information bit subblock, F is a generator matrix of a polar code, J is a positive integer and meets $K/Q=2^J$, P is a positive integer and meets $2^{P-1} \leq Q \leq 2^P$, and t meets $1 \leq t \leq 2^P$.

In a possible design, that the second communication device combines and decodes the M first code blocks and the M second code blocks to obtain the decoded data includes:

if a sum of channel capacities of two times of transmission performed by the first communication device is greater than or equal to a code rate R, the second communication device obtains, through decoding, $k_1$ information bit subblocks $[a_1, a_2, \ldots, a_{k_1}]$ included in one information bit block carried in the first to-be-encoded block, where $k_1$ meets $1 \leq k_1 \leq Q$;

the second communication device obtains, through decoding, $k_2$ information bit subblocks $[a_Q, a_{Q-1}, \ldots a_{Q-k_2+1}]$ included in information bit block carried in the second to-be-encoded block, where $k_2$ meets $1 \leq k_2 \leq Q$ and $k_1+k_2 \geq Q$; and the second communication device obtains Q information bit subblocks $[a_1, a_2, \ldots, a_Q]$ included in the information bit block.

It can be learned that if the sum of channel capacities of two times of transmission performed by the first communication device is greater than or equal to the code rate R, because the first code blocks and the second code blocks are respectively arranged according to the first order and the second order, the second communication device can implement correct decoding through two times of decoding.

In a possible design, if the second communication device fails in decoding, the second communication device receives M third code blocks retransmitted by the first communication device, where the M third code blocks are obtained through polar code encoding on M third to-be-encoded blocks. The Q information bit subblocks of each information bit block are placed into Q third to-be-encoded blocks in the M third to-be-encoded blocks according to a second order. The second order used in the third to-be-encoded blocks is different from the second order used in the second to-be-encoded blocks.

If a sum of channel capacities of two times of transmission performed by the first communication device is less than the code rate R, and a sum of channel capacities of three times of transmission performed by the first communication device is greater than or equal to the code rate R, the second communication device obtains, through decoding, $k_1$ information bit subblocks $[a_1, a_2, \ldots, a_{k_1}]$ included in one information bit block carried in the first to-be-encoded block and $k_2$ information bit subblocks $[a_Q, a_{Q-1}, \ldots, a_{Q-k_2+1}]$ included in the information bit block carried in the second to-be-encoded block. $k_1$ and $k_2$ meet $k_1+k_2<Q$;

the second communication device obtains, through decoding, $k_3$ information bit subblocks $[A_1, A_2, \ldots, A_{k_3}]$ included in information bit block carried in the third to-be-encoded block, where $k_3$ meets $1 \leq k_3 \leq Q$, and $k_1$, $k_2$, and $k_3$ meet $k_1+k_2+k_3 \geq Q$; and the second communication device obtains, according to the mapping relationship between the first order and the second order, $k_3$ information bit subblocks $[a_{k_1+1}, a_{k_1+1}, \ldots, a_{Q-k_2}]$ corresponding to the $k_3$ information bit subblocks before mapping, and the second communication device obtains Q information bit subblocks $[a_1, a_2, \ldots, a_Q]$ included in the information bit block.

It can be learned that if the sum of channel capacities of two times of transmission performed by the first communication device is less than the code rate R, and the sum of channel capacities of three times of transmission performed by the first communication device is greater than or equal to the code rate R, because the first code blocks, the second code blocks, and the third code blocks are arranged according to the first order, and the second order, the second communication device can implement correct decoding through three times of decoding.

In a possible design, if the second communication device fails in decoding, the second communication device receives M $n^{th}$ code blocks retransmitted by the first communication device, where the M $n^{th}$ code blocks are obtained through polar code encoding on M $n^{th}$ to-be-encoded blocks. Q information bit subblocks of each processed information bit block are placed into Q $n^{th}$ to-be-encoded blocks in the M $n^{th}$ to-be-encoded blocks according to the first order. The second communication device combines and decodes the M first code blocks and the M $n^{th}$ code blocks to obtain decoded data. Processing on each information bit block meets the following condition:

the Q information bit subblocks of each information bit block are mapped from a binary field to a $2^w$ number system field, and any mapped information bit block meets $[\bar{a}_1, \bar{a}_2, \ldots, \bar{a}_Q]$, where $\bar{a}_q$ is any information bit subblock in the any mapped information bit block, $\bar{a}_q$ is a $2^w$ number system sequence whose length is $K/wQ$, and w is a positive integer greater than 1; and the any mapped information bit block and a converted corresponding information bit block meet the following relationship:

$$[\bar{A}_{n,1}, \bar{A}_{n,2}, \ldots, \bar{A}_{n,Q}] = [\bar{a}_1, \bar{a}_2, \ldots, \bar{a}_Q] * H_n, \text{ where}$$

$\bar{A}^{n,q}$ is a corresponding information bit subblock after $\bar{a}_q$ converted, $H_n$ is a universal decoding matrix UDM of $K/w \times K/w$ in the $2^w$ number system field, n indicates an $n^{th}$ time of transmission, n meets $n \in [1, 2, \ldots, N]$, N is a total quantity of times of transmission performed by the first communication device, and N is a positive integer greater than 3; and a corresponding information bit block after $[\bar{A}_{n,1}, \bar{A}_{n,2}, \ldots, \bar{A}_{n,Q}]$ is reversely mapped meets $[A_{n,1}, A_{n,2}, \ldots, A_{n,Q}]$, where $A_{n,Q}$ is a binary sequence whose length is $K/Q$.

It can be learned that if the second communication device fails in decoding, the second communication device may receive the code blocks retransmitted by the first communication device for a plurality of times. In addition, when a quantity of times of transmission performed by the first communication device exceeds three, because three or more times of retransmission are performed in a multi-number system field, the first communication device needs to perform corresponding processing on a plurality of information bit subblocks in the M $n^{th}$ to-be-encoded blocks, and then encode the M $n^{th}$ to-be-encoded blocks.

In a possible design, any one of code blocks carries at least one information bit subblock and at most Q information bit subblocks, and the code blocks includes the first code block and the second code block.

In a possible design, the code blocks are sequentially arranged based on identifiers of the code blocks, and a first code block carries one information bit subblock; quantities of information bit blocks carried in a first code block to a $Q^{th}$ code block successively increase by one based on an arrangement order of the code blocks, and the $Q^{th}$ code block carries Q information bit subblocks; quantities of information bit subblocks carried in a $(Q+1)^{th}$ code block to an $M^{th}$ code block successively decrease by one based on the arrangement order of the code blocks; and the $M^{th}$ code block carries one information bit subblock.

In a possible design, Q is a quantization order of a code rate R, and Q is a positive integer. A code rate of an $i^{th}$ code block is $r_i=i\times R/Q$, where i meets $1\le i\le Q$. A code rate of a $j^{th}$ code block is $r_j=(M-j+1)\times R/Q$, where j meets $Q+1\le j\le M$.

According to a third aspect, an embodiment of this application provides a communication device, where the communication device includes a transceiver and a processor.

The transceiver is configured to obtain X information bit blocks, where one information bit block includes K information bits. One information bit block is divided into Q information bit subblocks, and one information bit subblock is a binary sequence with a length of K/Q.

The processor is configured to place Q information bit subblocks of each information bit block into Q first to-be-encoded blocks in the M first to-be-encoded blocks according to a first order. The first order is that a $q^{th}$ information bit subblock of each information bit block is located at $((q-1)*K/Q+1)^{th}$ to $(q*K/Q)^{th}$ reliable positions of the first to-be-encoded blocks, q meets $1\le q\le Q$, and M meets $M=X+Q-1$.

The processor is further configured to separately perform polar code encoding on the M first to-be-encoded blocks to obtain M first code blocks.

The transceiver is further configured to send the M first code blocks to a second communication device.

When retransmission is required, the processor is further configured to place the Q information bit subblocks of each information bit block into Q second to-be-encoded blocks in M second to-be-encoded blocks according to a second order, where the second order and the first order meet a mapping relationship.

The processor is further configured to separately perform polar code encoding on the M second to-be-encoded blocks to obtain M second code blocks.

The transceiver is further configured to send the M second code blocks to the second communication device.

In a possible design, the second order is that the $q^{th}$ information bit subblock of each information bit block is located $((Q-q)*K/Q+1)^{th}$ to $((Q-q+1)*K/Q)^{th}$ reliable positions of the second to-be-encoded blocks.

In a possible design, the first order and the second order meet the following mapping relationship:

$$[A_1,A_2,\ldots,A_{2^P}]=[0,0,\ldots,0,a_1,a_2,\ldots,a_Q]F^{\otimes(J+P)},$$
where $a_q$ is any information bit subblock in Q information bit subblocks of any information bit block, $A_t$ is an information bit subblock corresponding to any mapped information bit subblock, F is a generator matrix of a polar code, J is a positive integer and meets $K/Q=2^J$, P is a positive integer and meets $2^{P-1}\le Q\le 2^P$, and t meets $1\le t\le 2^P$.

In a possible design, the processor is further configured to:
when retransmission is required, place the Q information bit subblocks of each information bit block into Q third to-be-encoded blocks in M third to-be-encoded blocks according to a second order, where the second order used in the third to-be-encoded blocks is different from the second order used in the second to-be-encoded blocks, and
separately perform polar code encoding on the M third to-be-encoded blocks to obtain M third code blocks.

The transceiver is further configured to send the M third code blocks to the second communication device.

In a possible design, the processor is further configured to:
when retransmission is required, map the Q information bit subblocks of each information bit block from a binary field to a $2^w$ number system field to obtain any mapped information bit block $[\bar{a}_1, \bar{a}_2, \ldots, \bar{a}_Q]$, where $\bar{a}_q$ is any information bit subblock in the any mapped information bit block, $\bar{a}_q$ is a sequence whose length is K/wQ, and w is a positive integer greater than 1;
convert Q information bit subblocks of each mapped information bit block, where Q information bit subblocks of the any mapped information bit block and the converted corresponding Q information bit subblocks meet the following relationship:

$$[\bar{A}_{n,1},\bar{A}_{n,2},\ldots,\bar{A}_{n,Q}]=[\bar{a}_1,\bar{a}_2,\ldots,\bar{a}_Q]*H_n, \text{ where}$$

$\bar{A}_{n,q}$ is a corresponding information bit subblock after $\bar{a}_q$ converted, $H_n$ is a universal decoding matrix UDM of K/w×K/w in the $2^w$ number system field, n indicates an $n^{th}$ time of transmission, n meets $n\in[1, 2, \ldots, N]$, N is a total quantity of times of transmission performed by the first communication device, and N is a positive integer greater than 3;
perform reverse mapping on $[\bar{A}_{n,1}, \bar{A}_{n,2}, \ldots, \bar{A}_{n,Q}]$ to obtain a corresponding information bit block $[A_{n,1}, A_{n,2}, \ldots, A_{n,Q}]$ after $[\bar{A}_{n,1}, \bar{A}_{n,2}, \ldots, \bar{A}_{n,Q}]$ is reversely mapped, where $A_{n,Q}$ is a binary sequence whose length is K/Q;
place Q information bit subblocks of any reversely-mapped information bit block into M $n^{th}$ to-be-encoded blocks according to the first order; where n meets $3<n\le N$, and N is a positive integer greater than 3, and separately perform polar code encoding on the M $n^{th}$ to-be-encoded blocks to obtain M $n^{th}$ code blocks.

The transceiver is further configured to send the M $n^{th}$ code blocks to the second communication device.

In a possible design, any one of code blocks carries at least one information bit subblock and at most Q information bit subblocks, and the code blocks includes the first code block and the second code block.

In a possible design, the code blocks are sequentially arranged based on identifiers of the code blocks, and a first code block carries one information bit subblock. Quantities of information bit blocks carried in a first code block to a $Q^{th}$ code block successively increase by one based on an arrangement order of the code blocks, and the $Q^{th}$ code block carries Q information bit subblocks. Quantities of information bit subblocks carried in a $(Q+1)^{th}$ code block to an $M^{th}$ code block successively decrease by one based on the arrangement order of the code blocks, and the $M^{th}$ code block carries one information bit subblock.

In a possible design, Q is a quantization order of a code rate R, and Q is a positive integer. A code rate of an $i^{th}$ code block is $r_i=i\times R/Q$, where i meets $1\le i\le Q$. A code rate of a $j^{th}$ code block is $r_j=(M-j+1)\times R/Q$, where j meets $Q+1\le j\le M$.

According to a fourth aspect, an embodiment of this application provides a communication device, where the communication device includes a transceiver and a processor.

The transceiver is configured to receive M first code blocks initially transmitted by a first communication device, where the M first code blocks are obtained through polar code encoding on M first to-be-encoded blocks. The M first to-be-encoded blocks carry X information bit blocks, and each information bit block is divided into Q information bit subblocks. The Q information bit subblocks of each information bit block are placed into Q first to-be-encoded blocks in the M first to-be-encoded blocks according to a first order. The first order is that a $q^{th}$ information bit subblock of each information bit block is located at $((q-1)*K/Q+1)^{th}$ to $(q*K/Q)^{th}$ reliable positions of the first to-be-encoded blocks, q meets $1 \leq q \leq Q$, and M meets $M=X+Q-1$.

The transceiver is configured to receive M second code blocks retransmitted by the first communication device, where the M second code blocks are obtained through polar code encoding on M second to-be-encoded blocks. The Q information bit subblocks of each information bit block are placed into Q second to-be-encoded blocks in the M second to-be-encoded blocks according to a second order, and the second order and the first order meet a mapping relationship.

The processor is configured to combine and decode the M first code blocks and the M second code blocks to obtain decoded data.

In a possible design, the second order is that the $q^{th}$ information bit subblock of each information bit block is located at $((Q-q)*K/Q+1)^{th}$ to $((Q-q+1)*K/Q)^{th}$ reliable positions of the second to-be-encoded blocks.

In a possible design, the first order and the second order meet the following mapping relationship:

$$[A_1, A_2, \ldots, A_{2^P}] = [0, 0, \ldots, 0, a_1, a_2, \ldots, a_Q] F^{\otimes (J+P)},$$
where $a_q$ is any information bit subblock in Q information bit subblocks of any information bit block, $A_t$ is an information bit subblock corresponding to any mapped information bit subblock, F is a generator matrix of a polar code, J is a positive integer and meets $K/Q=2^J$, P is a positive integer and meets $2^{P-1} \leq Q \leq 2^P$, and t meets $1 \leq t \leq 2^P$.

In a possible design, when the processor is configured to combine and decode the M first code blocks and the M second code blocks to obtain the decoded data, the processor is specifically configured to:

if a sum of channel capacities of two times of transmission performed by the first communication device is greater than or equal to a code rate R, obtain, through decoding, $k_1$ information bit subblocks $[a_1, a_2, \ldots a_{k_1}]$ included in one information bit block carried in the first to-be-encoded block, where $k_1$ meets $1 \leq k_1 \leq Q$;

obtain, through decoding, $k_2$ information bit subblocks $[a_Q, a_{Q-1}, \ldots, a_{Q-k_2+1}]$ included in information bit block carried in the second to-be-encoded block, where $k_2$ meets $1 \leq k_2 \leq Q$ and $k_1+k_2 \geq Q$; and obtain Q information bit subblocks $[a_1, a_2, \ldots, a_Q]$ included in the information bit block.

In a possible design, the transceiver is further configured to receive M third code blocks retransmitted by the first communication device, where the M third code blocks are obtained through polar code encoding on M third to-be-encoded blocks. The Q information bit subblocks of each information bit block are placed into Q third to-be-encoded blocks in the M third to-be-encoded blocks according to a second order. The second order used in the third to-be-encoded blocks is different from the second order used in the second to-be-encoded blocks.

If a sum of channel capacities of two times of transmission performed by the first communication device is less than the code rate R, and a sum of channel capacities of three times of transmission performed by the first communication device is greater than or equal to the code rate R, the processor is further configured to:

obtain, through decoding, $k_1$ information bit subblocks $[a_1, a_2, \ldots, a_{k_1}]$ included in one information bit block carried in the first to-be-encoded block and $k_2$ information bit subblocks $[a_Q, a_{Q-1}, \ldots, a_{Q-k_2+1}]$ included in the information bit block carried in the second to-be-encoded block, where $k_1$ and $k_2$ meet $k_1+k_2<Q$;

obtain, through decoding, $k_3$ information bit subblocks $[A_1, A_2, \ldots, A_{k_3}]$ included in information bit block carried in the third to-be-encoded block, where $k_3$ meets $1 \leq k_3 \leq Q$, and $k_1$, $k_2$, and $k_3$ meet $k_1+k_2+k_3 \geq Q$;

obtain, according to the mapping relationship between the first order and the second order, $k_3$ information bit subblocks $[a_{k_1+1}, a_{k_1+1}, \ldots, a_{Q-k_2}]$ corresponding to the $k_3$ information bit subblocks before mapping; and obtain Q information bit subblocks $[a_1, a_2, \ldots, a_Q]$ included in the information bit block.

In a possible design, the transceiver unit is further configured to receive M $n^{th}$ code blocks retransmitted by the first communication device, where the M $n^{th}$ code blocks are obtained through polar code encoding on M $n^{th}$ to-be-encoded blocks. Q information bit subblocks of each processed information bit block are placed into Q $n^{th}$ to-be-encoded blocks in the M $n^{th}$ to-be-encoded blocks according to the first order.

The processing unit is further configured to combine and decode the M first code blocks to the M $n^{th}$ code blocks to obtain decoded data.

Processing on each information bit block meets the following condition:

The Q information bit subblocks of each information bit block are mapped from a binary field to a $2^w$ number system field, and any mapped information bit block meets $[\bar{a}_1, \bar{a}_2, \ldots, \bar{a}_Q]$, $\bar{a}_q$ is any information bit subblock in the any mapped information bit block, $\bar{a}_q$ is a $2^w$ number system sequence whose length is $K/wQ$, and w is a positive integer greater than 1.

The any mapped information bit block and a converted corresponding information bit block meet the following relationship:

$$[\bar{A}_{n,1}, \bar{A}_{n,2}, \ldots, \bar{A}_{n,Q}] = [\bar{a}_1, \bar{a}_2, \ldots, \bar{a}_Q] * H_n, \text{ where}$$

$\bar{A}_{n,q}$ is a corresponding information bit subblock after $\bar{a}_q$ is converted, $H_n$ is a universal decoding matrix UDM of $K/w \times K/w$ in the $2^w$ number system field, and n indicates an $n^{th}$ times of transmission. n meets $n \in [1, 2, \ldots, N]$, N is a total quantity of times of transmission performed by the first communication device, and N is a positive integer greater than 3.

A corresponding information bit block after $[\bar{A}_{n,1}, \bar{A}_{n,2}, \ldots, \bar{A}_{n,Q}]$ is reversely mapped meets $[A_{n,1}, A_{n,2}, \ldots, A_{n,Q}]$, where $A_{n,Q}$ is a binary sequence whose length is $K/Q$.

In a possible design, any one of code blocks carries at least one information bit subblock and at most Q information bit subblocks, and the code blocks includes the first code block and the second code block.

In a possible design, the code blocks are sequentially arranged based on identifiers of the code blocks, and a first code block carries one information bit subblock; quantities of information bit blocks carried in a first code block to a $Q^{th}$ code block successively increase by one based on an arrangement order of the code blocks, and the $Q^{th}$ code block carries Q information bit subblocks; quantities of information bit subblocks carried in a $(Q+1)^{th}$ code block to an $M^{th}$ code block successively decrease by one based on the arrangement order of the code blocks; and the $M^{th}$ code block carries one information bit subblock.

In a possible design, Q is a quantization order of a code rate R, and Q is a positive integer. A code rate of an $i^{th}$ code block is $r_i=i \times R/Q$, where i meets $1 \leq i \leq Q$. A code rate of a $j^{th}$ code block is $r_j=(M-j+1) \times R/Q$, where j meets $Q+1 \leq j \leq M$.

According to a fifth aspect, an embodiment of this application provides a communication device. The device has a function of implementing the data processing method provided in the first aspect. The function may be implemented by hardware, or may be implemented by hardware executing corresponding software. The hardware or the software includes one or more modules corresponding to the function.

According to a sixth aspect, an embodiment of this application provides a communication device. The device has a function of implementing the data processing method provided in the second aspect. The function may be implemented by hardware, or may be implemented by hardware executing corresponding software. The hardware or the software includes one or more modules corresponding to the function.

According to a seventh aspect, an embodiment of this application provides a communication system. The communication system includes the communication device provided in the second aspect or the fifth aspect and the communication device provided in the third aspect or the sixth aspect.

According to an eighth aspect, an embodiment of this application provides a computer-readable storage medium. The readable storage medium includes a program or instructions. When the program is run or the instructions are run on a computer, the computer is enabled to perform the method in any one of the first aspect or the possible implementations of the first aspect.

According to a ninth aspect, an embodiment of this application provides a computer-readable storage medium. The readable storage medium includes a program or instructions. When the program is run or the instructions are run on a computer, the computer is enabled to perform the method in any one of the second aspect or the possible implementations of the second aspect.

According to a tenth aspect, an embodiment of this application provides a chip or a chip system. The chip or the chip system includes at least one processor and an interface. The interface is interconnected to the at least one processor through a line. The at least one processor is configured to run a computer program or instructions, to perform the method described in any one of the first aspect or the possible implementations of the first aspect.

According to an eleventh aspect, an embodiment of this application provides a chip or a chip system. The chip or the chip system includes at least one processor and an interface. The interface is interconnected to the at least one processor through a line. The at least one processor is configured to run a computer program or instructions, to perform the method described in any one of the second aspect or the possible implementations of the second aspect.

The interface in the chip may be an input/output interface, a pin, a circuit, or the like.

The chip system in the foregoing aspects may be a system-on-a-chip (system on chip, SOC), a baseband chip, or the like. The baseband chip may include a processor, a channel encoder, a digital signal processor, a modem, an interface module, and the like.

In a possible implementation, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

According to a twelfth aspect, an embodiment of this application provides a computer program or a computer program product, including code or instructions. When the code runs or the instructions run on a computer, the computer is enabled to perform the method in any one of the first aspect or the possible implementations of the first aspect.

According to a thirteenth aspect, an embodiment of this application provides a computer program or a computer program product, including code or instructions. When the code runs or the instructions run on a computer, the computer is enabled to perform the method in any one of the second aspect or the possible implementations of the second aspect.

BRIEF DESCRIPTION OF THE DRAWINGS

FIG. 7a to FIG. 7d are schematic diagrams of first to-be-encoded blocks at different code rate quantization orders according to an embodiment of this application;

DETAILED DESCRIPTION OF ILLUSTRATIVE EMBODIMENTS

The following describes the technical solutions in embodiments of this application with reference to the accompanying drawings in embodiments of this application.

A polar code is a channel coding scheme that can be strictly proved to reach a channel capacity. The polar code has features such as high performance, low complexity, and a flexible matching manner. Currently, the polar code has been determined as an uplink and/or downlink control channel coding scheme in a 5th generation mobile communications (5G) control channel enhanced mobile broadband (eMBB) scenario.

Figure 1:
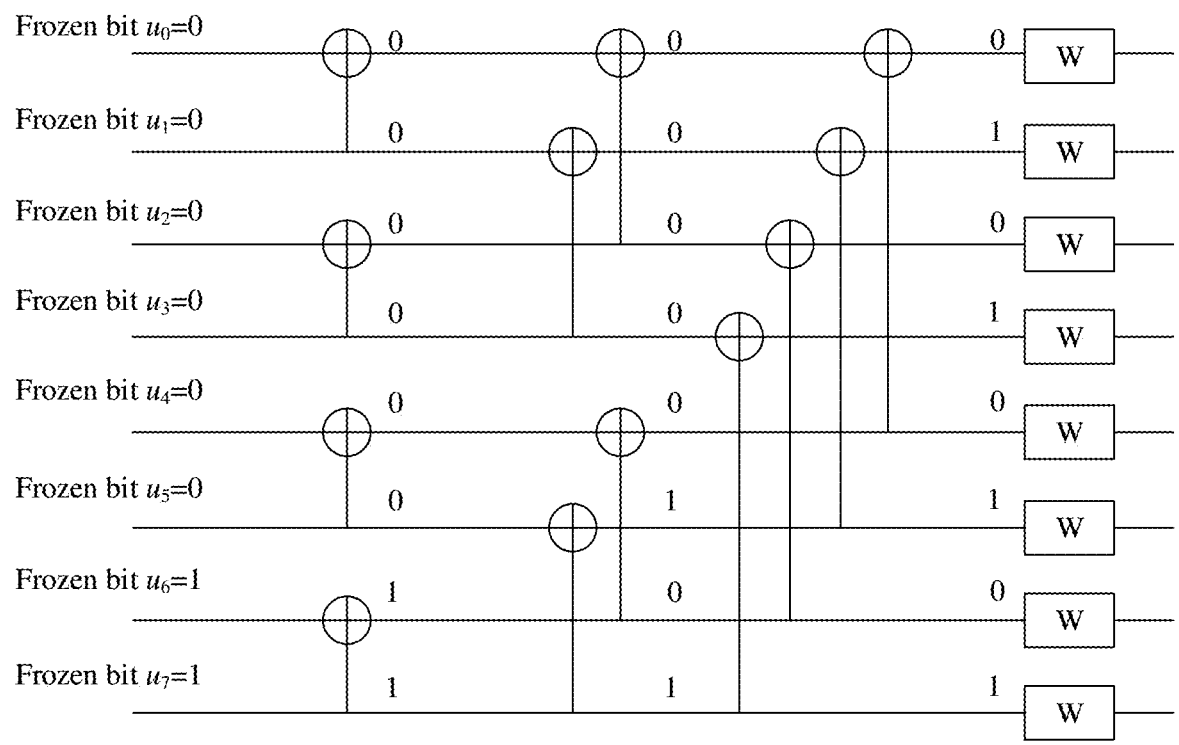
FIG. 1 is a schematic diagram of 8x8 polar code encoding.

FIG. 1 is a schematic diagram of 8x8 polar code encoding. To-be-encoded bits are sorted based on respective reliability, and are sequentially arranged at different positions in a to-be-encoded block. Generally, a bit with high reliability is set as an information bit (data), and a bit with low reliability is set as a frozen bit. A value of the frozen bit is usually set to 0, and is known to both a transmit end and a receive end during actual transmission. As shown in FIG. 1, $u_7$, $u_6$, $u_5$, $u_3$ are four bits with high reliability, and are set as information bits; and $u_4$, $u_2$, $u_1$, $u_0$ are four bits with low reliability, and are set as frozen bits.

Figure 2:
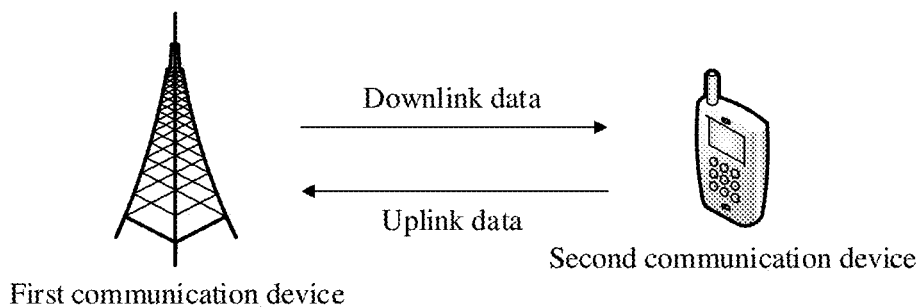
FIG. 2 is a schematic diagram of a communication system according to an embodiment of this application.

FIG. 2 shows a communication system according to an embodiment of this application. The communication system includes a first communication device and a second communication device. The first communication device is a transmit end of encoded data, and is configured to send downlink data to the second communication device, or receive uplink data from the second communication device. For example, when sending downlink data to the second communication device, the first communication device may perform polar code encoding on a to-be-encoded information bit. After constellation modulation is performed on data obtained after channel coding, the data may be sent to the second communication device through a downlink data channel.

The second communication device is a receive end of encoded data, and is configured to send uplink data to the first communication device, or receive downlink data from the first communication device. For example, when sending uplink data to the first communication device, the second communication device may perform polar code encoding on a to-be-encoded information bit. After constellation modulation is performed on data obtained after channel coding, the data may be sent to the first communication device through an uplink data channel.

The first communication device may be any device having a wireless transceiver function, and provides a wireless communication service for the second communication device in a coverage area. An access network device may include but is not limited to: an evolved NodeB (NodeB or eNB or e-NodeB) in a long term evolution (LTE) system, a base station (gNodeB or gNB) or a transmission reception point (TRP) in a next generation radio access technology (NR), a base station that subsequently evolves in 3GPP, an access node in a Wi-Fi system, a wireless relay node, a wireless backhaul node, a device that provides a base station function in internet of vehicles, D2D communication, and machine-to-machine communication, and a satellite.

The second communication device may be a terminal device having a wireless transceiver function, or the second communication device may be a chip. The terminal device may be user equipment (UE), a mobile phone, a tablet computer (Pad), a computer with a wireless transceiver function, a virtual reality (VR) terminal device, an augmented reality (AR) terminal device, an in-vehicle terminal device, a wireless terminal in telemedicine (remote medical), a wireless terminal in a smart grid, a wearable terminal device, or the like.

In a communication system shown in FIG. 2, because a wireless channel has a problem of signal fading, a receive end of a radio signal may fail to correctly decode received information, and therefore cannot obtain accurate information. A hybrid automatic repeat request (HARQ) technology is a technology formed by combining forward error correction (FEC) encoding and an automatic repeat request (ARQ). A working principle of a conventional HARQ is as follows: When a receive end cannot correctly decode received information, the receive end retains received data, and requires a transmit end to resend previously transmitted information. After receiving the retransmitted information, the receive end combines the retransmitted information and the previously received information, and then decodes the combined information.

It can be learned that, to correctly decode all bits sent by the transmit end, the receive end may need to perform a plurality of times of retransmission, resulting in an extra delay. To resolve the foregoing problem, an embodiment of this application provides a data processing method, and the data processing method may be performed by a first communication device. The first communication device can implement transmission close to a channel capacity provided that the device meets a condition that a sum of channel capacities of a plurality of times of transmission is greater than or equal to an information transmission rate.

The following provides descriptions with reference to specific embodiments.

Figure 3:
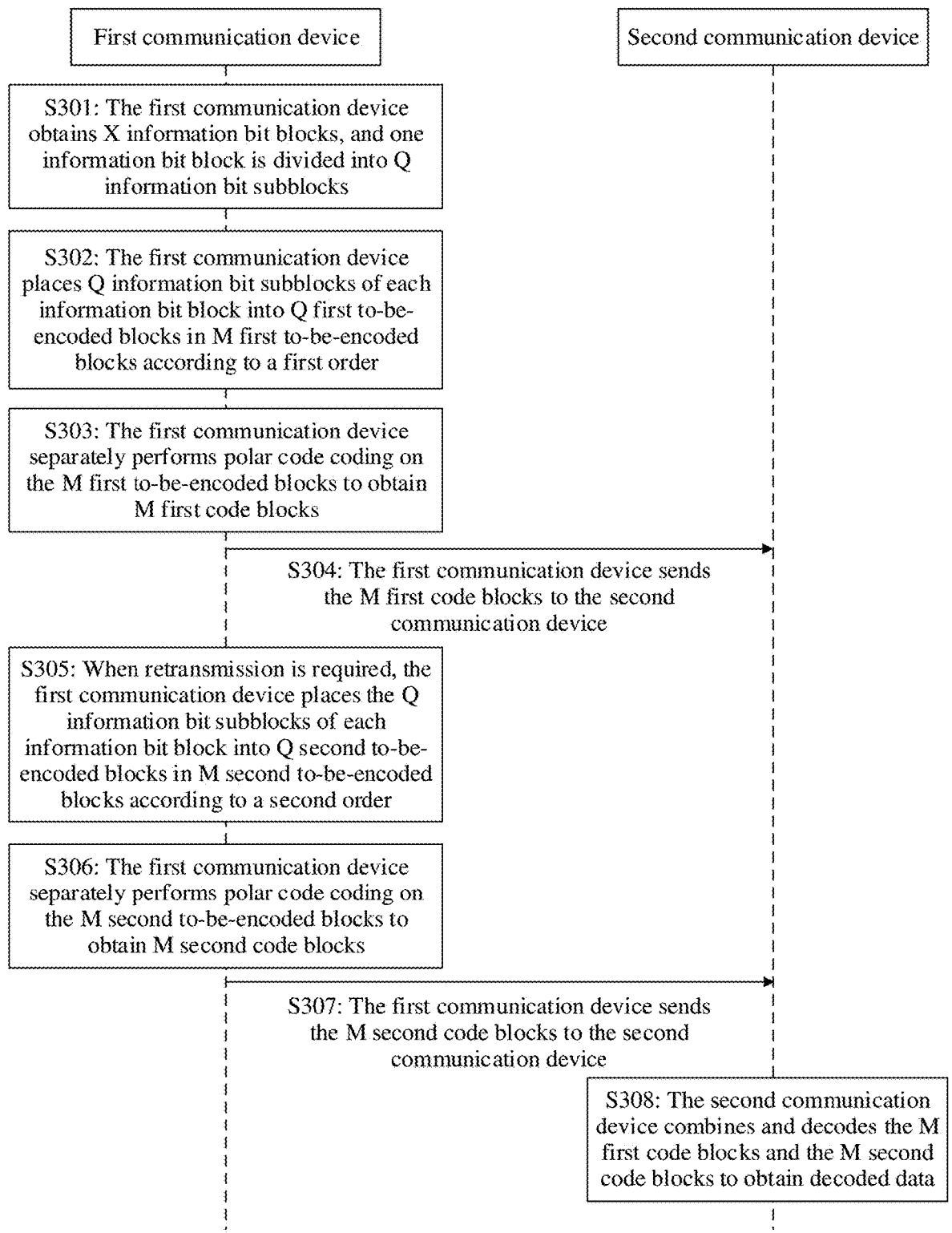
FIG. 3 is a schematic flowchart of a data processing method according to an embodiment of this application.

An embodiment of this application provides a data processing method. Refer to FIG. 3. The data processing method may be performed by a first communication device and a second communication device through interaction, and includes the following steps:

S301: The first communication device obtains X information bit blocks, and one information bit block is divided into Q information bit subblocks.

S302: The first communication device places Q information bit subblocks of each information bit block into Q first to-be-encoded blocks in M first to-be-encoded blocks according to a first order.

When processing a plurality of to-be-encoded information bits, the first communication device may divide the plurality of to-be-encoded information bits into different information bit blocks. One information bit block includes a plurality of information bits. For example, the first communication device groups every K information bits into one information bit block, that is, one information bit block includes K information bits, as shown in FIG. 4a.

Figure 4A:
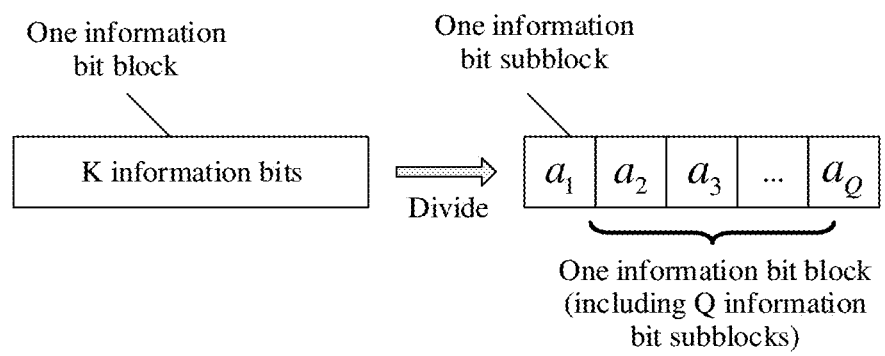
FIG. 4a and FIG. 4b are schematic diagrams of a relationship between an information bit block and an information bit subblock according to an embodiment of this application.
Figure 4B:
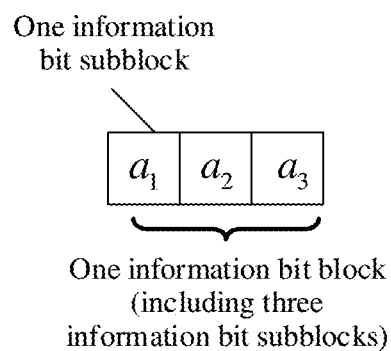

Each information bit block may be divided into Q information bit subblocks, that is, the K information bits are divided into the Q information bit subblocks, as shown in FIG. 4a. $a_q$ indicates any information bit subblock, $a_q$ is a binary sequence whose length is K/Q, and q meets $1 \leq q \leq Q$. Q indicates a quantization order of a code rate, and Q is a positive integer. For example, for information bit blocks and information bit subblocks shown in FIG. 4b, a quantization order of a code rate is 3, that is, Q=3.

It should be noted that if K/Q is not an integer, in this embodiment, a maximum of (Q−1) padding bits may be supplemented when K/Q is determined, to ensure that K/Q is an integer. For example, if K=100 and Q=3, K/Q is not an integer. After two padding bits are supplemented, K/Q=34, that is, $a_1$ and $a_2$ each include 34 information bits, and $a_3$ includes 32 information bits (the other two are padding bits). Subsequently, when performing encoding processing on the information bit subblock, a polar code encoder in the first communication device processes only an information bit in each information bit subblock, and does not process the padding bit.

After obtaining the X information bit blocks, the first communication device may place the X information bit blocks into the M first to-be-encoded blocks. The to-be-encoded block is used to carry to-be-encoded data transmitted by the first communication device to the second communication device. It may be understood that the first to-be-encoded block represents a to-be-encoded block used when the first communication device performs transmission to the second communication device for the first time, a second to-be-encoded block represents a to-be-encoded block used when the first communication device performs transmission to the second communication device for the second time, and the rule applies. In a possible case, the quantity M of first to-be-encoded blocks meets M=X+Q−1. Any one of the first to-be-encoded blocks carries at least one information bit subblock and at most Q information bit subblocks.

Figure 5A:
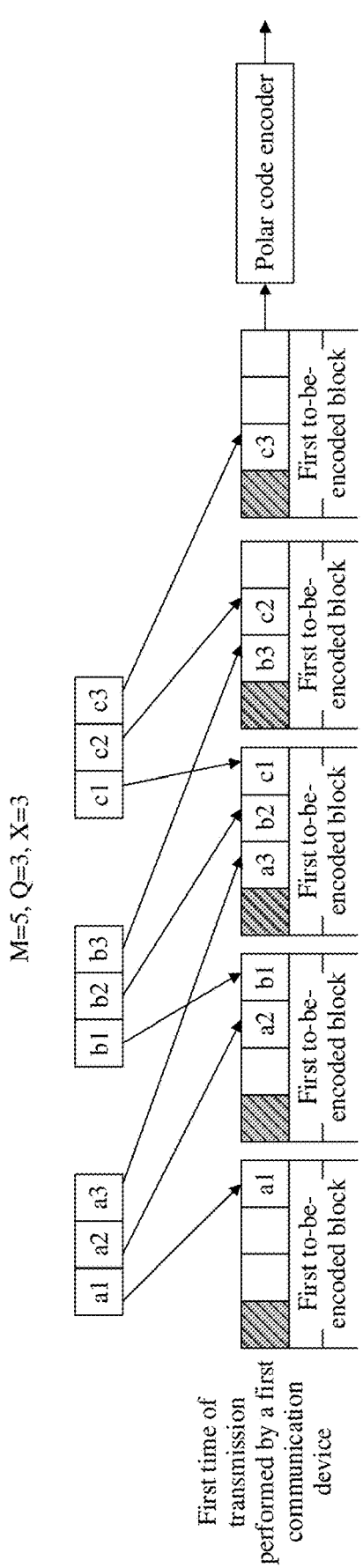
FIG. 5a to FIG. 5e are schematic diagrams of first to-be-encoded blocks at different code rate quantization orders according to an embodiment of this application.

FIG. 5a is a schematic diagram of first to-be-encoded blocks according to an embodiment of this application. If a code rate loss is not considered, an arrangement manner of information bit subblocks in the first to-be-encoded blocks is shown in FIG. 5a. For example, in FIG. 5a, there are three information bit blocks, that is, X=3, and five first to-be-encoded blocks, that is, M=5. A quantization order of a code rate is 3, that is, Q=3. Each information bit block includes Q information bit subblocks. It should be noted that Q information bit subblocks of a same information bit block are respectively located in different Q first to-be-encoded blocks, as shown in FIG. 5a.

The first to-be-encoded blocks are sequentially arranged, a $1^{st}$ first to-be-encoded block carries one information bit subblock, quantities of information bit blocks carried in the $1^{st}$ first to-be-encoded block to a $Q^{th}$ first to-be-encoded block successively increase by one based on an arrangement order, and the $Q^{th}$ first to-be-encoded block carries Q information bit subblocks. Quantities of information bit subblocks carried in a $(Q+1)^{th}$ first to-be-encoded block to an $M^{th}$ first to-be-encoded block successively decrease by one based on the arrangement order, and the $M^{th}$ first to-be-encoded block carries one information bit subblock.

For example, in FIG. 5a, a $1^{st}$ first to-be-encoded block carries one information bit subblock, a $2^{nd}$ first to-be-encoded block carries two information bit subblocks, a $3^{rd}$ first to-be-encoded block carries three information bit subblocks, a $4^{th}$ first to-be-encoded block carries two information bit subblocks, and a $5^{th}$ first to-be-encoded block carries one information bit subblock.

Optionally, to reduce the code rate loss, the first communication device may perform special processing when dividing information data into the X information bit blocks. The first to-be-encoded blocks are sequentially arranged, the $1^{st}$ first to-be-encoded block carries one information bit subblock, quantities of information bit blocks carried in the $1^{st}$ first to-be-encoded block to the $M^{th}$ first to-be-encoded block successively increase by one based on an arrangement order, and the $Q^{th}$ first to-be-encoded block to the $M^{th}$ first to-be-encoded block each carry Q information bit subblocks.

Figure 5B:
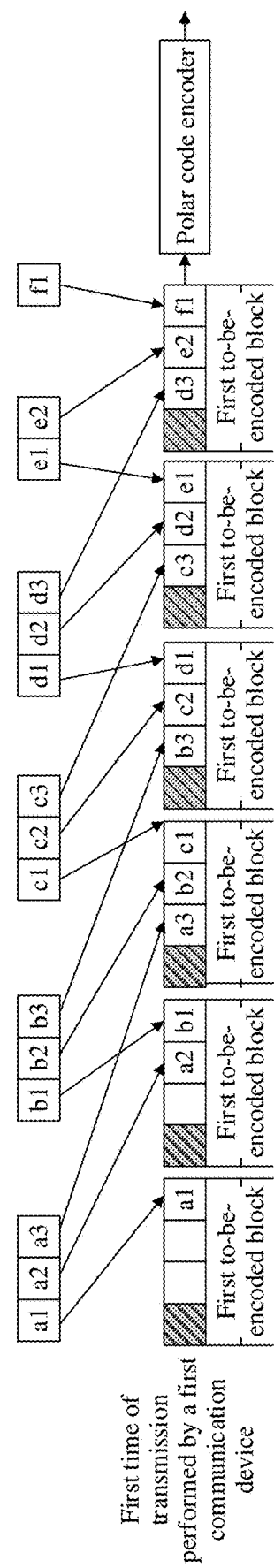

For example, FIG. 5b is another schematic diagram of first to-be-encoded blocks according to an embodiment of this application. In FIG. 5b, there are six information bit blocks, six first to-be-encoded blocks, and a quantization order Q of a code rate is 3. A first information bit block to a fourth information bit block each include three information bit subblocks. A fifth information bit block includes two information bit subblocks, and a sixth information bit block includes one information bit subblock. In other words, special processing is separately performed on the fifth information bit block and the sixth information bit block. In FIG. 5b, the $1^{st}$ first to-be-encoded block carries one information bit subblock, the $2^{nd}$ first to-be-encoded block carries two information bit subblocks, and the $3^{rd}$ first to-be-encoded block to the $6^{th}$ first to-be-encoded block each carry three information bit subblocks.

Figure 5C:
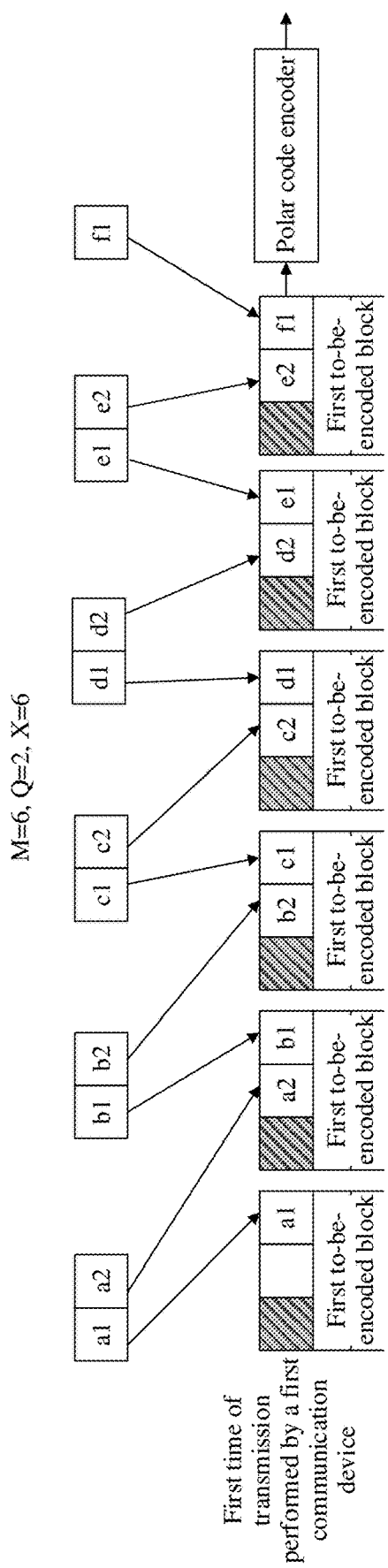

For another example, FIG. 5c is another schematic diagram of first to-be-encoded blocks according to an embodiment of this application. In FIG. 5c, there are six information bit blocks, six first to-be-encoded blocks, and a quantization order Q of a code rate is 2. Compared with the example in FIG. 5b, the quantization order of the code rate in FIG. 5c is 2, and quantities of the information bit blocks and the first to-be-encoded blocks are respectively the same as those in FIG. 5b. Special processing is performed on the sixth information bit block in FIG. 5c, so that the sixth information bit block includes only one information bit subblock. As shown in FIG. 5c, the first communication device separately places the six information bit blocks into the six first to-be-encoded blocks.

Figure 5D:
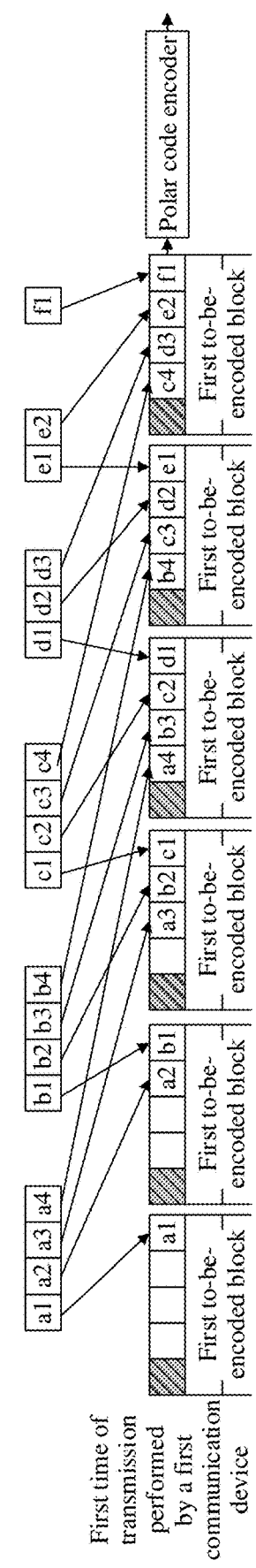

For still another example, FIG. 5d is another schematic diagram of first to-be-encoded blocks according to an embodiment of this application. In FIG. 5d, there are six information bit blocks, six first to-be-encoded blocks, and a quantization order Q of a code rate is 4. Compared with the example in FIG. 5b, the quantization order of the code rate in FIG. 5d is 4, and quantities of the information bit blocks and the first to-be-encoded blocks are respectively the same as those in FIG. 5b. Special processing is performed on a fourth information bit block to a sixth information bit block in FIG. 5d, so that the fourth information bit block includes three information bit subblocks, the fifth information bit block includes two information bit subblocks, and the sixth information bit block includes one information bit subblock. As shown in FIG. 5d, the first communication device separately places the six information bit blocks into the six first to-be-encoded blocks.

It should be noted that the first to-be-encoded blocks shown in FIG. 5a and the first to-be-encoded blocks shown in FIG. 5b are two types of basic first to-be-encoded blocks, and the first to-be-encoded blocks may alternatively be between the foregoing two types of basic first to-be-encoded blocks.

Figure 5E:
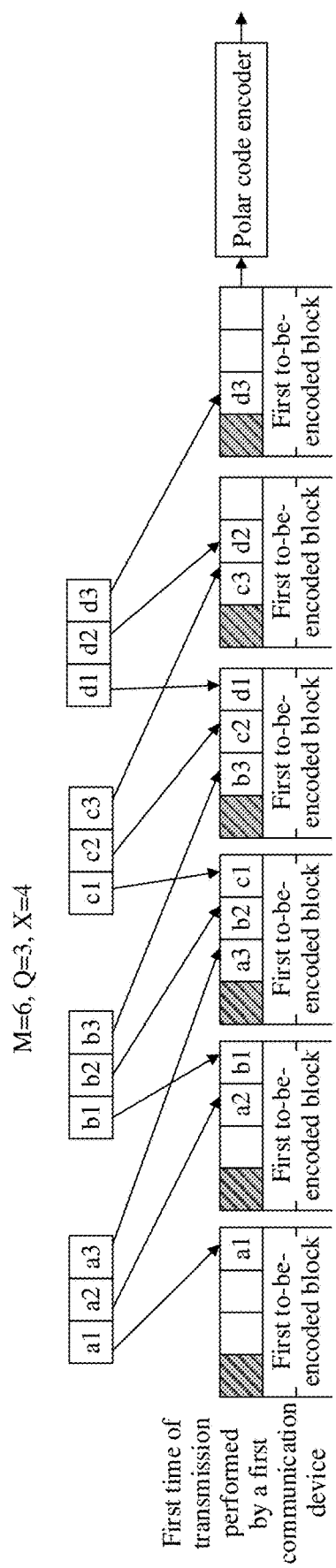

For example, FIG. 5e is another schematic diagram of first to-be-encoded blocks. M=6 indicates that there are six first to-be-encoded blocks in total, and X=4 indicates that four information bit blocks are transmitted in total. Four to-be-transmitted information bit blocks shown in FIG. 5e are all complete information bit blocks. The foregoing four information bit blocks are placed into the six first to-be-encoded blocks. As shown in FIG. 5e, a $1^{st}$ first to-be-encoded block and a $6^{th}$ first to-be-encoded block each carry one information bit subblock, a $2^{nd}$ first to-be-encoded block and a $5^{th}$ first to-be-encoded block each carry two information bit subblocks, and a $3^{rd}$ first to-be-encoded block and a $4^{th}$ first to-be-encoded block each carry three information bit subblocks. Other similar special processing may also be performed on the first to-be-encoded block. This is not limited in this embodiment.

Any one of the first to-be-encoded blocks further includes one or more frozen bits, as shown by shadow areas of the information bit blocks in FIG. 5a. A value of the frozen bit is usually set to 0, and is known to both a transmit end and a receive end during actual transmission.

It should be noted that the foregoing description of the first to-be-encoded block is merely an example, and the quantity of first to-be-encoded blocks may alternatively be another value. For example, when the first to-be-encoded blocks shown in FIG. 5b are used, theoretically, the quantity of first to-be-encoded blocks may approach infinite, that is, M approaches infinite. This is not limited in this embodiment.

The following describes in detail an arrangement manner of Q information bit subblocks of any information bit block. For any information bit block, Q information bit subblocks included in the information bit block may be separately placed into Q first to-be-encoded blocks according to a first order. The first order is that a $q^{th}$ information bit subblock of each information bit block is located at $((q-1)*K/Q+1)^{th}$ to $(q*K/Q)^{th}$ reliable positions of the first to-be-encoded blocks.

Figure 6:
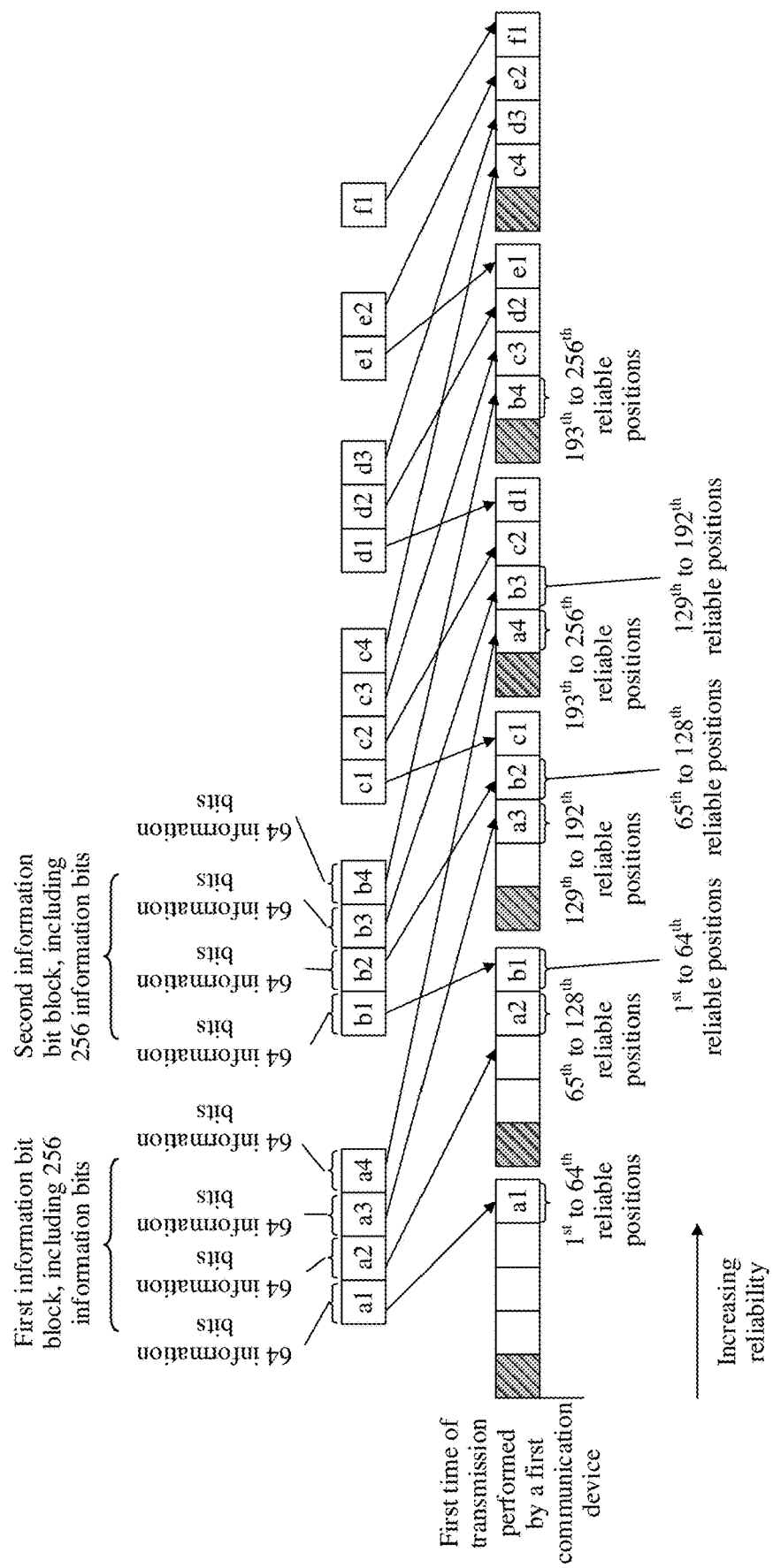
FIG. 6 is a schematic diagram of an arrangement manner of information bit subblocks in a to-be-encoded block according to an embodiment of this application.

An example in which the first to-be-encoded block in FIG. 5d is used as the first to-be-encoded block is used below for description. Refer to FIG. 6. It is assumed that K=256, Q=4, and M=6. For a first information bit block in FIG. 6, the information bit block includes 256 information bits. According to the description in the foregoing embodiment, the first communication device may obtain $a_1$, $a_2$, $a_3$, and $a_4$ each including 64 information bits. In this case, according to the first order, $a_1$ is placed in $1^{st}$ to $64^{th}$ reliable positions of a $1^{st}$ first to-be-encoded block, $a_2$ is placed in $65^{th}$ to $128^{th}$ reliable positions of a $2^{nd}$ first to-be-encoded block, $a_3$ is placed in $129^{th}$ to $192^{th}$ reliable positions of a $3^{rd}$ first to-be-encoded block, and $a_4$ is placed in $193^{th}$ to $256^{th}$ reliable positions of a $4^{th}$ first to-be-encoded block, as shown in FIG. 6. It should be noted that reliability of a position of each first to-be-encoded block gradually increases from left to right, that is, a rightmost position is a first reliable position, and reliability decreases sequentially from right to left.

For another example, for a second information bit block in FIG. 6, the information bit block also includes 256 information bits. Similarly, the first communication device may obtain $b_1$, $b_2$, $b_3$, and $b_4$ each including 64 information bits. In this case, according to the first order, $b_1$ is placed in $1^{st}$ to $64^{th}$ reliable positions of a $2^{nd}$ first to-be-encoded block, $b_2$ is placed in $65^{th}$ to $128^{th}$ reliable positions of a $3^{rd}$ first to-be-encoded block, $b_3$ is placed in $129^{th}$ to $192^{th}$ reliable positions of a $4^{th}$ first to-be-encoded block, and $b_4$ is placed in $193^{th}$ to $256^{th}$ reliable positions of a $5^{th}$ first to-be-encoded block, as shown in FIG. 6. It may be understood that an arrangement manner of 256 information bits in each of a third information bit block to a sixth information bit block is also similar, and details are not described herein again.

S303: The first communication device separately performs polar code encoding on the M first to-be-encoded blocks to obtain M first code blocks.

S304: The first communication device sends the M first code blocks to the second communication device, and correspondingly, the second communication device receives the M first code blocks sent by the first communication device.

Figure 7A:
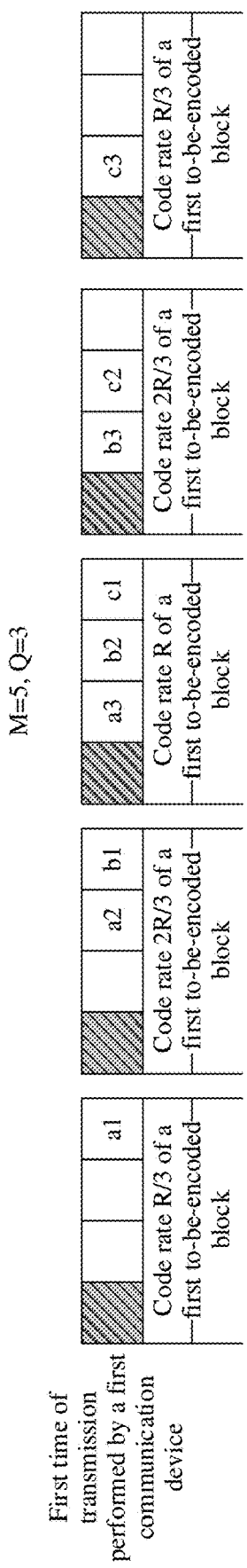

The first communication device may separately perform polar code encoding on the M first to-be-encoded blocks to obtain the M first code blocks. The M first code blocks that are output after the polar code encoding are a plurality of code blocks that are cascaded and combined together. For example, when the first communication device performs transmission for the first time, the first to-be-encoded block in FIG. 5a is used as the first to-be-encoded block. In this case, an arrangement order of five first to-be-encoded blocks and an arrangement order of information bit subblocks in each first to-be-encoded block are shown in FIG. 7a.

Figure 7B:
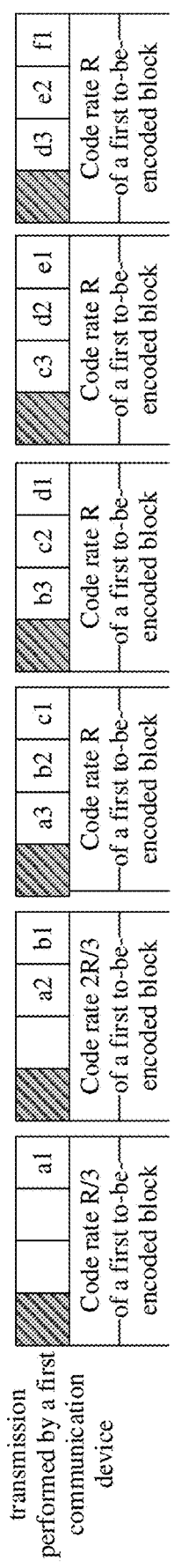

For another example, when the first communication device performs transmission for the first time, the first to-be-encoded block in FIG. 5b is used as the first to-be-encoded block. In this case, an arrangement order of six first to-be-encoded blocks and an arrangement order of information bit subblocks in each first to-be-encoded blocks are shown in FIG. 7b. Similarly, when the first communication device performs transmission for the first time, the first to-be-encoded block in FIG. 5c is used as the first to-be-encoded block. In this case, an arrangement order of six first to-be-encoded blocks and an arrangement order of information bit subblocks in each first to-be-encoded blocks are shown in FIG. 7c. When the first communication device performs transmission for the first time, the first to-be-encoded block in FIG. 5d is used as the first to-be-encoded block. In this case, an arrangement order of six first to-be-encoded blocks and an arrangement order of information bit subblocks in each first to-be-encoded blocks are shown in FIG. 7d.

The following analyzes a code rate of the first code block. For example, the five first to-be-encoded blocks shown in FIG. 7a are encoded into five polar code blocks, where M=5, and Q=3. A total code rate of the five to-be-encoded blocks is $(R/3+2R/3+R+2R/3+R/3)/5=3R/5$. For another example, the six first to-be-encoded blocks shown in FIG. 7b are encoded into six polar code blocks. M=6, and Q=3. A total code rate is $(R/3+2R/3+R+R+R+R)/6=5R/6$. It can be learned that compared with FIG. 7a, the total code rate of the first to-be-encoded blocks in FIG. 7b is larger, that is, closer to the code rate R.

For another example, the six first to-be-encoded blocks shown in FIG. 7c are encoded into six polar code blocks. M=6, and Q=2. A total code rate is $(R/2+R+R+R+R+R)/6=11R/12$. It can be learned that compared with FIG. 7b, the total code rate of the first to-be-encoded blocks in FIG. 7c is larger. In other words, when a ratio of M/Q is larger, the total code rate is closer to R.

For still another example, the six first to-be-encoded blocks shown in FIG. 7d are encoded into six polar code blocks. M=6, and Q=4. A total code rate is $(R/4+R/2+3R/4+R+R+R)/6=3R/4$. It can be learned that compared with FIG. 7a, the total code rate of the first to-be-encoded blocks in FIG. 7d is larger, that is, closer to the code rate R.

After encoding the information bits, the first communication device may perform constellation modulation on the M first code block, and then send data obtained after the constellation modulation to the second communication device through a downlink data channel. Correspondingly, the second communication device receives the data obtained after the coding and modulation, and demodulates and then decodes the received data obtained after the coding and modulation, to obtain original data transmitted by the first communication device. The original data transmitted by the first communication device is the plurality of information bits carried in the M first to-be-encoded blocks.

It should be noted that, according to the Shannon second theorem, when an information transmission rate of the channel does not exceed a channel capacity, any high transmission reliability can be implemented by using a proper channel coding method. However, if the information transmission rate exceeds the channel capacity, reliable transmission cannot be implemented. Generally, one transmission cannot ensure reliable transmission of all information bits, that is, one transmission cannot ensure that the channel capacity is greater than or equal to a code rate of each first code block. In this case, the first communication device may retransmit the data to the second communication device.

S305: When retransmission is required, the first communication device places the Q information bit subblocks of each information bit block into Q second to-be-encoded blocks in M second to-be-encoded blocks according to a second order.

After the first communication device transmits the M first code blocks to the second communication device for the first time, if the second communication device cannot correctly decode the M first code blocks, the second communication device may request retransmission. Correspondingly, when retransmission is required, the first communication device may re-place the X information bit blocks into the M second to-be-encoded blocks. The second to-be-encoded block is used to carry to-be-encoded data sent by the first communication device to the second communication device for the second time. Similarly, the quantity M of second to-be-encoded blocks meets M=X+Q−1. Any one of the second to-be-encoded blocks carries at least one information bit subblock and at most Q information bit subblocks.

It should be noted that the second to-be-encoded blocks and a plurality of information bit subblocks carried in the second to-be-encoded block are arranged according to a second order, and the second order and the first order meet a mapping relationship. Optionally, the second order is that the $q^{th}$ information bit subblock of each information bit block is located at $((Q-q)*K/Q+1)^{th}$ to $((Q-q+1)*K/Q)^{th}$ reliable positions of the second to-be-encoded blocks.

Figure 8A:
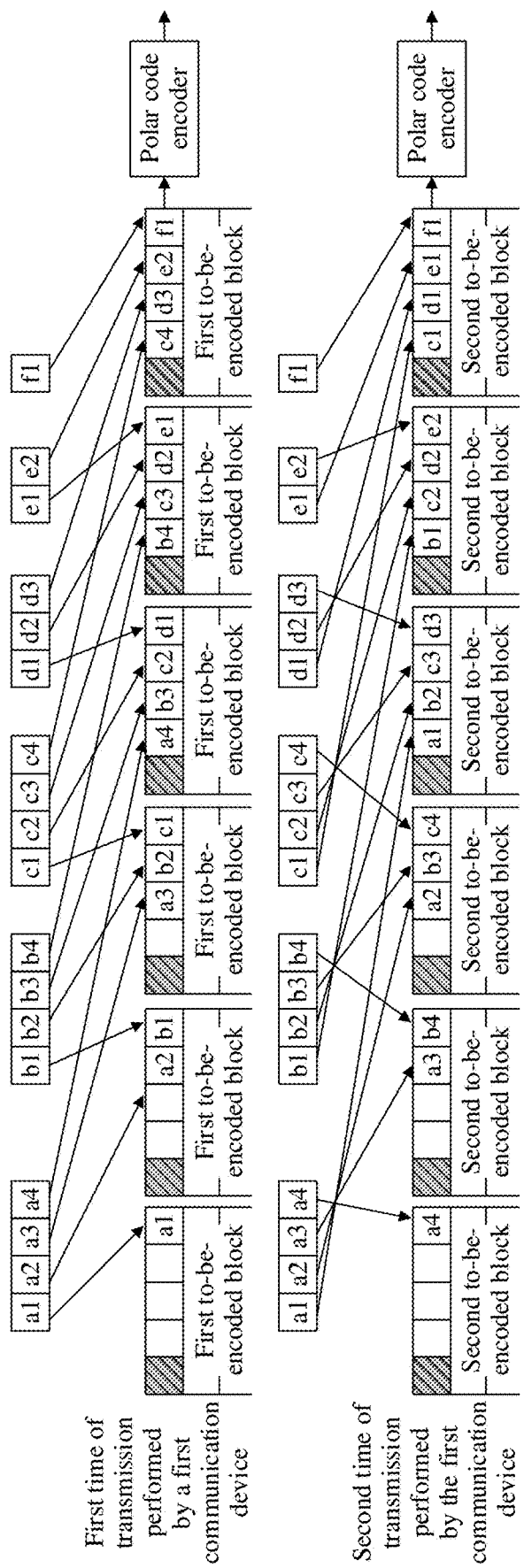
FIG. 8a is a schematic diagram of first to-be-encoded blocks and second to-be-encoded blocks according to an embodiment of this application.

FIG. 8a is a schematic diagram of first to-be-encoded blocks and second to-be-encoded blocks according to an embodiment of this application. For Q information bit subblocks in each information bit block, an arrangement order of information bit subblocks in the second to-be-encoded blocks shown in FIG. 8a is a reverse to the arrangement order of the information bit subblocks in the first to-be-encoded blocks shown in FIG. 5d, as shown in FIGS. 8a. K=256, M=6, and Q=4.

For example, for a first information bit block ($a_1$, $a_2$, $a_3$, $a_4$), information bit subblocks $a_1$ of the information bit block is located at $193^{th}$ to $256^{th}$ reliable positions of a $4^{th}$ second to-be-encoded block, that is, located at a position corresponding to $a_4$ during the first time of transmission. $a_2$ is located at $129^{th}$ to $192^{th}$ reliable positions of a $3^{rd}$ second to-be-encoded block, that is, located at a position corresponding to $a_3$ during the first time of transmission. $a_3$ is located at $65^{th}$ to $128^{th}$ reliable positions of a $2^{nd}$ second to-be-encoded block, that is, located at a position corresponding to $a_2$ during the first time of transmission. $a_4$ is located at $1^{st}$ to $64^{th}$ reliable positions of a $1^{st}$ second to-be-encoded block, that is, located at a position corresponding to $a_1$ during the first time of transmission. It can be learned that for the first information bit block, an arrangement order of the four information bit subblocks of the first information bit block in the second to-be-encoded blocks is reverse to an arrangement order of the four information bit subblocks of the information bit block in the first to-be-encoded blocks.

For another example, for a second information bit block ($b_1$, $b_2$, $b_3$, $b_4$), information bit subblocks $b_1$ of the information bit block is located at $193^{th}$ to $256^{th}$ reliable positions of a $5^{th}$ first to-be-encoded block, that is, located at a position corresponding to $b_4$ during the first time of transmission. $b_2$ is located at $129^{th}$ to $192^{th}$ reliable positions of a $4^{th}$ first to-be-encoded block, that is, located at a position corresponding to $b_3$ during the first time of transmission. $b_3$ is located at $65^{th}$ to $128^{th}$ reliable positions of a $3^{rd}$ first to-be-encoded block, that is, located at a position corresponding to $b_2$ during the first time of transmission. $b_4$ is located at $1^{th}$ to $64^{th}$ reliable positions of a $2^{nd}$ first to-be-encoded block, that is, located at a position corresponding to $b_1$ during the first time of transmission. It can be learned that for the second information bit block, an arrangement order of the four information bit subblocks of the second information bit block in the second to-be-encoded blocks is also reverse to an arrangement order of the four information bit subblocks of the information bit block in the first to-be-encoded blocks. It may be understood that an arrangement manner of 256 information bits in each of a third information bit block to a sixth information bit block is also similar, and details are not described herein again.

Optionally, if a value of K/Q is not an integer or is not a power of 2, rate matching further needs to be performed. It should be noted that the solution in this application is not closely related to which rate matching solution is actually used. Therefore, a general rate matching solution is used.

Optionally, the first order and the second order meet the following mapping relationship:

$$[A_1, A_2, \ldots, A_{2^P}] = [0, 1, \ldots, 0, a_1, a_2, \ldots, a_Q] F^{\otimes(J+P)},$$

where $a_q$ is any information bit subblock in Q information bit subblocks of any information bit block, $A_t$ is an information bit subblock corresponding to any mapped information bit subblock, F is a generator matrix of a polar code, J is a positive integer and meets $K/Q=2^J$, P is a positive integer and meets $2^{P-1} \leq Q \leq 2^P$, and t meets $1 \leq t \leq 2^P$.

Figure 8B:
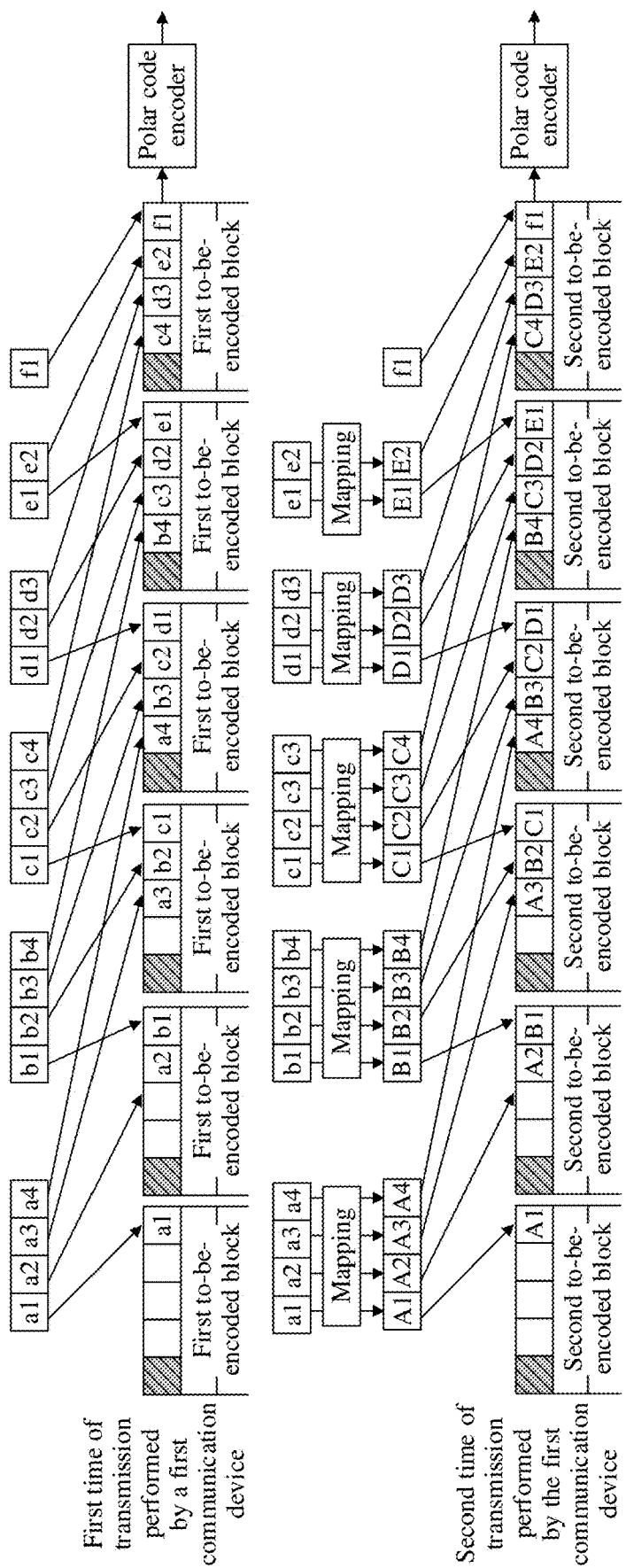
FIG. 8b is another schematic diagram of first to-be-encoded blocks and second to-be-encoded blocks according to an embodiment of this application.

FIG. 8b is a schematic diagram of second to-be-encoded blocks according to an embodiment of this application. For Q information bit subblocks in each information bit block, an arrangement order of information bit subblocks in the second to-be-encoded blocks shown in FIG. 8b is the same as the arrangement order of the information bit subblocks in the first to-be-encoded blocks shown in FIG. 5d, but each information bit subblock is a mapped information bit subblock, as shown in FIG. 8b. M=6, and Q=4.

For example, six information bit blocks in FIG. 8b are respectively ($a_1$, $a_2$, $a_3$, $a_4$), ($b_1$, $b_2$, $b_3$, $b_4$), ($c_1$, $c_2$, $c_3$, $c_4$), ($d_1$, $d_2$, $d_3$), ($e_1$, $e_2$), and ($f_1$). Because a quantity of information bit subblocks in each information bit block is not a power of 2, when the information bit block is processed, zero padding processing needs to be performed, so that a complete polar code generator matrix is used during mapping of the information bit block. It should be noted that if zero padding processing is not performed on the information bit block, a submatrix of the polar code generator matrix is used during mapping of the information bit block.

Because $2^{P-1} \leq Q \leq 2^P$, it may be determined that P=2. In this case, each of three mapped information bit blocks includes four information bit subblocks, and a relationship between the mapped information bit block and the information bit block before mapping meets the following relationship:

$$[A_1, A_2, A_3, A_4] = [a_1, a_2, a_3, a_4] * F$$

$$[B_1, B_2, B_3, B_4] = [b_1, b_2, b_3, b_4] * F$$

$$[C_1, C_2, C_3, C_4] = [c_1, c_2, c_3, c_4] * F$$

$$[D_1, D_2, D_3, D_4] = [0, d_1, d_2, d_3] * F$$

$$[E_1, E_2, E_3, E_4] = [0, 0, e_1, e_2] * F$$

The first communication device places the four information bit subblocks in each mapped information bit block into the Q second to-be-encoded blocks according to the first order, as shown in FIG. 8b.

S306: The first communication device separately performs polar code encoding on the M second to-be-encoded blocks to obtain M second code blocks.

S307: The first communication device sends the M second code blocks to the second communication device, and correspondingly, the second communication device receives the M second code blocks sent by the first communication device.

The first communication device may separately perform polar code encoding on the M second to-be-encoded blocks to obtain the M second code blocks.

It may be understood that, for analysis of a code rate of the second code block, refer to the analysis of the code rate of the first code block in the foregoing embodiment. Details are not described herein again.

Similarly, after encoding the information bits, the first communication device may perform constellation modulation on M second code block, and then send data obtained after the constellation modulation to the second communication device through a downlink data channel. Correspondingly, the second communication device receives the data obtained after the coding and modulation, and demodulates the received data obtained after the coding and modulation. The second communication device may combine and decode the received M first code blocks and the received M second code blocks to obtain original data transmitted by the first communication device. The original data transmitted by the first communication device is the plurality of information bits carried in the M first to-be-encoded blocks.

S308: The second communication device combines and decodes the M first code blocks and the M second code blocks to obtain decoded data.

After receiving data transmitted by the first communication device for the first time and data transmitted by the first communication device for the second time, the second communication device may combine and decode the data received during the two times of transmission. The combined decoding described in this embodiment is an interactive process. The second communication device first decodes the first code block, and may decode some parts; and then decodes the second code block, and may use the some pails decoded during decoding of the first code block when the second code block is decoded, and vice versa.

According to the Shannon second theorem, for the two times of transmissions, when a sum of channel capacities of the two times of transmission is greater than or equal to a code rate R, the second communication device may always implement reliable decoding on the first code block and the second code block in the combined decoding manner described in this embodiment.

Specifically, if the sum of channel capacities of the two times of transmission performed by the first communication device is greater than or equal to the code rate R, the second communication device obtains, through decoding, $k_1$ information bit subblocks $[a_1, a_2, \ldots, a_{k_1}]$ included in one information bit block carried in the first to-be-encoded block, where $k_1$ meets $1 \leq k_1 \leq Q$;

the second communication device obtains, through decoding, $k_2$ information bit subblocks $[a_Q, a_{Q-1}, \ldots, a_{Q-k_2+1}]$ included in information bit block carried in the second to-be-encoded block, where $k_2$ and $1 \leq k_2 \leq Q$ and $k_1 + k_2 \geq Q$; and the second communication device obtains Q information bit subblocks $[a_1, a_2, \ldots, a_Q]$ included in the information bit block.

For example, it is assumed that a channel capacity of the first time of transmission performed by the first communication device is greater than or equal to R/3, and a channel capacity of the second time of transmission is greater than or equal to 2R/3. In this case, a sum of channel capacities of the two times of transmission performed by the first communication device is greater than or equal to the code rate R, that is, correct decoding can be implemented during the two times of transmission.

Figure 8C:
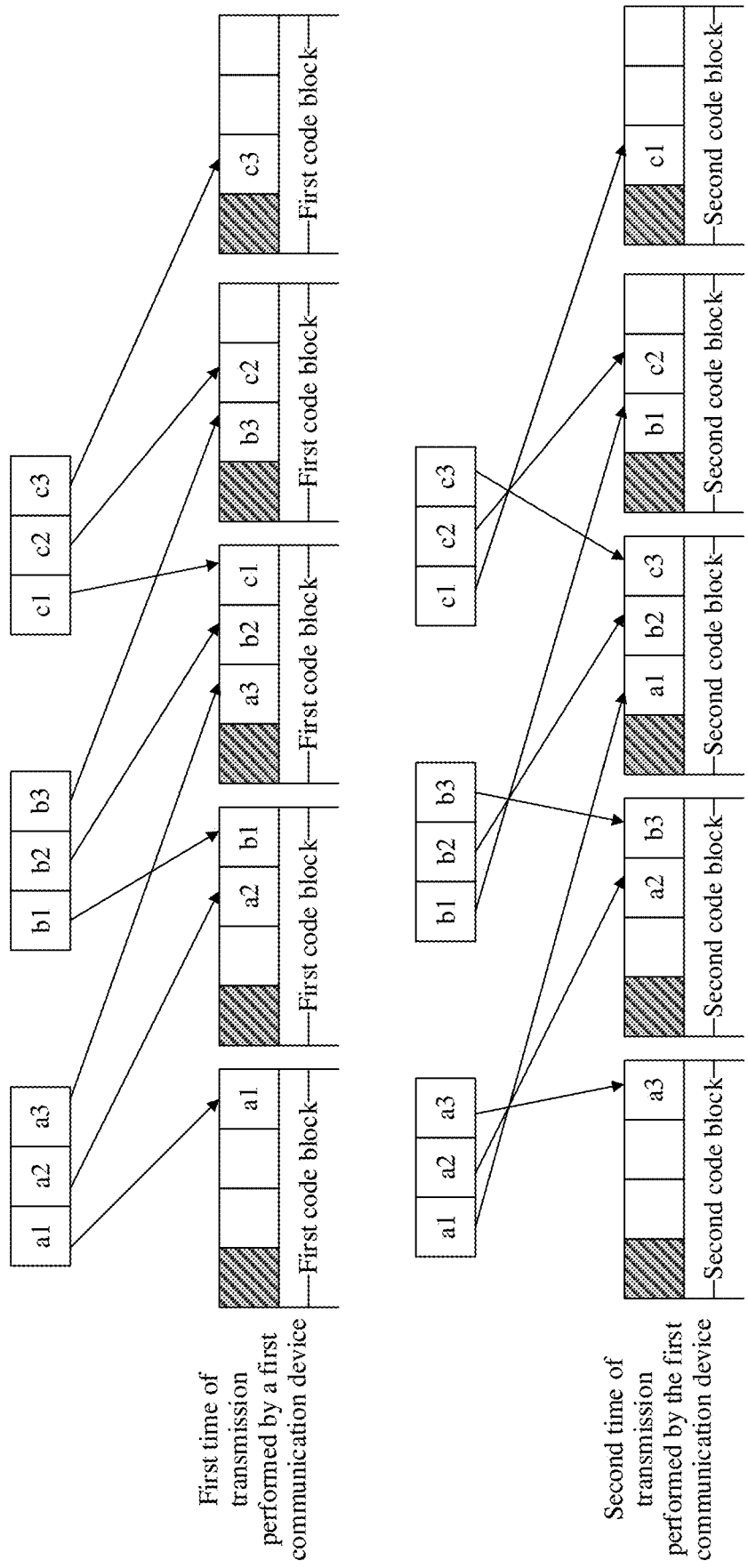
FIG. 8c is a schematic diagram of first code blocks and second code blocks according to an embodiment of this application.

First code blocks during the first time of transmission and second code blocks during the second time of transmission performed by the first communication device are shown in FIG. 8c. For the first time of transmission performed by the first communication device, code rates of a $1^{st}$ first code block and a $5^{th}$ first code block each are R/3, code rates of a $2^{nd}$ first code block and a $4^{th}$ first code block each are 2R/3, and a code rate of a $3^{rd}$ first code block is R. According to the Shannon second theorem, the code rate R/3 of each of the $1^{st}$ first code block and the $5^{th}$ first code block is less than or equal to a channel capacity R/3 of the first time of transmission. In this case, the $1^{st}$ first code block and the $5^{th}$ first code block may be decoded, that is, $a_1$ and $c_3$ may be decoded. However, it cannot be ensured that the remaining information bits are successfully decoded.

For the second time of transmission performed by the first communication device, code rates of a $1^{st}$ second code block and a $5^{th}$ second code block each are R/3, code rates of a $2^{nd}$ second code block and a $4^{th}$ second code block each are 2R/3, and a code rate of a $3^{rd}$ second code block is R. According to the Shannon second theorem, the code rate R/3 of each of the $1^{st}$ second code block and the $5^{th}$ second code block is less than or equal to a channel capacity 2R/3 of the second time of transmission. In this case, the $1^{st}$ second code block and the $5^{th}$ second code block may be decoded, that is, $a_3$ and $c_1$ may be decoded. Code rates of the $2^{nd}$ second code block and the $4^{th}$ second code block each are 2R/3, and are less than or equal to the channel capacity 2R/3 of the second time of transmission. In this case, the $2^{nd}$ second code block and the $4^{th}$ second code block may also be decoded, that is, $a_2$, $b_3$, $b_1$ and $c_2$ may be decoded. However, it cannot be ensured that the remaining information bits are successfully decoded.

After $a_3$ and $c_1$ are obtained, the code rate of the $3^{rd}$ first code block during the first time of transmission is reduced to R/3. According to the Shannon second theorem, because the channel capacity of the first transmission is greater than or equal to R/3, the $3^{rd}$ first code block may also be decoded, that is, $b_2$ may be decoded.

In conclusion, when the sum of channel capacities of the two times of transmission performed by the first communication device is greater than or equal to the code rate R, all information bits $a_1, a_2, a_3, b_1, b_2, b_3, c_1, c_2, c_3$ of the second time of transmission performed by the first communication device can be decoded, that is, reliable transmission of all information bits is implemented.

It should be noted that the combined decoding described in this application may further include the following special combined decoding: When the first communication device performs transmission for the first time, if the channel capacity is zero, the second communication device cannot decode any data. When the first communication device performs transmission for the second time, the channel capacity is greater than or equal to the code rate R. In this case, after the second time of transmission, the second communication device may decode all original data. It can be learned that in the foregoing special case, the sum of channel capacities of the two times of transmission is greater than or equal to the code rate R, and a condition for combined decoding is also met, and finally correct decoding is also implemented.

Figure 9:
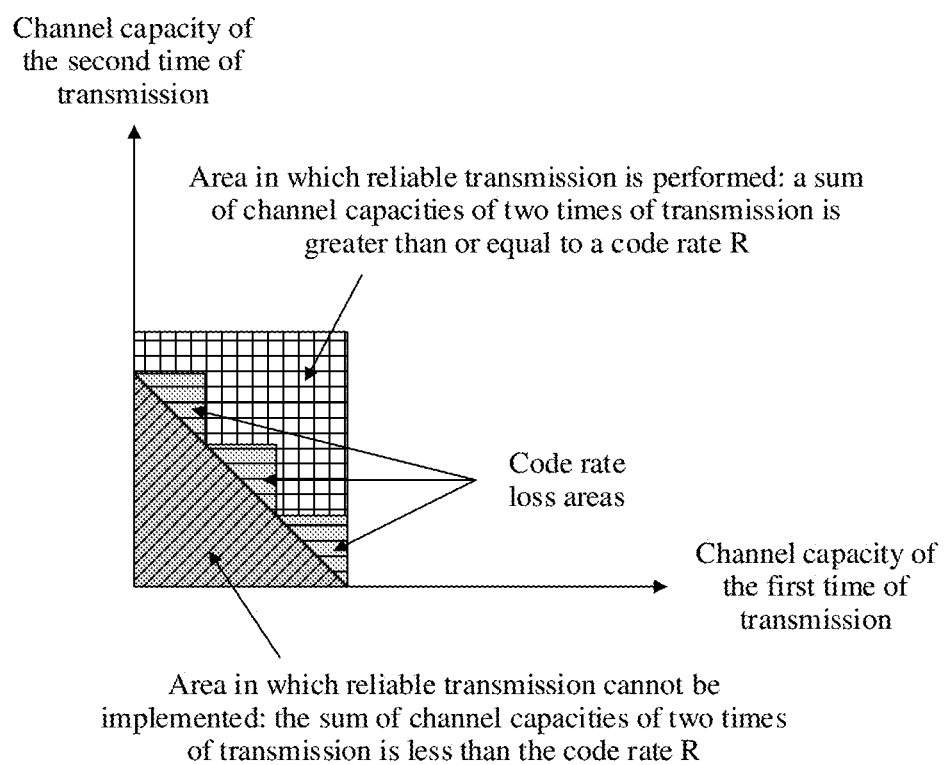
FIG. 9 is a schematic diagram of an area in which successful decoding is performed and code rate loss areas during two times of transmission according to an embodiment of this application.

The following analyzes and describes an area in which decoding can be successfully performed and code rate loss areas during the two times of transmission performed by the first communication device. FIG. 9 is a schematic diagram of an area in which decoding can be successfully performed and code rate loss areas when Q=3 during two times of transmission performed by the first communication device. A horizontal coordinate indicates a channel capacity of the first time of transmission, and a vertical coordinate indicates a channel capacity of the second time of retransmission. An oblique shadow area indicates that a sum of channel capacities of the two times of transmissions in this area is less than a code rate R, and reliable transmission cannot be implemented. A part other than the oblique shadow area is an area in which reliable transmission can be implemented, and a horizontal shadow area represents the code rate loss area.

An embodiment of this application provides a data processing method. The method is implemented by interaction between a first communication device and a second communication device. When the first communication device initially transmits the M first code blocks to the second communication device, a plurality of information bit subblocks in the M first code blocks are arranged according to the first order. This helps the second communication device correctly perform decoding. If the second communication device fails in decoding, the first communication device may retransmit the M second code blocks to the second communication device. A plurality of information bit subblocks in the M second code blocks are arranged according to the second order, and the second order and the first order meet the mapping relationship. The foregoing arrangement manner of the plurality of information bit subblocks helps the second communication device correctly perform decoding based on the first code block and the second code block, that is, correct decoding can be performed through the two times of transmission. The first communication device can implement transmission close to a channel capacity provided that the device meets a condition that a sum of channel capacities of a plurality of times of transmission is greater than or equal to an information transmission rate.

Figure 10A:
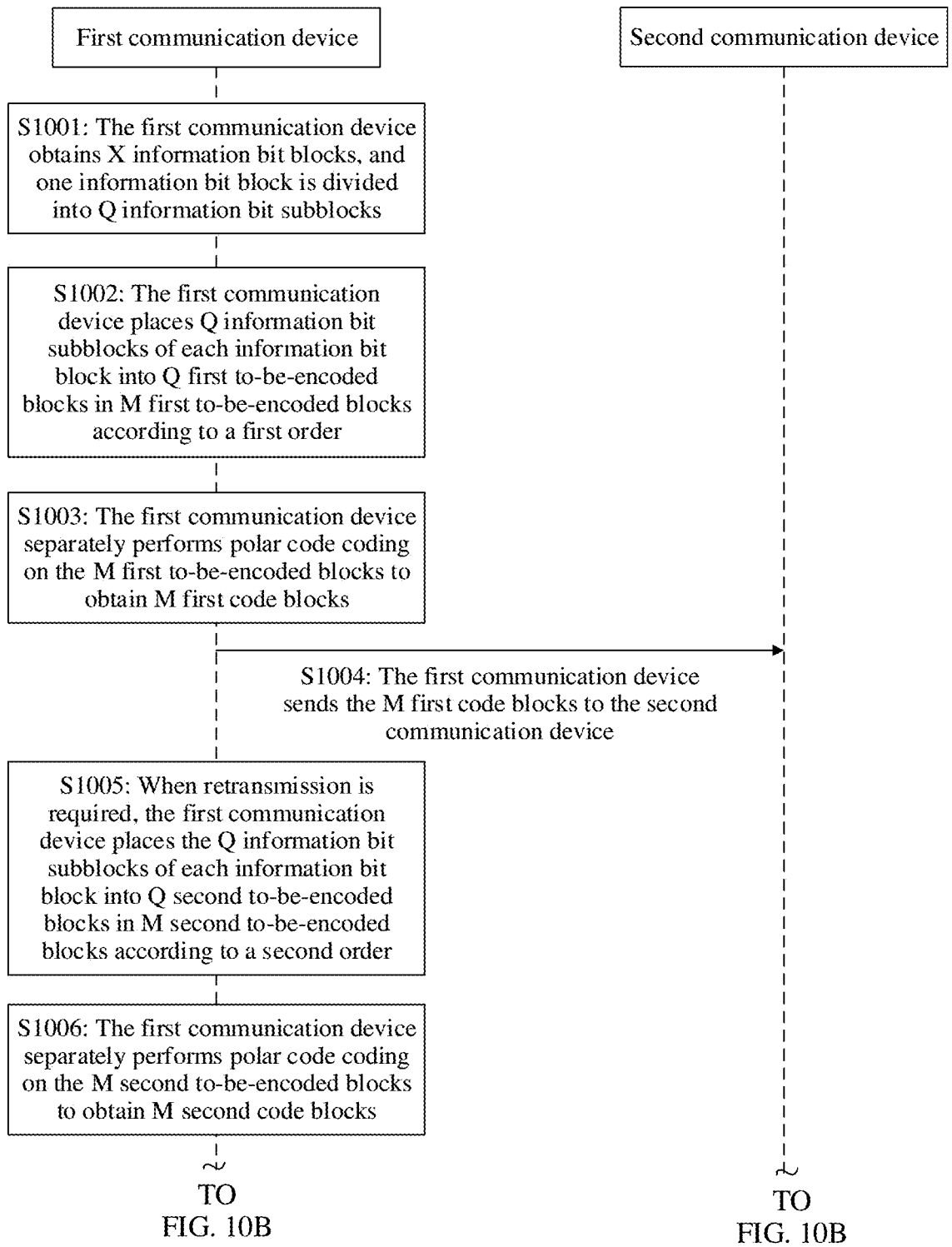
FIG. 10A and FIG. 10B are a schematic flowchart of another data processing method according to an embodiment of this application.
Figure 10B:
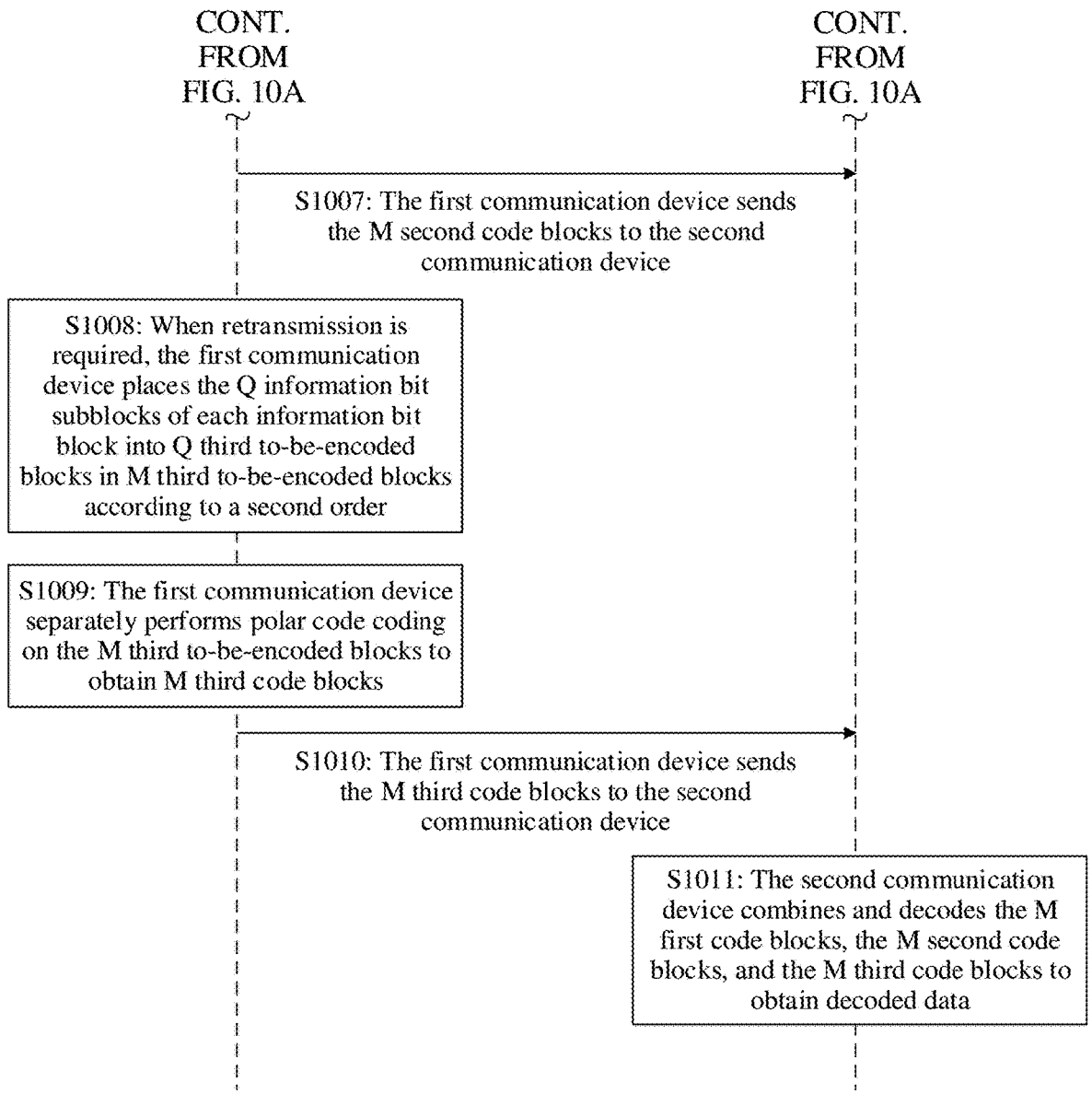

Based on the description in the embodiment shown in FIG. 3, the following describes in detail a case in which the first communication device needs to perform transmission for three times to perform correct decoding. FIG. 10A and FIG. 10B show another data processing method according to an embodiment of this application. The data processing method may be performed by interaction between a first communication device and a second communication device, and includes S1001 to S1011. Specific implementations of S1001 to S1007 are similar to those of S301 to S307 in the embodiment in FIG. 3, and details are not described herein again. S1008 to S1011 specifically include:

S1008: When retransmission is required, the first communication device places the Q information bit subblocks of each information bit block into Q third to-be-encoded blocks in M third to-be-encoded blocks according to a second order.

According to the description in S305, the second order and the first order meet a mapping relationship. The second order is that the $q^{th}$ information bit subblock of each information bit block is located at $((Q-q)*K/Q+1)^{th}$ to $(Q-q+1)*K/Q)^{th}$ reliable positions of the second to-be-encoded blocks. Alternatively, the first order and the second order meet the following mapping relationship:

$$[A_1, A_2, \ldots, A_2^P] = [0, 0, \ldots, 0, a_1, a_2, \ldots, a_Q] F^{\otimes (J+P)}$$

When the first communication device performs the third time of transmission, the first communication device places the Q information bit subblocks of each information bit block into the Q third to-be-encoded blocks in the M third to-be-encoded blocks according to the second order.

Figure 11A:
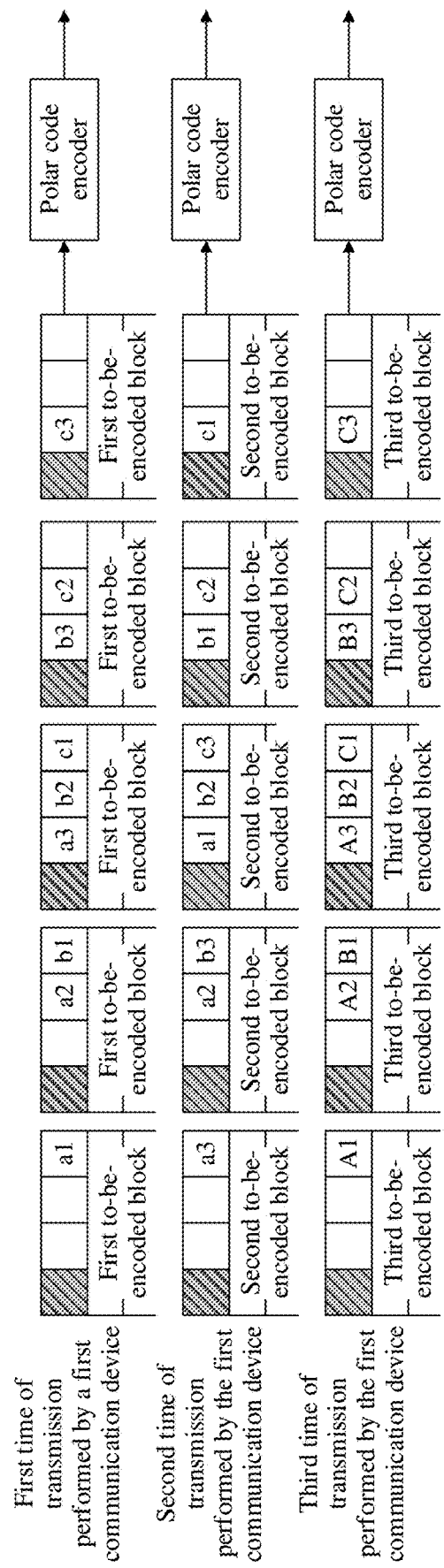
FIG. 11a is a schematic diagram of to-be-encoded blocks during three times of transmission according to an embodiment of this application.

It should be noted that, to improve a probability of successful decoding, the second order used by the first communication device during the second time of transmission is different from the second order used during the third time of transmission. FIG. 11a is a schematic diagram of to-be-encoded blocks during three times of transmission according to an embodiment of this application. If the second order used by the first communication device during the second time of transmission is a reverse order, the second order used by the first communication device during the third time of transmission is an order of mapped information bit blocks being placed into the third to-be-encoded blocks according to the first order.

Figure 11B:
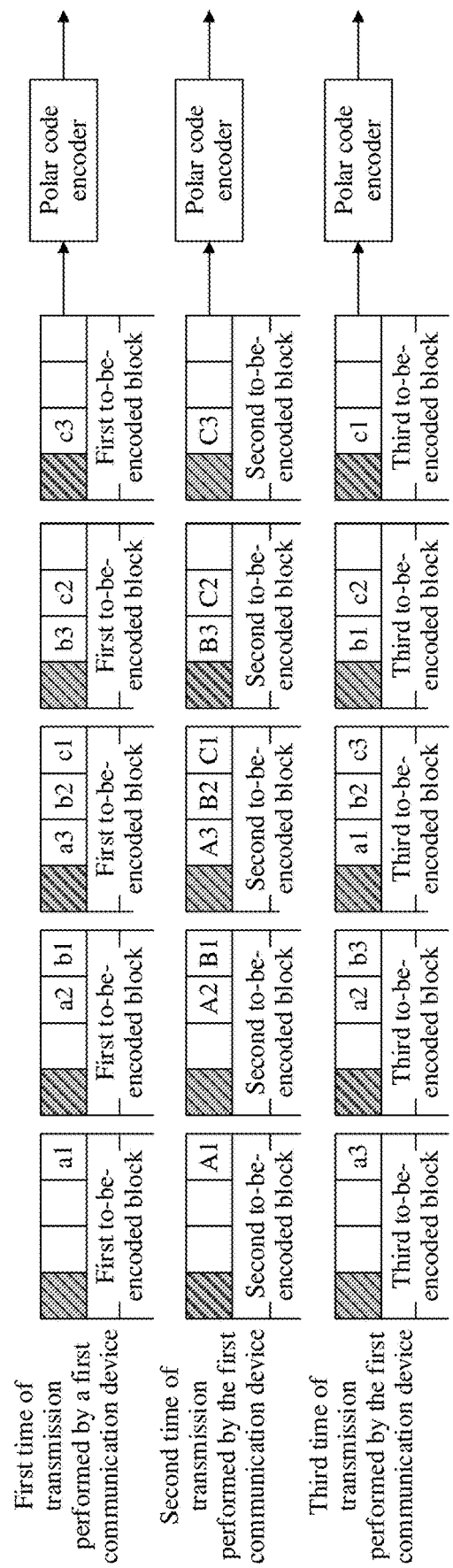
FIG. 11b is another schematic diagram of to-be-encoded blocks during three times of transmission according to an embodiment of this application.

FIG. 11b is another schematic diagram of to-be-encoded blocks during three times of transmission according to an embodiment of this application. The second order used by the first communication device during the second time transmission is an order of mapped information bit blocks being placed into the second to-be-encoded blocks according to the first order. In this case, the second order used by the first communication device during the third time of transmission is a reverse order.

S1009: The first communication device separately performs polar code encoding on the M third to-be-encoded blocks to obtain M third code blocks.

S1010: The first communication device sends the M third code blocks to the second communication device.

The first communication device may separately perform polar code encoding on the M third to-be-encoded blocks to obtain the M third code blocks. For a process of performing polar code encoding on the third code block, refer to the descriptions of the specific implementation of performing polar code encoding on the first code block in the embodiment in FIG. 3. Details are not described herein again. It may be understood that, for analysis of a code rate of the third code block, still refer to the analysis of the code rate of the first code block in the foregoing embodiment. Details are not described herein again.

Optionally, after encoding the information bits, the first communication device may perform constellation modulation on the M third code block, and then send data obtained after the constellation modulation to the second communication device through a downlink data channel. Correspondingly, the second communication device receives the data obtained after the coding and modulation, and demodulates the received data obtained after the coding and modulation. The second communication device may decode the received M first code blocks, the received M second code blocks, and the received M third code blocks to obtain original data transmitted by the first communication device. The original data transmitted by the first communication device is the plurality of information bits carried in the M first to-be-encoded blocks.

S1011: The second communication device combines and decodes the M first code blocks, the M second code blocks, and the M third code blocks to obtain decoded data.

After receiving data transmitted by the first communication device for the first time, data transmitted by the first communication device for the second time, and data transmitted by the first communication device for the third time, the second communication device may combine and decode the data received during the three times of transmission. Similar to the combined decoding after two times of transmission, the combined decoding after three times of transmission is also an interactive process. The second communication device first decodes the first code block, and may decode some parts; then decodes the second code block, and may use the some parts decoded during decoding of the first code block when the second code block is decoded; and finally decodes the third code block, and may use the some parts decoded during decoding of the first code block and the second code block when the third code block is decoded, and vice versa.

According to the Shannon second theorem, for the three times of transmissions, when a sum of channel capacities of the three times of transmission is greater than or equal to a code rate R, the second communication device may always implement reliable decoding on the first code block, the second code block, and the third code block in the combined decoding manner described in this embodiment.

Specifically, if the sum of channel capacities of the three times of transmission performed by the first communication device is greater than or equal to the code rate R, the second communication device obtains, through decoding, $k_1$ information bit subblocks $[a_1, a_2, \ldots, a_{k_1}]$ included in one information bit block carried in the first to-be-encoded block, where $k_1$ meets $1 \leq k_1 \leq Q$;

the second communication device obtains, through decoding, $k_2$ information bit subblocks $[a_Q, a_{Q-1}, \ldots, a_{Q-k_2+1}]$ included in information bit block carried in the second to-be-encoded block, where $k_1$ and $k_2$ meet $1 \leq k_2 \leq Q$ and $k_1 + k_2 < Q$;

the second communication device obtains, through decoding, $k_3$ information bit subblocks $[A_1, A_2, \ldots, A_{k_3}]$ included in information bit block carried in the third to-be-encoded block, where $k_3$ meets $1 \leq k_3 \leq Q$, and $k_1$, $k_2$, and $k_3$ meet $k_1 + k_2 + k_3 \geq Q$;

the second communication device obtain, according to the mapping relationship between the first order and the second order, $k_3$ information bit subblocks $[a_{k_1+1}, a_{k_1+1}, \ldots, a_{Q-k_2}]$ corresponding to the $k_3$ information bit subblocks before mapping; and the second communication device obtains Q information bit subblocks $[a_1, a_2, \ldots, a_Q]$ included in the information bit block.

For example, it is assumed that a channel capacity of the first time of transmission performed by the first communication device is greater than or equal to R/3, a channel capacity of the second time of transmission is greater than or equal to R/3, and a channel capacity of the third time of transmission is greater than or equal to R/3, a sum of channel capacities of the three times of transmission performed by the first communication device is greater than or equal to the code rate R, that is, correct decoding can be implemented during the three times of transmission.

Figure 12A:
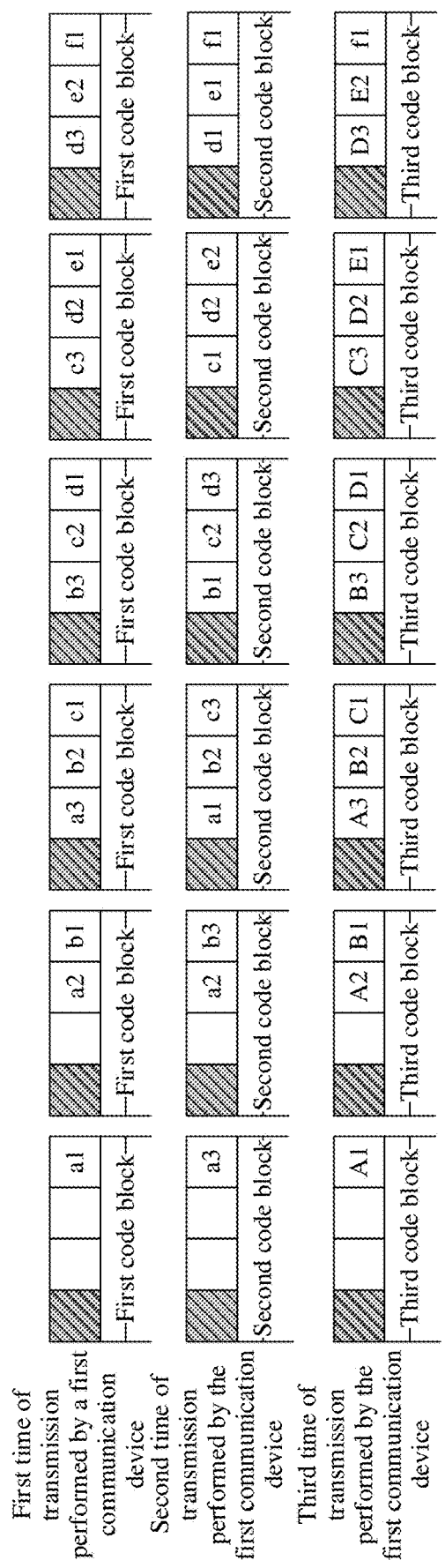
FIG. 12a to FIG. 12c are schematic diagrams of code blocks during three times of transmission at different code rate quantization orders according to an embodiment of this application.

FIG. 12a is a schematic diagram of first code blocks transmitted by the first communication device for the first time, second code blocks transmitted by the first communication device for the second time, and third code blocks transmitted by the first communication device for the third time according to an embodiment of this application. Q=3. An arrangement order of the first code blocks in FIG. 12a is the same as the arrangement order of the first code blocks in FIG. 7b. For Q information bit subblocks in each information bit block, an arrangement order of information bit subblocks in the second code blocks in FIG. 12a is a reverse order of the arrangement order of the information bit subblocks in the first code blocks in FIG. 7b, and information bit subblocks in the third code blocks are information bit subblocks obtained after the information bit subblocks in the first code blocks in FIG. 7b are mapped and are arranged according to the first order.

For the mapping relationship in FIG. 12a, because a quantity of information bit subblocks in each information bit block is not a power of 2, when the information bit subblock is processed, zero padding processing needs to be performed, so that a complete polar code generator matrix is used during mapping of the information bit block. It should be noted that if zero padding processing is not performed on the information bit block, a submatrix of the polar code generator matrix is used during mapping of the information bit block.

Because $2^{P-1} \leq Q \leq 2^P$, it may be determined that P=2. A relationship between the mapped information bit block and the information bit block before mapping meets the following relationship:

$$[A_1, A_2, A_3, A_4] = [0, a_1, a_2, a_3] * F$$

$$[B_1, B_2, B_3, B_4] = [0, b_1, b_2, b_3] * F$$

$$[C_1, C_2, C_3, C_4] = [0, c_1, c_2, c_3] * F$$

$$[D_1, D_2, D_3, D_4] = [0, d_1, d_2, d_3] * F$$

$$[E_1, E_2, E_3, E_4] = [0, 0, e_1, e_2] * F$$

For the first time of transmission performed by the first communication device, a code rate of a $1^{st}$ first code block is R/3, a code rate of a $2^{nd}$ first code block is 2R/3, and code rates of a $3^{rd}$ first code block to a $6^{th}$ first code block each are R. According to the Shannon second theorem, if the code rate R/3 of the $1^{st}$ first code block is less than or equal to the channel capacity of the first time of transmission, the $1^{st}$ first code block can be decoded, that is, $a_1$ can be decoded. However, it cannot be ensured that the remaining information bits are successfully decoded.

For the second time of transmission performed by the first communication device, a code rate of a $1^{st}$ second code block is R/3, a code rate of a $2^{nd}$ second code block is 2R/3, and code rates of a $3^{rd}$ second code block to a $6^{th}$ second code block each are R. According to the Shannon second theorem, if the code rate R/3 of the $1^{st}$ second code block is less than or equal to the channel capacity of the second time of transmission, the $1^{st}$ second code block can be decoded, that is, $a_3$ can be decoded. However, it cannot be ensured that the remaining information bits are successfully decoded.

For the third time of transmission performed by the first communication device, a code rate of a $1^{st}$ third code block is R/3, a code rate of a $2^{nd}$ third code block is 2R/3, and code rates of a $3^{rd}$ third code block to a $6^{th}$ third code block each are R. According to the Shannon second theorem, if the code rate R/3 of the $1^{st}$ third code block is less than or equal to the channel capacity of the third time of transmission, the $1^{st}$ third code block can be decoded, that is, $A_t$ can be decoded. However, it cannot be ensured that the remaining information bits are successfully decoded.

After obtaining $a_1$, $a_3$, and $A_t$, the first communication device may obtain, through decoding, $a_2$, $A_2$, and $A_4$ according to an inter-bit relational expression $[A_1, A_2, A_3, A_4]=[0, a_1, a_2, a_3]*F$. After $a_2$ is obtained through decoding, $A_3$ may also be obtained through decoding.

After $a_2$ and $A_2$ are obtained, the code rate of the $2^{nd}$ first code block in FIG. 12a is reduced to R/3. According to the Shannon second theorem, if the code rate R/3 of the $2^{nd}$ first code block is less than or equal to the channel capacity of the first time of transmission, the $2^{nd}$ first code block can be decoded, that is, $b_1$ can be decoded. Similarly, the code rate of the $2^{nd}$ second code block is reduced to R/3, and the code rate of the $2^{nd}$ third code block is reduced to R/3. In this case, $b_3$ and $B_1$ may also be decoded.

After obtaining $b_1$, $b_3$, and $B_1$, the first communication device may obtain, through decoding, $b_2$, $B_2$, $B_3$, and $B_4$ according to an inter-bit relational expression $[B_1, B_2, B_3, B_4]=[0, b_1, b_2, b_3]*F$.

After $a_1$, $a_3$, $A_3$, $b_2$ and $B_2$ are obtained, the code rate of the $3^{rd}$ first code block in FIG. 12a is reduced to R/3. According to the Shannon second theorem, if the code rate R/3 of the $3^{rd}$ first code block is less than or equal to the channel capacity of the first time of transmission, the $3^{rd}$ first code block can be decoded, that is, $c_1$ can be decoded. Similarly, the code rate of the $3^{rd}$ second code block is reduced to R/3, and the code rate of the $3^{rd}$ third code block is reduced to R/3. In this case, $c_3$ and $C_1$ may also be decoded.

After obtaining $c_1$, $c_3$, and $C_1$, the first communication device may obtain, through decoding, $c_2$, $C_2$, $C_3$, and $C_4$ according to an inter-bit relational expression $[C_1, C_2, C_3, C_4]=[0, c_1, c_2, c_3]*F$.

After $b_1$, $b_3$, $B_3$, $c_2$ and $c_2$ are obtained, the code rate of the $4^{th}$ first code block in FIG. 12a is reduced to R/3. According to the Shannon second theorem, if the code rate R/3 of the $4^{th}$ first code block is less than or equal to the channel capacity of the first time of transmission, the $4^{th}$ first code block can be decoded, that is, $d_1$ can be decoded. Similarly, the code rate of the $4^{th}$ second code block is reduced to R/3, and the code rate of the $4^{th}$ third code block is reduced to R/3. In this case, $d_3$ and $D_1$ may also be decoded.

After obtaining $d_1$, $d_3$, and $D_1$, the first communication device may obtain, through decoding, $d_2$, $D_2$, $D_3$, and $D_4$ according to an inter-bit relational expression $[D_1, D_2, D_3, D_4]=[0, d_1, d_2, d_3]*F$.

After $c_1$, $c_3$, $C_3$, $d_2$ and $D_2$ are obtained, the code rate of the $5^{th}$ first code block in FIG. 12a is reduced to R/3. According to the Shannon second theorem, if the code rate R/3 of the $5^{th}$ first code block is less than or equal to the channel capacity of the first time of transmission, the $5^{th}$ first code block can be decoded, that is, $e_1$ can be decoded. Similarly, the code rate of the $5^{th}$ second code block is reduced to R/3, and the code rate of the $5^{th}$ third code block is reduced to R/3. In this case, $e_2$ and $E_1$ may also be decoded.

After obtaining $e_1$, $e_2$, and $E_1$, the first communication device may obtain, through decoding, $E_2$ according to an inter-bit relational expression $[E_1, E_2, E_3, E_4]=[0,0, e_1, e_2]*F$. After $d_3$ and $e_2$ are obtained, the code rate of the $6^{th}$ first code block in FIG. 12a is reduced to R/3. According to the Shannon second theorem, if the code rate R/3 of the $6^{th}$ first code block is less than or equal to the channel capacity of the first time of transmission, the $6^{th}$ first code block can be decoded, that is, $f_1$ can be decoded.

In conclusion, when the sum of channel capacities of the three times of transmission performed by the first communication device is greater than or equal to the code rate R, all information bits $a_1$, $a_2$, $a_3$, $b_1$, $b_2$, $b_3$, $c_1$, $c_2$, $c_3$, $d_1$, $d_2$, $d_3$, $e_1$, $e_2$, $f_1$ of the third time of transmission performed by the first communication device can be decoded, that is, reliable transmission of all information bits is implemented.

Figure 12B:
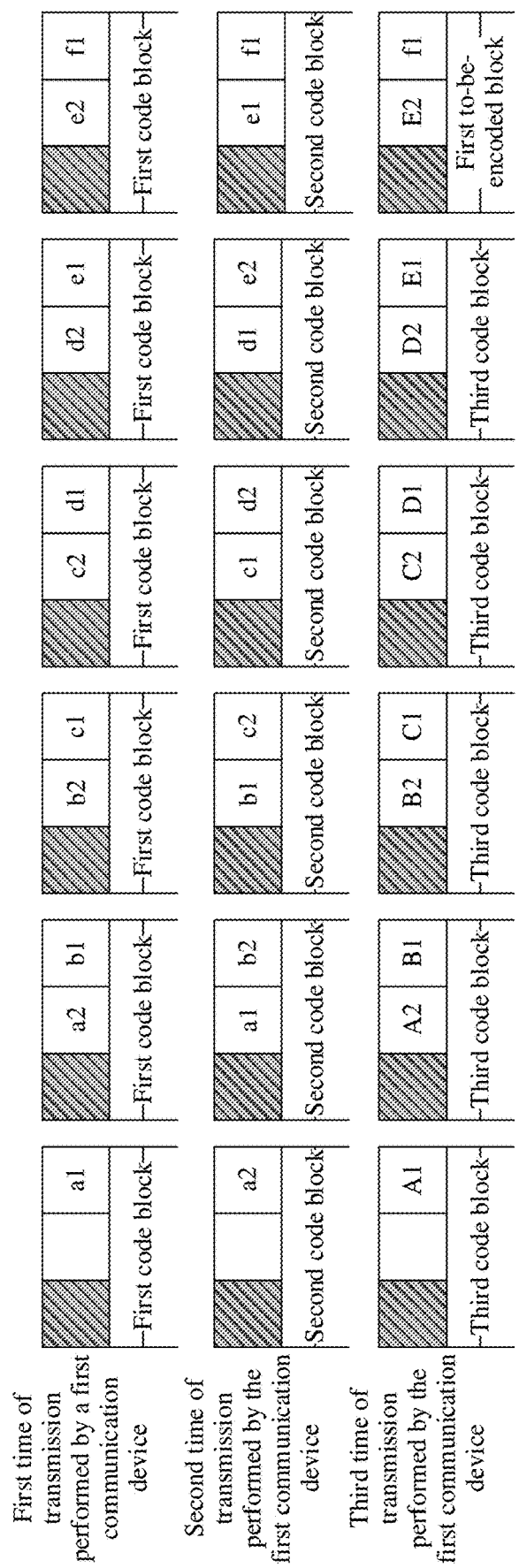

For another example, FIG. 12b is another schematic diagram of first code blocks transmitted by the first communication device for the first time, second code blocks transmitted by the first communication device for the second time, and third code blocks transmitted by the first communication device for the third time according to an embodiment of this application. Q=2. An arrangement order of the first code blocks in FIG. 12b is the same as the arrangement order of the first code blocks in FIG. 7c. For Q information bit subblocks in each information bit block, an arrangement order of information bit subblocks in the second code blocks in FIG. 12b is a reverse order of the arrangement order of the information bit subblocks in the first code blocks in FIG. 7c, and information bit subblocks in the third code blocks are information bit subblocks obtained after the information bit subblocks in the first code blocks in FIG. 7c are mapped and are arranged according to the first order.

For the mapping relationship in FIG. 12b, a relationship between each mapped information bit block and each information bit block before mapping meets the following relationship:

$[A_1,A_2]=[a_1,a_2]*F$ $[B_1,B_2]=[b_1,b_2]*F$ $[C_1,C_2]=[c_1,c_2]*F$ $[D_1,D_2]=[d_1,d_2]*F$ $[E_1,E_2]=[e_1,e_2]*F$

Figure 12C:
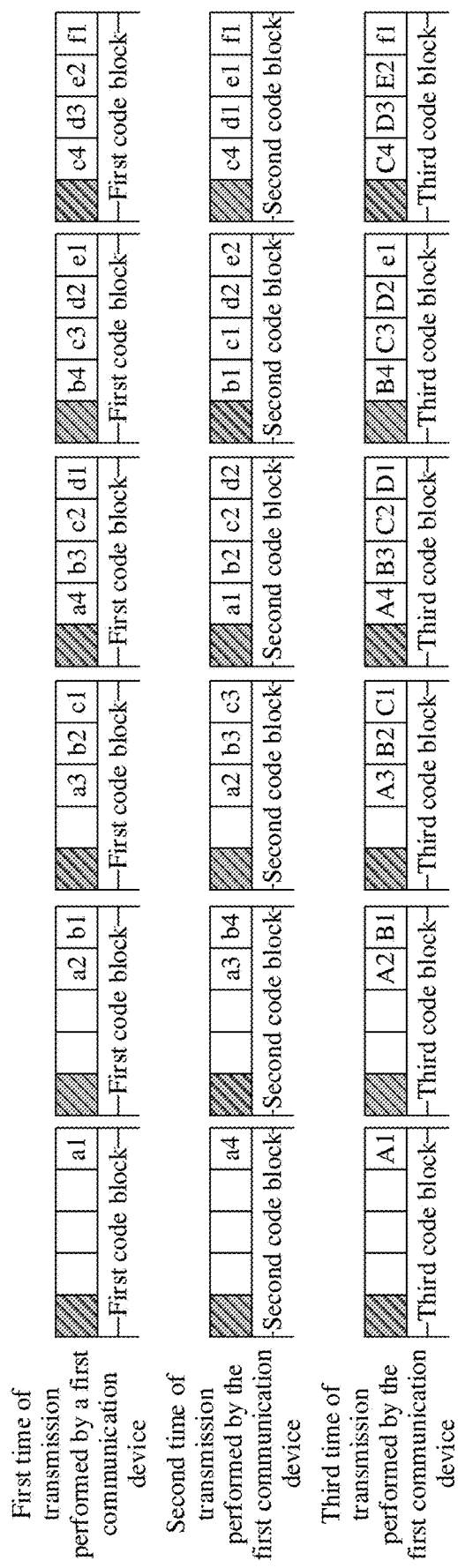

For another example, FIG. 12C is another schematic diagram of first code blocks transmitted by the first communication device for the first time, second code blocks transmitted by the first communication device for the second time, and third code blocks transmitted by the first communication device for the third time according to an embodiment of this application. Q=4. An arrangement order of the first code blocks in FIG. 12b is the same as the arrangement order of the first code blocks in FIG. 7c. For Q information bit subblocks in each information bit block, an arrangement order of information bit subblocks in second to-be-encoded code blocks in FIG. 12b is a reverse order of the arrangement order of the information bit subblocks in the first to-be-encoded code blocks in FIG. 7c, and information bit subblocks in third to-be-encoded code blocks are information bit subblocks obtained after the information bit subblocks in the first to-be-encoded code blocks in FIG. 7c are mapped and are arranged according to the first order.

For the mapping relationship in FIG. 12c, because an information bit block on which special processing is performed is included in FIG. 12c, and a quantity of information bit subblocks in the information bit block is not a power of 2, when the information bit subblock is processed, zero padding processing needs to be performed, so that a complete polar code generator matrix is used during mapping of the information bit block. It should be noted that if zero padding processing is not performed on the information bit block, a submatrix of the polar code generator matrix is used during mapping of the information bit block.

Because $2^{P-1} \leq Q \leq 2^P$, it may be determined that P=2. A relationship between the mapped information bit block and the information bit block before mapping meets the following relationship:

$$[A_1,A_2,A_3,A_4]=[a_1,a_2,a_3,a_4]*F$$

$$[B_1,B_2,B_3,B_4]=[b_1,b_2,b_3,b_4]*F$$

$$[C_1,C_2,C_3,C_4]=[c_1,c_2,c_3,c_4]*F$$

$$[D_1,D_2,D_3,D_4]=[0,d_1,d_2,d_3]*F$$

$$[E_1,E_2,E_3,E_4]=[0,0,e_1,e_2]*F$$

It may be understood that, a condition for correct decoding in the three times of transmission shown in FIG. 12b and FIG. 12c is also that a sum of channel capacities in the three times of transmission is greater than or equal to a code rate R. In this case, the second communication device may always implement reliable decoding on the first code block, the second code block, and the third code block in the combined decoding manner described in this embodiment. For the decoding process of the three times of transmission shown in FIG. 12b and FIG. 12C, refer to descriptions of specific implementations in the embodiment shown in FIG. 12a. Details are not described herein again.

An embodiment of this application provides a data processing method. The method is implemented by interaction between a first communication device and a second communication device. When the first communication device initially transmits the M first code blocks to the second communication device, a plurality of information bit subblocks in the M first code blocks are arranged according to the first order. This helps the second communication device correctly perform decoding. If the second communication device fails in decoding, the first communication device may retransmit the M second code blocks to the second communication device. A plurality of information bit subblocks in the M second code blocks are arranged according to the second order, and the second order and the first order meet the mapping relationship. If the second communication device still fails in decoding, the first communication device may further retransmit the M third code blocks to the second communication device. An arrangement manner of a plurality of information bit subblocks in the third code blocks is associated with an arrangement manner of a plurality of information bit subblocks in the second code blocks. The foregoing arrangement manner of the plurality of information bit subblocks helps the second communication device correctly perform decoding based on the first code block, the second code block, and the third code block, that is, correct decoding can be performed through the three times of transmission. The first communication device can implement transmission close to a channel capacity provided that the device meets a condition that a sum of channel capacities of a plurality of times of transmission is greater than or equal to an information transmission rate.

Based on the description in the embodiment shown in FIG. 3, the following describes in detail a case in which the first communication device needs to perform transmission for four or more times to perform correct decoding. For ease of description, the following examples are described by using an example in which the first communication device needs to perform four times of transmission. It may be understood that when the first communication device needs to perform more than four times of transmission, refer to a specific implementation of the four times of transmission.

Figure 13A:
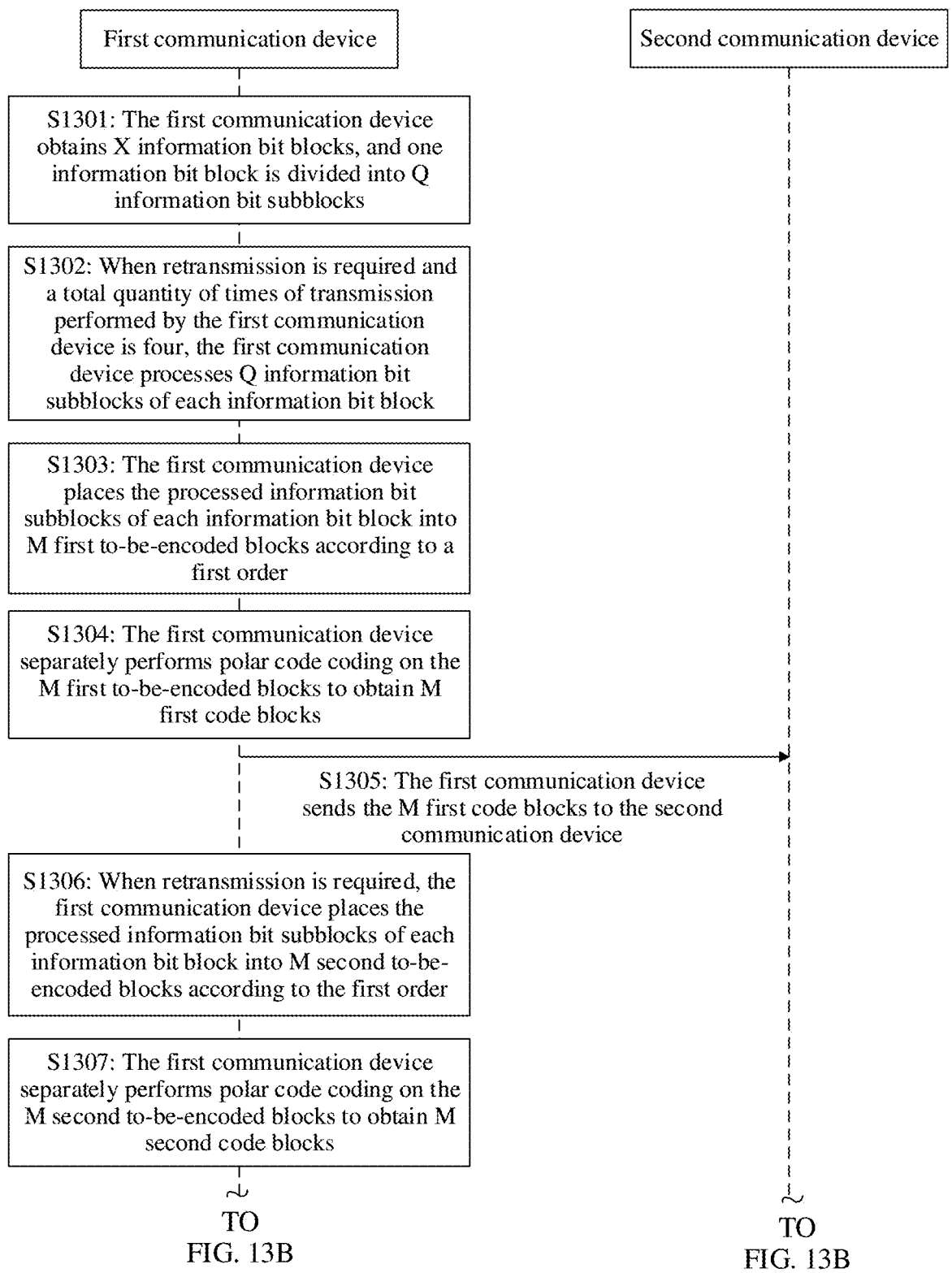
FIG. 13A and FIG. 13B are a schematic flowchart of another data processing method according to an embodiment of this application.
Figure 13B:
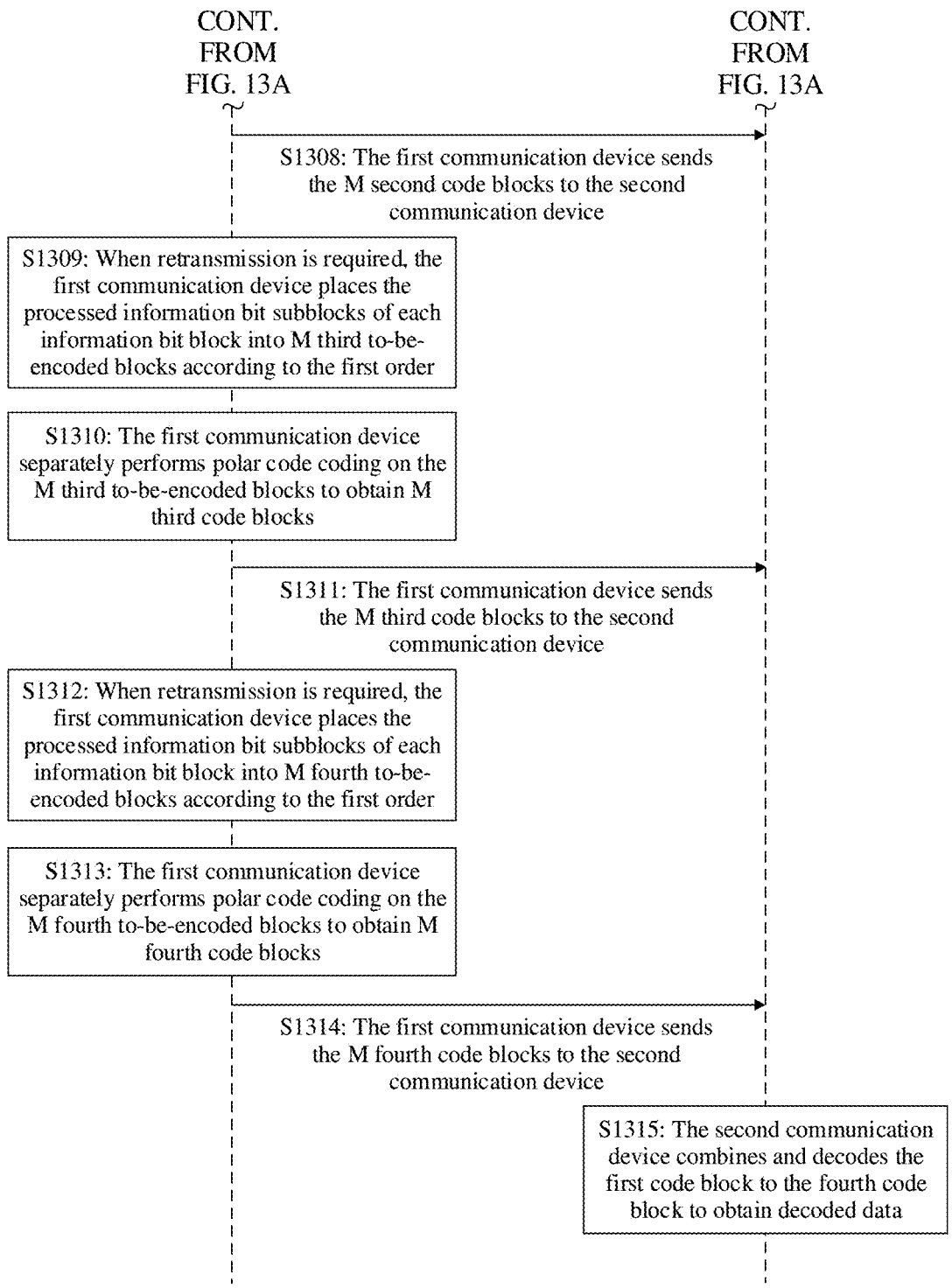

Refer to FIG. 13A and FIG. 13B, in the example shown in FIG. 13A and FIG. 13B, it is assumed that a total quantity of times of transmission performed by the first communication device is four. The data processing method may be performed between a first communication device and a second communication device through interaction, and specifically includes the following steps:

S1301: The first communication device obtains X information bit blocks, and one information bit block is divided into Q information bit subblocks.

S1302: When retransmission is required and a total quantity of times of transmission performed by the first communication device is four, the first communication device processes Q information bit subblocks of each information bit block.

When the quantity of times of transmission performed by the first communication device is four, because there is no UDM matrix in a binary field, processing performed by the first communication device on the information bit subblocks cannot be performed in the binary field. In this case, when processing each information bit block, the first communication device may map each information bit block [$a_1$, $a_2$, . . . , $a_Q$] from the binary field to a $2^w$ number system field, and any mapped information bit block meets [$\bar{a}_1$, $\bar{a}_2$, . . . , $\bar{a}_Q$], $\bar{a}_q$ is any information bit subblock in any information bit block after being mapped from the binary field to the $2^w$ number system field, $\bar{a}_q$ is a $2^w$ number system sequence whose length is K/wQ, and w is a positive integer greater than 1.

Then, the first communication device converts the mapped [$\bar{a}_1$, $\bar{a}_2$, . . . , $\bar{a}_Q$] by using a universal decoding matrix (universal decoding matrix, UDM). The any mapped information bit block and a converted corresponding information bit block meet the following relationship:

$$[\bar{A}_{n,1},\bar{A}_{n,2}, \ldots ,\bar{A}_{n,Q}]=[\bar{a}_1,\bar{a}_2, \ldots ,\bar{a}_Q]*H_n, \text{ where}$$

$\bar{A}_{n,q}$ is a corresponding information bit subblock after $\bar{a}_q$ is converted, $H_n$ is a UDM of K/w×K/w in the $2^w$ number system field, n indicates an $n^{th}$ time of transmission, n meets n∈[1, 2, . . . , N], N is a total quantity of times of transmission performed by the first communication device, and N is a positive integer greater than 3.

The first communication device performs reverse mapping on [$\bar{A}_{n,1}$, $\bar{A}_{n,2}$, . . . , $\bar{A}_{n,Q}$] to obtain a corresponding reverse-mapped information bit block, and the reverse-mapped information bit block meets [$A_{n,1}$, $A_{n,2}$, . . . , $A_{n,Q}$]. Reverse-mapped $A_{n,Q}$ is a binary sequence whose length is K/Q.

It can be learned that according to the foregoing processing procedure, when performing four or more times of transmission, the first communication device may process the information bit subblocks, and then perform subsequent sorting and coding.

S1303: The first communication device places the processed information bit subblocks of each information bit block into M first to-be-encoded blocks according to a first order.

S1304: The first communication device separately performs polar code encoding on the M first to-be-encoded blocks to obtain M first code blocks.

S1305: The first communication device sends the M first code blocks to the second communication device.

S1306: When retransmission is required, the first communication device places the processed information bit subblocks of each information bit block into M second to-be-encoded blocks according to the first order.

S1307: The first communication device separately performs polar code encoding on the M second to-be-encoded blocks to obtain M second code blocks.

S1308: The first communication device sends the M second code blocks to the second communication device.

S1309: When retransmission is required, the first communication device places the processed information bit subblocks of each information bit block into M third to-be-encoded blocks according to the first order.

S1310: The first communication device separately performs polar code encoding on the M third to-be-encoded blocks to obtain M third code blocks.

S1311: The first communication device sends the M third code blocks to the second communication device.

S1312: When retransmission is required, the first communication device places the processed information bit subblocks of each information bit block into M fourth to-be-encoded blocks according to the first order.

S1313: The first communication device separately performs polar code encoding on the M fourth to-be-encoded blocks to obtain M fourth code blocks.

S1314: The first communication device sends the M fourth code blocks to the second communication device.

Figure 14:
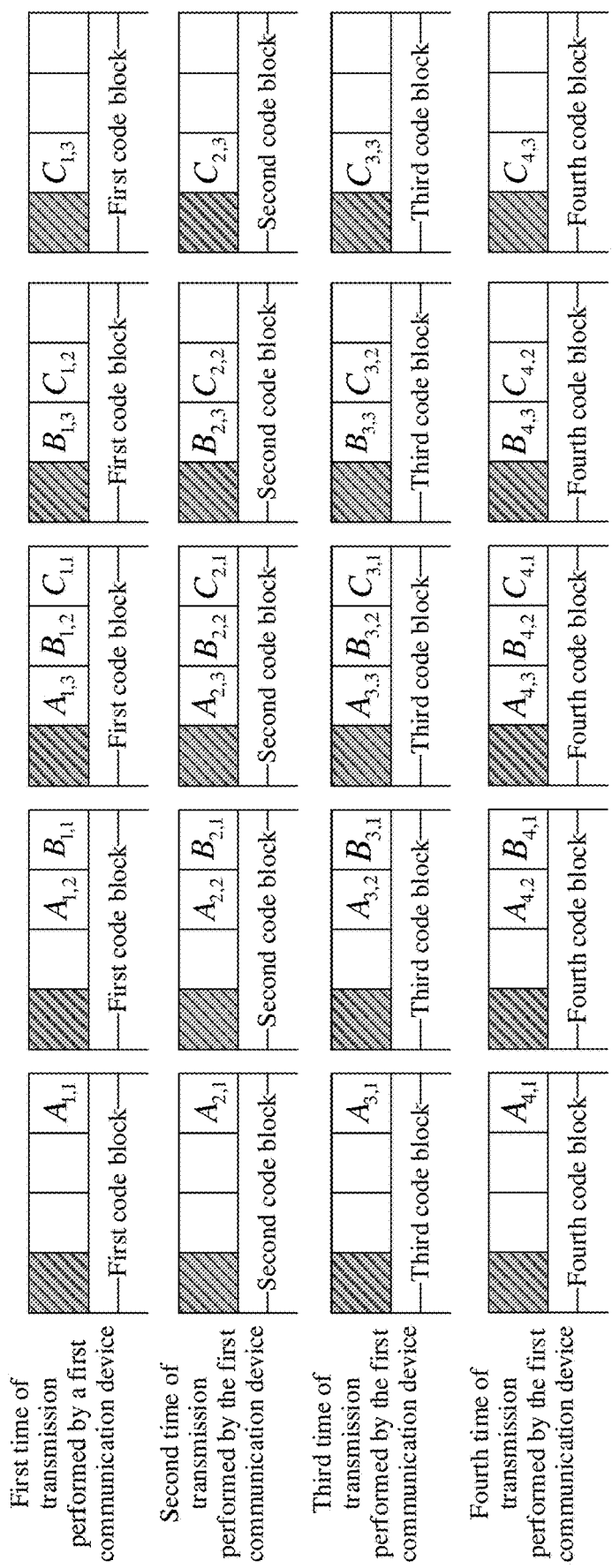
FIG. 14 is a schematic diagram of code blocks during four transmissions according to an embodiment of this application.

FIG. 14 is a schematic diagram of first code blocks transmitted by the first communication device for the first time, second code blocks transmitted for the second time, third coding blocks transmitted for the third time, and fourth coding blocks transmitted for the fourth time according to an embodiment of this application. Q=3, and M=5. Information bit subblocks in the first code blocks transmitted for the first time are arranged in a first order. For example, $A_{1,1}, A_{1,2}, A_{1,3}$ represents information bit subblocks in first code blocks carried in a first data stream, and the information bit subblocks are information bit subblocks obtained after processing $a_1, a_2, a_3$ in original information bit subblocks.

After the first code blocks transmitted for the first time are determined, the first communication device sends the M first code blocks to the second communication device for the first time.

Information bit subblocks in the second code blocks transmitted for the second time are arranged according to the first order. For example, $A_{2,1}, A_{2,2}, A_{2,3}$ represents information bit subblocks in second code blocks carried in a second data stream, and the information bit subblocks are information bit subblocks, different from $A_{1,1}, A_{1,2}, A_{1,3}$, obtained after processing $a_1, a_2, a_3$ in original information bit subblocks.

After the second code blocks transmitted for the second time are determined, the first communication device sends the M second code blocks to the second communication device for the second time.

Information bit subblocks in the third code blocks transmitted for the third time are arranged according to the first order. For example, $A_{3,1}, A_{3,2}, A_{3,3}$ represents information bit subblocks in third code blocks carried in a third data stream. The information bit subblocks are information bit subblocks, different from $A_{1,1}, A_{1,2}, A_{1,3}$ and $A_{2,1}, A_{2,2}, A_{2,3}$, obtained after processing $a_1, a_2, a_3$ in original information bit subblocks.

After the third code blocks transmitted for the third time are determined, the first communication device sends the M third code blocks to the second communication device for the third time.

Information bit subblocks in the fourth code blocks transmitted for the fourth time are arranged according to the first order. For example, $A_{4,1}, A_{4,2}, A_{4,3}$ represents information bit subblocks in fourth code blocks carried in a fourth data stream. The information bit subblocks are information bit subblocks, different from $A_{1,1}, A_{1,2}, A_{1,3}, A_{2,1}, A_{2,2}, A_{2,3}$ and $A_{3,1}, A_{3,2}, A_{3,3}$, obtained after processing $a_1, a_2, a_3$ in original information bit subblocks.

After the fourth code blocks transmitted for the fourth time are determined, the first communication device sends the M fourth code blocks to the second communication device for the fourth time.

S1315: The second communication device combines and decodes the first code block to the fourth code block to obtain decoded data.

The second communication device may combine and decode the data received during the four times of transmission. Similar to the combined decoding after two times of transmission and three times of transmission, the combined decoding after four times of transmission is also an interactive procedure.

For example, if a sum of channel capacities of four times of transmission performed by the first communication device is greater than or equal to a code rate R, the second communication device obtains, through decoding, $k_1$ information bit subblocks $[A_{1,1}, A_{1,2}, \ldots, A_{1,k_1}]$ included in one processed information bit block, where $k_1$ meets $1 \leq k_1 \leq Q$;

the second communication device may obtain $[\overline{A}_{1,1}, A_{1,2}, \ldots, \overline{A}_{1,k_1}]$ based on $[A_{1,1}, A_{1,2}, \ldots, A_{1,k_1}]$;

the second communication device obtains, through decoding, $k_2$ information bit subblocks $[A_{2,1}, A_{2,2}, \ldots, A_{2,k_2}]$ included in the processed information bit block, and $k_1$ and $k_2$ meet $1 \leq k_2 \leq Q$ and $k_1 + k_2 < Q$;

the second communication device may obtain $[\overline{A}_{2,1}, A_{2,2}, \ldots, \overline{A}_{2,k_2}]$ based on $[A_{2,1}, A_{2,2}, \ldots, A_{2,k_2}]$;

the second communication device obtains, through decoding, $k_3$ information bit subblocks $[A_{3,1}, A_{3,2}, \ldots, A_{3,k_3}]$ included in the processed information bit block, $k_3$ meets $1 \leq k_3 \leq Q$, and $k_1, k_2,$ and $k_3$ meet $k_1 + k_2 + k_3 < Q$;

the second communication device may obtain $[\overline{A}_{3,1}, A_{3,2}, \ldots, \overline{A}_{3,k_3}]$ based on $[A_{3,1}, A_{3,2}, \ldots, A_{3,k_3}]$;

the second communication device obtains, through decoding, $k_4$ information bit subblocks $[A_{4,1}, A_{4,2}, \ldots, A_{4,k_4}]$ included in the processed information bit block, $k_4$ meets $1 \leq k_4 \leq Q$, and $k_1, k_2, k_3,$ and $k_4$ meet $k_1 + k_2 + k_3 + k_4 \geq Q$;

the second communication device may obtain $[\overline{A}_{4,1}, A_{4,2}, \ldots, \overline{A}_{4,k_4}]$ based on $[A_{4,1}, A_{4,2}, \ldots, A_{4,k_4}]$; and the second communication device may obtain $[\overline{a}_1, \overline{a}_2, \ldots, \overline{a}_Q]$ based on $[\overline{A}_{1,1}, \overline{A}_{1,2}, \ldots, \overline{A}_{1,k_1}], [\overline{A}_{2,1}, A_{2,2}, \ldots, \overline{A}_{2,k_2}], [\overline{A}_{3,1}, \overline{A}_{3,2}, \ldots, \overline{A}_{3,k_3}],$ and $[\overline{A}_{4,1}, A_{4,2}, \ldots, \overline{A}_{4,k_4}]$, and a property of the UDM.

The second communication device then performs reverse mapping on $[\overline{a}_1, \overline{a}_2, \ldots, \overline{a}_Q]$ to obtain Q information bit subblocks $[a_1, a_2, \ldots, a_Q]$ included in the information bit block.

For example, it is assumed that a channel capacity of the first time of transmission performed by the first communication device is greater than or equal to R/4, a channel capacity of the second time of transmission is greater than or equal to R/4, a channel capacity of the third time of transmission is greater than or equal to R/4, and a channel capacity of the fourth time of transmission is greater than or equal to R/4 In this case, a sum of channel capacities of the four times of transmission performed by the first communication device is greater than or equal to the code rate R, that is, correct decoding can be implemented during the four times of transmission.

An embodiment of this application provides a data processing method. The method is implemented by interaction between a first communication device and a second communication device. When the first communication device initially transmits the M first code blocks to the second communication device, a plurality of information bit subblocks in the M first code blocks are arranged according to the first order. This helps the second communication device correctly perform decoding. If the second communication device still fails in decoding after the second time of transmission and the third time of transmission, the first communication device may retransmit the M $n^{th}$ code blocks to the second communication device. An arrangement manner of a plurality of information bit subblocks in the $n^{th}$ code blocks is associated with an arrangement manner of a plurality of information bit subblocks in the first code blocks. The foregoing arrangement manner of the plurality of information bit subblocks helps the second communication device correctly perform decoding based on the first code block to the $n^{th}$ code block. The first communication device can implement transmission close to a channel capacity provided that the device meets a condition that a sum of channel capacities of a plurality of times of transmission is greater than or equal to an information transmission rate.

The following describes in detail an apparatus and a device in embodiments of this application with reference to FIG. 15 to FIG. 18.

Figure 15:
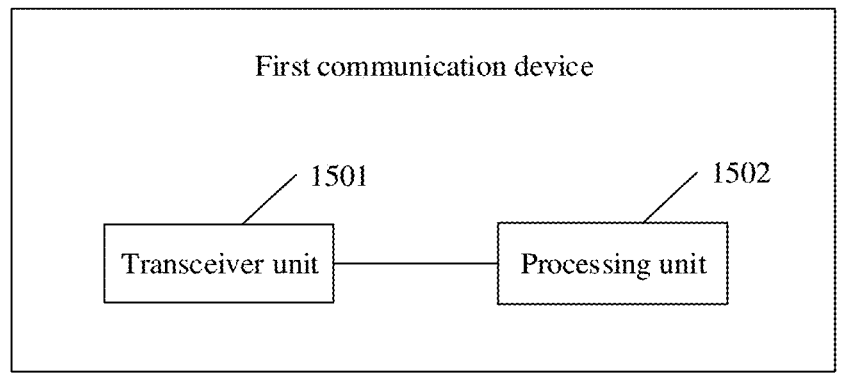
FIG. 15 is a schematic diagram of a structure of a communication device according to an embodiment of this application.

An embodiment of this application provides a communication device. As shown in FIG. 15, the communication device is configured to implement the method performed by the first communication device in the foregoing method embodiment, and specifically includes:

a transceiver unit 1501, configured to obtain X information bit blocks, where one information bit block includes K information bits, one information bit block is divided into Q information bit subblocks, and one information bit subblock is a binary sequence whose length is K/Q; and a processing unit 1502, configured to place Q information bit subblocks of each information bit block into Q first to-be-encoded blocks in M first to-be-encoded blocks according to a first order, where the first order is that a $q^{th}$ information bit subblock of each information bit block is located at $((q-1)*K/Q+1)^{th}$ to $(q*K/Q)^{th}$ reliable positions of the first to-be-encoded blocks, q meets 1≤q≤Q, and M meets M=X+Q-1, where the processing unit 1502 is further configured to separately perform polar code encoding on the M first to-be-encoded blocks to obtain M first code blocks;

the transceiver unit 1501 is further configured to send the M first code blocks to a second communication device;

when retransmission is required, the processing unit 1502 is further configured to place the Q information bit subblocks of each information bit block into Q second to-be-encoded blocks in M second to-be-encoded blocks according to a second order, where the second order and the first order meet a mapping relationship;

the processing unit 1502 is further configured to separately perform polar code encoding on the M second to-be-encoded blocks to obtain M second code blocks; and the transceiver unit 1501 is further configured to send the M second code blocks to the second communication device.

In a possible design, the second order is that the $q^{th}$ information bit subblock of each information bit block is located at $((Q-q)*K/Q+1)^{th}$ to $((Q-q+1)*K/Q)^{th}$ reliable positions of the second to-be-encoded blocks.

In an implementation, the first order and the second order meet the following mapping relationship:

$$[A_1, A_2, \ldots, A_{2^P}] = [0, 0, \ldots, 0, a_1, a_2, \ldots, a_Q]F^{\otimes(J+P)},$$
where $a_q$ is any information bit subblock in Q information bit subblocks of any information bit block, $A_t$ is an information bit subblock corresponding to any mapped information bit subblock, F is a generator matrix of a polar code, J is a positive integer and meets $K/Q=2^J$, P is a positive integer and meets $2^{P-1} \leq Q \leq 2^P$, and t meets $1 \leq t \leq 2^P$.

In an implementation, when retransmission is required, the processing unit 1502 is further configured to place the Q information bit subblocks of each information bit block into Q third to-be-encoded blocks in M third to-be-encoded blocks according to a second order, where the second order used in the third to-be-encoded blocks is different from the second order used in the second to-be-encoded blocks.

The processing unit 1502 is further configured to separately perform polar code encoding on the M third to-be-encoded blocks to obtain M third code blocks.

The transceiver unit 1501 is further configured to send the M third code blocks to the second communication device.

In an implementation, when retransmission is required, the processing unit 1502 is further configured to map the Q information bit subblocks of each information bit block from a binary field to a $2^w$ number system field to obtain any mapped information bit block $[\bar{a}_1, \bar{a}_2, \ldots, \bar{a}_Q]$, where $a_q$ is any information bit subblock in the any mapped information bit block, $\bar{a}_q$ is a sequence whose length is K/wQ, and w is a positive integer greater than 1.

The processing unit 1502 is further configured to convert Q information bit subblocks of each mapped information bit block, where Q information bit subblocks of the any mapped information bit block and the converted corresponding Q information bit subblocks meet the following relationship:

$$[\bar{A}_{n,1}, \bar{A}_{n,2}, \ldots, \bar{A}_{n,Q}] = [\bar{a}_1, \bar{a}_2, \ldots, \bar{a}_Q]*H_n, \text{ where}$$

$\bar{A}^{n,q}$ is a corresponding information bit subblock after $\bar{a}_q$ converted, $H_n$ is a universal decoding matrix UDM of K/w×K/w in the $2^w$ number system field, n indicates an $n^{th}$ time of transmission, n meets $n \in [1, 2, \ldots, N]$, N is a total quantity of times of transmission performed by the first communication device, and N is a positive integer greater than 3.

The processing unit 1502 is further configured to perform reverse mapping on $[\bar{A}_{n,1}, \bar{A}_{n,2}, \ldots, \bar{A}_{n,Q}]$ to obtain a corresponding information bit block $[A_{n,1}, A_{n,2}, \ldots, A_{n,Q}]$ after $[\bar{A}_{n,1}, \bar{A}_{n,2}, \ldots, \bar{A}_{n,Q}]$ is reversely mapped, where $A_{n,Q}$ is a binary sequence whose length is K/Q.

The processing unit 1502 is further configured to place Q information bit subblocks of any reversely-mapped information bit block into M $n^{th}$ to-be-encoded blocks according to the first order.

The processing unit 1502 is further configured to separately perform polar code encoding on the M $n^{th}$ to-be-encoded blocks to obtain M $n^{th}$ code blocks.

The transceiver unit 1501 is further configured to send the M $n^{th}$ code blocks to the second communication device.

In an implementation, any one of code blocks carries at least one information bit subblock and at most Q information bit subblocks, and the code blocks includes the first code block to the $n^{th}$ code block.

In an implementation, the code blocks are sequentially arranged based on identifiers of the code blocks, and a first code block carries one information bit subblock; quantities of information bit blocks carried in a first code block to a $Q^{th}$ code block successively increase by one based on an arrangement order of the code blocks, and the $Q^{th}$ code block carries Q information bit subblocks; quantities of information bit subblocks carried in a $(Q+1)^{th}$ code block to an $M^{th}$ code block successively decrease by one based on the arrangement order of the code blocks; and the $M^{th}$ code block carries one information bit subblock.

In an implementation, Q is a quantization order of a code rate R, and Q is a positive integer; a code rate of an $i^{th}$ code block is $r_i=i \times R/Q$, where i meets $1 \leq i \leq Q$; and a code rate of a $j^{th}$ code block is $r_j=(M-j+1) \times R/Q$, where j meets $Q+1 \leq j \leq M$.

Figure 16:
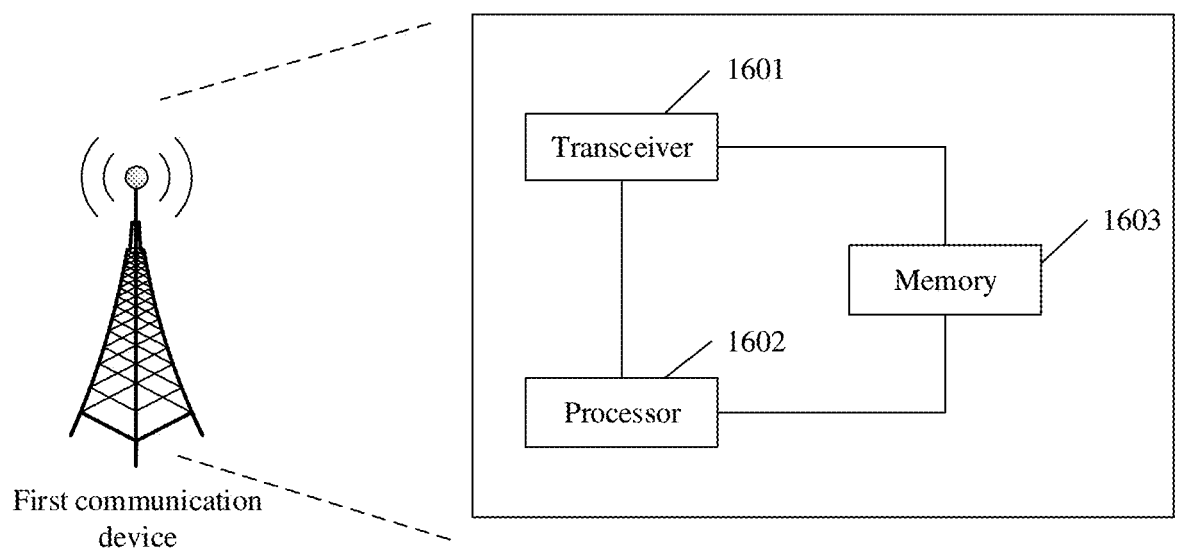
FIG. 16 is a schematic diagram of a structure of another communication device according to an embodiment of this application.

In an implementation, related functions implemented by the units in FIG. 15 may be implemented by using a transceiver and a processor. FIG. 16 is a schematic diagram of a structure of a communication device 1600 according to an embodiment of this application. The communication device 1600 may be a device (for example, a chip) that has a data processing function described in embodiments of this application. The communication device 1600 may include a transceiver 1601, at least one processor 1602, and a memory 1603. The transceiver 1601, the processor 1602, and the memory 1603 may be connected to each other through one or more communication buses, or may be connected to each other in another manner.

The transceiver 1601 may be configured to send data or receive data. It may be understood that the transceiver 1601 is a general term, and may include a receiver and a transmitter. For example, the receiver is configured to obtain an information bit block. For another example, the transmitter is configured to send a first code block.

The processor 1602 may be configured to process data of the communication device, or process information to be sent by the transceiver 1601. For example, the processor 1602 may invoke program code stored in the memory 1603, to sort information bit subblocks in a first to-be-encoded block. The processor 1602 may include one or more processors. For example, the processor 1602 may be one or more central processing units (CPU), one or more network processors (NP), one or more hardware chips, or any combination thereof. When the processor 1602 is one CPU, the CPU may be a single-core CPU or may be a multi-core CPU.

The memory 1603 is configured to store the program code and the like. The memory 1603 may include a volatile memory, such as a random access memory (RAM). The memory 1603 may also include a non-volatile memory (non-volatile memory), such as a read-only memory (ROM), a flash memory, a hard disk drive (HDD), or a solid-state drive (SSD). The memory 1603 may further include a combination of the foregoing types of memories.

The processor 1602 and the memory 1603 may be coupled through an interface, or may be integrated together. This is not limited in this embodiment.

The transceiver 1601 and the processor 1602 may be configured to implement the data processing method in embodiments of this application. Specific implementations are as follows:

a transceiver 1601, configured to obtain X information bit blocks, where one information bit block includes K information bits, one information bit block is divided into Q information bit subblocks, and one information bit subblock is a binary sequence whose length is K/Q; and a processor 1602, configured to place Q information bit subblocks of each information bit block into Q first to-be-encoded blocks in M first to-be-encoded blocks according to a first order, where the first order is that a $q^{th}$ information bit subblock of each information bit block is located at $((q-1)*K/Q+1)^{th}$ to $(q*K/Q)^{th}$ reliable positions of the first to-be-encoded blocks, q meets $1 \leq q \leq Q$, and M meets $M=X+Q-1$, where the processor 1602 is further configured to separately perform polar code encoding on the M first to-be-encoded blocks to obtain M first code blocks;

the transceiver 1601 is further configured to send the M first code blocks to a second communication device;

when retransmission is required, the processor 1602 is further configured to place the Q information bit subblocks of each information bit block into Q second to-be-encoded blocks in M second to-be-encoded blocks according to a second order, where the second order and the first order meet a mapping relationship;

the processor 1602 is further configured to separately perform polar code encoding on the M second to-be-encoded blocks to obtain M second code blocks; and the transceiver 1601 is further configured to send the M second code blocks to the second communication device.

In a possible design, the second order is that the $q^{th}$ information bit subblock of each information bit block is located at $((Q-q)*K/Q+1)^{th}$ to $((Q-q+1)*K/Q)^{th}$ reliable positions of the second to-be-encoded blocks.

In an implementation, the first order and the second order meet the following mapping relationship:

$$[A_1, A_2, \ldots, A_{2^P}] = [0, 0, \ldots, 0, a_1, a_2, \ldots, a_Q] F^{\otimes (J+P)},$$

where $a_q$ is any information bit subblock in Q information bit subblocks of any information bit block, $A_t$ is an information bit subblock corresponding to any mapped information bit subblock, F is a generator matrix of a polar code, J is a positive integer and meets $K/Q=2^J$, P is a positive integer and meets $2^{P-1} \leq Q \leq 2^P$, and t meets $1 \leq t \leq 2^P$.

In an implementation, the processor 1602 is further configured to:

when retransmission is required, place the Q information bit subblocks of each information bit block into Q third to-be-encoded blocks in M third to-be-encoded blocks according to a second order, where the second order used in the third to-be-encoded blocks is different from the second order used in the second to-be-encoded blocks, and separately perform polar code encoding on the M third to-be-encoded blocks to obtain M third code blocks.

The transceiver 1601 is further configured to send the M third code blocks to the second communication device.

In an implementation, the processor 1602 is further configured to:

when retransmission is required, map the Q information bit subblocks of each information bit block from a binary field to a $2^w$ number system field, and obtaining any mapped information bit block $[\bar{a}_1, \bar{a}_2, \ldots, \bar{a}_Q]$, where $\bar{a}_q$ is any information bit subblock in the any mapped information bit block, $\bar{a}_q$ is a sequence whose length is K/wQ, and w is a positive integer greater than 1;

convert Q information bit subblocks of each mapped information bit block, where Q information bit subblocks of the any mapped information bit block and the converted corresponding Q information bit subblocks meet the following relationship:

$$[\bar{A}_{n,1}, \bar{A}_{n,2}, \ldots, \bar{A}_{n,Q}] = [\bar{a}_1, \bar{a}_2, \ldots, \bar{a}_Q] * H_n, \text{ where}$$

$\bar{A}_{n,q}$ is a corresponding information bit subblock after $\bar{a}_q$ is converted, $H_n$ is a universal decoding matrix UDM of K/w×K/w in the $2^w$ number system field, n indicates an $n^{th}$ time of transmission, n meets $n \in [1, 2, \ldots, N]$, N is a total quantity of transmission performed by the first communication device, and N is a positive integer greater than 3;

perform reverse mapping on $[\bar{A}_{n,1}, \bar{A}_{n,2}, \ldots, \bar{A}_{n,Q}]$ to obtain a corresponding information bit block $[A_{n,1}, A_{n,2}, \ldots, A_{n,Q}]$ after $[\bar{A}_{n,1}, \bar{A}_{n,2}, \ldots, \bar{A}_{n,Q}]$ is reversely mapped, where $A_{n,q}$ is a binary sequence whose length is K/Q;

place Q information bit subblocks of any reversely-mapped information bit block into M $n^{th}$ to-be-encoded blocks according to the first order, and separately perform polar code encoding on the M $n^{th}$ to-be-encoded blocks to obtain M $n^{th}$ code blocks.

The transceiver 1601 is further configured to send the M $n^{th}$ code blocks to the second communication device.

In an implementation, any one of code blocks carries at least one information bit subblock and at most Q information bit subblocks, and the code blocks includes the first code block and the second code block.

In an implementation, the code blocks are sequentially arranged based on identifiers of the code blocks, and a first code block carries one information bit subblock, quantities of information bit blocks carried in a first code block to a $Q^{th}$ code block successively increase by one based on an arrangement order of the code blocks, and the $Q^{th}$ code block carries Q information bit subblocks. Quantities of information bit subblocks carried in a $(Q+1)^{th}$ code block to an $M^{th}$ code block successively decrease by one based on the arrangement order of the code blocks, and the $M^{th}$ code block carries one information bit subblock.

In an implementation, Q is a quantization order of a code rate R, and Q is a positive integer. A code rate of an $i^{th}$ code block is $r_i = i \times R/Q$, where meets $1 \leq i \leq Q$. A code rate of a $j^{th}$ code block is $r_j = (M-j+1) \times R/Q$, where j meets $Q+1 \leq j \leq M$.

Figure 17:
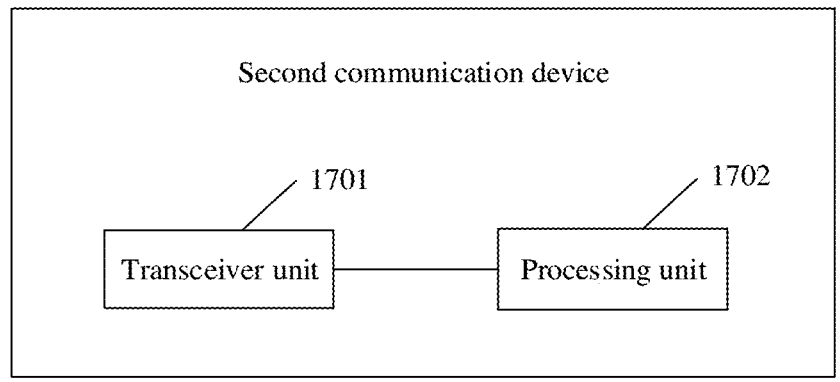
FIG. 17 is a schematic diagram of a structure of another communication device according to an embodiment of this application.

An embodiment of this application provides a communication device. As shown in FIG. 17, the communication device is configured to perform the method performed by the second communication device in the foregoing method embodiment, and specifically includes:

a transceiver unit 1701, configured to receive M first code blocks initially transmitted by a first communication device, where the M first code blocks are obtained through polar code encoding on M first to-be-encoded blocks, the M first to-be-encoded blocks carry X information bit blocks, each information bit block is divided into Q information bit subblocks, the Q information bit subblocks of each information bit block are placed into Q first to-be-encoded blocks in the M first to-be-encoded blocks according to a first order, the first order is that a $q^{th}$ information bit subblock of each information bit block is located at $((q-1)*K/Q+1)^{th}$ to $(q*K/Q)^{th}$ reliable positions of the first to-be-encoded blocks, q meets $1 \leq q \leq Q$, and M meets $M = X+Q-1$, where the transceiver unit 1701 is further configured to receive M second code blocks retransmitted by the first communication device, where the M second code blocks are obtained through polar code encoding on M second to-be-encoded blocks, the Q information bit subblocks of each information bit block are placed into Q second to-be-encoded blocks in the M second to-be-encoded blocks according to a second order, and the second order and the first order meet a mapping relationship; and a processing unit 1702, configured to combine and decode the M first code blocks and the M second code blocks to obtain decoded data.

In a possible design, the second order is that the $q^{th}$ information bit subblock of each information bit block is located at $((Q-q)*K/Q+1)^{th}$ to $((Q-q+1)*K/Q)^{th}$ reliable positions of the second to-be-encoded blocks.

In an implementation, the first order and the second order meet the following mapping relationship:

$$[A_1, A_2, \ldots, A_{2^P}] = [0, 0, \ldots, 0, a_1, a_2, \ldots, a_Q] F^{\otimes (J+P)},$$
where $a_q$ is any information bit subblock in Q information bit subblocks of any information bit block, $A_t$ is an information bit subblock corresponding to any mapped information bit subblock, F is a generator matrix of a polar code, J is a positive integer and meets $K/Q = 2^J$, P is a positive integer and meets $2^{P-1} \leq Q_2^P$, and t meets $1 \leq t \leq 2^P$.

In an implementation, when the processing unit 1702 is configured to combine and decode the M first code blocks and the M second code blocks to obtain the decoded data, the processing unit 1702 is specifically configured to:

if a sum of channel capacities of two times of transmission performed by the first communication device is greater than or equal to a code rate R, obtain, through decoding, $k_1$ information bit subblocks $[a_1, a_2, \ldots, a_{k_1}]$ included in one information bit block carried in the first to-be-encoded block, where $k_1$ meets $1 \leq k_1 \leq Q$;

obtain, through decoding, $k_2$ information bit subblocks $[a_Q, a_{Q-1}, \ldots, a_{Q-k_2+1}]$ included in information bit block carried in the second to-be-encoded block, where $k_2$ meets $1 \leq k_2 \leq Q$ and $k_1 + k_2 \leq Q$; and obtain Q information bit subblocks $[a_1, a_2, \ldots, a_Q]$ included in the information bit block.

In an implementation, the transceiver unit 1701 is further configured to receive M third code blocks retransmitted by the first communication device, where the M third code blocks are obtained through polar code encoding on M third to-be-encoded blocks. The Q information bit subblocks of each information bit block are placed into Q third to-be-encoded blocks in the M third to-be-encoded blocks according to a second order. The second order used in the third to-be-encoded blocks is different from the second order used in the second to-be-encoded blocks.

In an implementation, if a sum of channel capacities of two times of transmission performed by the first communication device is less than the code rate R, and a sum of channel capacities of three times of transmission performed by the first communication device is greater than or equal to the code rate R, the processing unit 1702 is further configured to obtain, through decoding, $k_1$ information bit subblocks [$a_1, a_2, \ldots, a_{k_1}$] included in one information bit block carried in the first to-be-encoded block and $k_2$ information bit subblocks [$a_Q, a_{Q-1}, \ldots, a_{Q-k_2+1}$] included in the information bit block carried in the second to-be-encoded block, where $k_1$ and $k_2$ meet $k_1+k_2<Q$;

the processing unit 1702 is further configured to obtain, through decoding, $k_3$ information bit subblocks [$A_1, A_2, \ldots, A_{k_3}$] included in information bit block carried in the third to-be-encoded block, where $k_3$ meets $1 \le k_3 \le Q$, and $k_1, k_2,$ and $k_3$ meet $k_1+k_2+k_3 \ge Q$;

the processing unit 1702 is further configured to obtain, according to the mapping relationship between the first order and the second order, $k_3$ information bit subblocks [$a_{k_1+1}, a_{k_1+1}, \ldots, a_{Q-k_2}$] corresponding to the $k_3$ information bit subblocks before mapping; and the processing unit 1702 is further configured to obtain Q information bit subblocks [$a_1, a_2, \ldots, a_Q$] included in the information bit block.

In an implementation, the transceiver unit 1701 is further configured to receive M $n^{th}$ code blocks retransmitted by the first communication device, where the M $n^{th}$ code blocks are obtained through polar code encoding on M $n^{th}$ to-be-encoded blocks. Q information bit subblocks of each processed information bit block are placed into Q $n^{th}$ to-be-encoded blocks in the M $n^{th}$ to-be-encoded blocks according to the first order.

The processing unit 1702 is further configured to combine and decode the M first code blocks and the M $n^{th}$ code blocks to obtain decoded data Processing on each information bit block meets the following condition:

The Q information bit subblocks of each information bit block are mapped from a binary field to a $2^w$ number system field, and any mapped information bit block meets [$\bar{a}_1, \bar{a}_2, \ldots \bar{a}_Q$]. $\bar{a}_q$ is any information bit subblock in the any mapped information bit block, $\bar{a}_q$ is a $2^w$ number system sequence whose length is K/wQ, and w is a positive integer greater than 1.

The any mapped information bit block and a converted corresponding information bit block meet the following relationship:

$$[\bar{A}_{n,1}, \bar{A}_{n,2}, \ldots, \bar{A}_{n,Q}] = [\bar{a}_1, \bar{a}_2, \ldots, \bar{a}_Q] * H_n, \text{ where}$$

$\bar{A}_{n,q}$ is a corresponding information bit subblock after $\bar{a}_q$ converted, $H_n$ is a universal decoding matrix UDM of K/w×K/w in the $2^w$ number system field, and n indicates an $n^{th}$ times of transmission. n meets $n \in [1, 2, \ldots, N]$, N is a total quantity of times of transmission performed by the first communication device, and N is a positive integer greater than 3.

A corresponding information bit block after [$\bar{A}_{n,1}, \bar{A}_{n,2}, \ldots, \bar{A}_{n,Q}$] is reversely mapped meets [$A_{n,1}, A_{n,2}, \ldots, A_{n,Q}$], where $A_{n,Q}$ is a binary sequence whose length is K/Q.

In an implementation, any one of code blocks carries at least one information bit subblock and at most Q information bit subblocks, and the code blocks includes the first code block and the second code block.

In an implementation, the code blocks are sequentially arranged based on identifiers of the code blocks, and a first code block carries one information bit subblock; quantities of information bit blocks carried in a first code block to a $Q^{th}$ code block successively increase by one based on an arrangement order of the code blocks, and the $Q^{th}$ code block carries Q information bit subblocks; quantities of information bit subblocks carried in a $(Q+1)^{th}$ code block to an $M^{th}$ code block successively decrease by one based on the arrangement order of the code blocks; and the $M^{th}$ code block carries one information bit subblock.

In an implementation, Q is a quantization order of a code rate R, and Q is a positive integer. A code rate of an $i^{th}$ code block is $r_i = i \times R/Q$, where meets $1 \le i \le Q$. A code rate of a $j^{th}$ code block is $r_j = (M-j+1) \times R/Q$, where j meets $Q+1 \le j \le M$.

Figure 18:
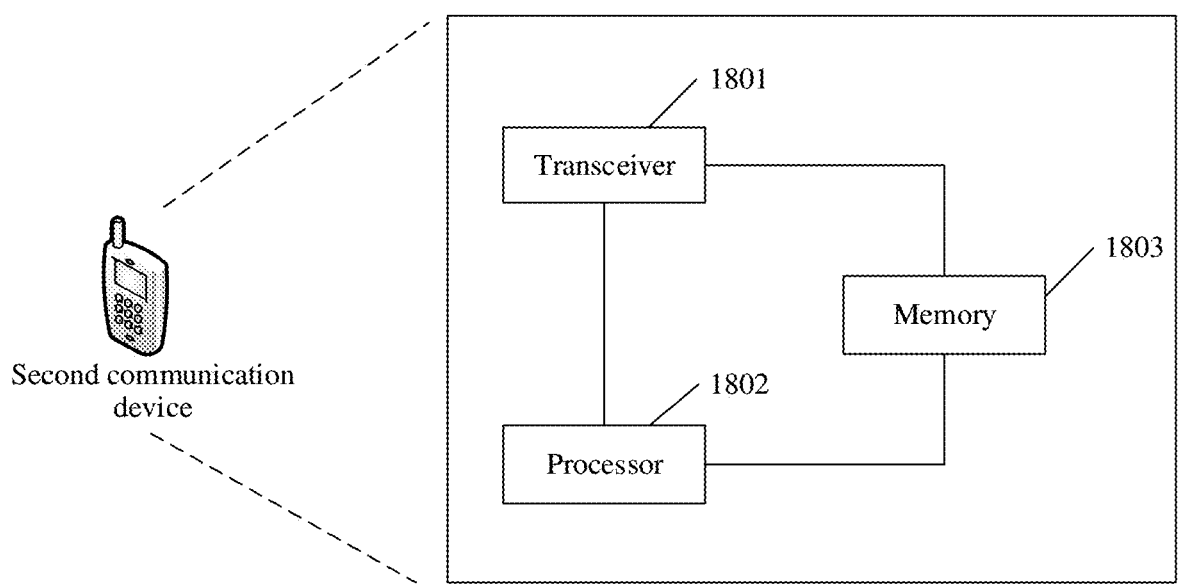
FIG. 18 is a schematic diagram of a structure of another communication device according to an embodiment of this application.

In an implementation, related functions implemented by the units in FIG. 17 may be implemented by using a transceiver and a processor. FIG. 18 is a schematic diagram of a structure of a communication device according to an embodiment of this application. The communication device may be a device (for example, a chip) that has a data processing function described in embodiments of this application. The communication device 1800 may include a transceiver 1801, at least one processor 1802, and a memory 1803. The transceiver 1801, the processor 1802, and the memory 1803 may be connected to each other through one or more communication buses, or may be connected to each other in another manner.

The transceiver 1801 may be configured to send data or receive data. It may be understood that the transceiver 1801 is a general term, and may include a receiver and a transmitter. For example, the receiver is configured to obtain an information bit block. For another example, the transmitter is configured to send a first code block.

The processor 1802 may be configured to process data of the communication device, or process data received by the transceiver 1801. For example, the processor 1802 may invoke program code stored in the memory 1803, to implement combined decoding on the received data. The processor 1802 may include one or more processors. For example, the processor 1802 may be one or more central processing units (CPU), one or more network processors (NP), one or more hardware chips, or any combination thereof. When the processor 1802 is one CPU, the CPU may be a single-core CPU or may be a multi-core CPU.

The memory 1803 is configured to store the program code and the like. The memory 1803 may include a volatile memory, such as a random access memory (RAM). The memory 1803 may also include a non-volatile memory, such as a read-only memory (ROM), a flash memory (flash memory), a hard disk drive (HDD), or a solid-state drive (SSD). The memory 1803 may further include a combination of the foregoing types of memories.

The processor 1802 and the memory 1803 may be coupled through an interface, or may be integrated together. This is not limited in this embodiment.

The transceiver 1801 and the processor 1802 may be configured to implement the data processing method in embodiments of this application. Specific implementations are as follows:

The transceiver 1801 is configured to receive M first code blocks initially transmitted by a first communication device, where the M first code blocks are obtained through polar code encoding on M first to-be-encoded blocks. The M first to-be-encoded blocks carry X information bit blocks, and each information bit block is divided into Q information bit subblocks. The Q information bit subblocks of each information bit block are placed into Q first to-be-encoded blocks in the M first to-be-encoded blocks according to a first order. The first order is that a $q^{th}$ information bit subblock of each information bit block is located at $((q-1)*K/Q+1)^{th}$ to $(q*K/Q)^{th}$ reliable positions of the first to-be-encoded blocks, q meets $1 \le q \le Q$, and M meets $M = X + Q - 1$.

The transceiver 1801 is configured to receive M second code blocks retransmitted by the first communication device, where the M second code blocks are obtained through polar code encoding on M second to-be-encoded blocks. The Q information bit subblocks of each information bit block are placed into Q second to-be-encoded blocks in the M second to-be-encoded blocks according to a second order, and the second order and the first order meet a mapping relationship.

The processor 1802 is configured to combine and decode the M first code blocks and the M second code blocks to obtain decoded data.

In an implementation, when the processor 1802 is configured to combine and decode the M first code blocks and the M second code blocks to obtain the decoded data, the processor 1802 is specifically configured to:

if a sum of channel capacities of two times of transmission performed by the first communication device is greater than or equal to a code rate R, obtain, through decoding, $k_1$ information bit subblocks $[a_1, a_2, \ldots, a_{k_1}]$ included in one information bit block carried in the first to-be-encoded block, where $k_1$ meets $1 \le k_1 \le Q$;

obtain, through decoding, $k_2$ information bit subblocks $[a_Q, a_{Q-1}, \ldots, a_{Q-k_2+1}]$ included in information bit block carried in the second to-be-encoded block, where $k_2$ meets $1 \le k_2 \le Q$ and $k_1 + k_2 \ge Q$; and obtain Q information bit subblocks $[a_1, a_2, \ldots, a_Q]$ included in the information bit block.

In an implementation, the transceiver 1801 is further configured to receive M third code blocks retransmitted by the first communication device, where the M third code blocks are obtained through polar code encoding on M third to-be-encoded blocks. The Q information bit subblocks of each information bit block are placed into Q third to-be-encoded blocks in the M third to-be-encoded blocks according to a second order. The second order used in the third to-be-encoded blocks is different from the second order used in the second to-be-encoded blocks.

If a sum of channel capacities of two times of transmission performed by the first communication device is less than the code rate R, and a sum of channel capacities of three times of transmission performed by the first communication device is greater than or equal to the code rate R, the processor 1802 is further configured to:

obtain, through decoding, $k_1$ information bit subblocks $[a_1, a_2, \ldots, a_{k_1}]$ included in one information bit block carried in the first to-be-encoded block and $k_2$ information bit subblocks $[a_Q, a_{Q-1}, \ldots, a_{Q-k_2+1}]$ included in the information bit block carried in the second to-be-encoded block, where $k_1$ and $k_2$ meet $k_1 + k_2 < Q$;

obtain, through decoding, $k_3$ information bit subblocks $[A_1, A_2, \ldots, A_{k_3}]$ included in information bit block carried in the third to-be-encoded block, where $k_3$ meets $1 \le k_3 \le Q$, and $k_1$, $k_2$, and $k_3$ meet $k_1 + k_2 + k_3 \ge Q$;

obtain, according to the mapping relationship between the first order and the second order, $k_3$ information bit subblocks $[a_{k_1+1}, a_{k_1+1}, \ldots, a_{Q-k_2}]$ corresponding to the $k_3$ information bit subblocks before mapping; and obtain Q information bit subblocks $[a_1, a_2, \ldots, a_Q]$ included in the information bit block.

In an implementation, the transceiver 1801 is further configured to receive M $n^{th}$ code blocks retransmitted by the first communication device, where the M $n^{th}$ code blocks are obtained through polar code encoding on M $n^{th}$ to-be-encoded blocks. Q information bit subblocks of each processed information bit block are placed into Q $n^{th}$ to-be-encoded blocks in the M $n^{th}$ to-be-encoded blocks according to the first order.

The processor 1802 is further configured to combine and decode the M first code blocks and the M $n^{th}$ code blocks to obtain decoded data.

Processing on each information bit block meets the following condition:

The Q information bit subblocks of each information bit block are mapped from a binary field to a $2^w$ number system field, and any mapped information bit block meets $[\bar{a}_1, \bar{a}_2, \ldots \bar{a}_Q]$. $\bar{a}_q$ is any information bit subblock in the any mapped information bit block, $\bar{a}_q$ is a $2^w$ number system sequence whose length is K/wQ, and w is a positive integer greater than 1.

The any mapped information bit block and a converted corresponding information bit block meet the following relationship:

$$[\bar{A}_{n,1}, \bar{A}_{n,2}, \ldots, \bar{A}_{n,Q}] = [\bar{a}_1, \bar{a}_2, \ldots, \bar{a}_Q] * H_n, \text{ where}$$

$\bar{A}_{n,q}$ is a corresponding information bit subblock after $\bar{a}_q$ is converted, $H_n$ is a universal decoding matrix UDM of $K/w \times K/w$ in the $2^w$ number system field, and n indicates an $n^{th}$ times of transmission. n meets $n \in [1, 2, \ldots, N]$, N is a total quantity of times of transmission performed by the first communication device, and N is a positive integer greater than 3.

A corresponding information bit block after $[\bar{A}_{n,1}, \bar{A}_{n,2}, \ldots, \bar{A}_{n,Q}]$ reversely mapped meets $[A_{n,1}, A_{n,2}, \ldots, A_{n,Q}]$, where $A_{n,Q}$ is a binary sequence whose length is K/Q.

In an implementation, any one of code blocks carries at least one information bit subblock and at most Q information bit subblocks, and the code blocks includes the first code block and the second code block.

In an implementation, the code blocks are sequentially arranged based on identifiers of the code blocks, and a first code block carries one information bit subblock; quantities of information bit blocks carried in a first code block to a $Q^{th}$ code block successively increase by one based on an arrangement order of the code blocks, and the $Q^{th}$ code block carries Q information bit subblocks; quantities of information bit subblocks carried in a $(Q+1)^{th}$ code block to an $M^{th}$ code block successively decrease by one based on the arrangement order of the code blocks; and the $M^{th}$ code block carries one information bit subblock.

In an implementation, Q is a quantization order of a code rate R, and Q is a positive integer. A code rate of an $i^{th}$ code block is $r_i = i \times R/Q$, where i meets $1 \le i \le Q$. A code rate of a $j^{th}$ code block is $r_j = (M-j+1) \times R/Q$, where j meets $Q+1 \le j \le M$.

An embodiment of this application provides a communication apparatus. The communication apparatus includes an input interface, an output interface, and a logic circuit. The input interface is configured to input to-be-processed data; the logic circuit processes the to-be-processed data according to the method in the foregoing method embodiment, to obtain processed data; and the output interface is configured to output the processed data.

In an implementation, the to-be-processed data input by the input interface includes the to-be-encoded blocks in the foregoing method embodiment and information bit subblocks in each to-be-encoded block. The to-be-encoded blocks include a first to-be-encoded block, a second to-be-encoded block, . . . , and an $n^{th}$ to-be-encoded block.

In an implementation, that the logic circuit processes the to-be-processed data according to the method in the foregoing method embodiment, to obtain processed data specifically includes:

The logic circuit soils information bit subblocks in the to-be-encoded block according to the method in the foregoing method embodiment, and encodes the to-be-encoded block to obtain a code block corresponding to each to-be-encoded block.

In an implementation, the processed data output by the output interface includes the code blocks in method embodiments, and the code blocks include a first code block, a second code block, . . . , and an $n^{th}$ code block.

In an implementation, the to-be-processed data input by the input interface includes the code blocks in the foregoing method embodiment, and the code blocks include a first code block, a second code block, . . . , and an $n^{th}$ code block.

In an implementation, that the logic circuit processes the to-be-processed data according to the method in the foregoing method embodiment, to obtain processed data specifically includes:

The logic circuit performs combined decoding on the code blocks according to the method in the foregoing method embodiment, to obtain a to-be-encoded block corresponding to each code block.

In an implementation, the to-be-processed data output by the output interface includes the to-be-encoded blocks in the foregoing method embodiment and information bit subblocks in each to-be-encoded block. The to-be-encoded blocks include a first to-be-encoded block, a second to-be-encoded block, . . . , and an $n^{th}$ to-be-encoded block.

An embodiment of this application provides a communication system. The communication system includes the first communication device and the second communication device described in embodiments.

An embodiment of this application provides a computer-readable storage medium. The computer-readable storage medium stores a program or instructions. When the program runs or the instructions run on a computer, the computer is enabled to perform the data processing method in embodiments of this application.

An embodiment of this application provides a chip or a chip system. The chip or the chip system includes at least one processor and an interface. The interface is interconnected to the at least one processor through a line. The at least one processor is configured to run a computer program or instructions, to perform the data processing method in the embodiments of this application.

The interface in the chip may be an input/output interface, a pin, a circuit, or the like.

The chip system in the foregoing aspects may be a system-on-a-chip (system on chip, SOC), a baseband chip, or the like. The baseband chip may include a processor, a channel encoder, a digital signal processor, a modem, an interface module, and the like.

In an implementation, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, applied to a first communication device, wherein the method comprises:
   obtaining X information bit blocks, wherein each information bit block comprises K information bits, each information bit block is divided into Q information bit subblocks, and each information bit subblock is a binary sequence whose length is K/Q;
   placing the Q information bit subblocks of each information bit block into Q first to-be-encoded blocks in M first to-be-encoded blocks according to a first order, wherein the first order is that each $q^{th}$ information bit subblock of each information bit block is located at $((q-1)*K/Q+1)^{th}$ to $(q*K/Q)^{th}$ reliable positions of the M first to-be-encoded blocks, q meets 1≤q≤Q, and M meets M=X+Q−1;
   separately performing polar code encoding on the M first to-be-encoded blocks to obtain M first code blocks;
   sending the M first code blocks to a second communication device;
   when retransmission is required after sending the M first code blocks, placing the Q information bit subblocks of each information bit block into Q second to-be-encoded blocks in M second to-be-encoded blocks according to a second order, wherein the second order and the first order meet a mapping relationship;

separately performing polar code encoding on the M second to-be-encoded blocks to obtain M second code blocks; and sending the M second code blocks to the second communication device.

2. The method according to claim 1, wherein the second order is that each $q^{th}$ information bit subblock of each information bit block is located at $((Q-q)*K/Q+1)^{th}$ to $((Q-q+1)*K/Q)^{th}$ reliable positions of the M second to-be-encoded blocks.

3. The method according to claim 1, wherein the first order and the second order meet the following mapping relationship:

$$[A_1, A_2, \ldots, A_{2^P}] = [0, 0, \ldots, 0, a_1, a_2, \ldots, a_Q] F^{\otimes(J+P)},$$

wherein each $a_q$ is an information bit subblock in Q information bit subblocks of an information bit block, each $A_t$ is an information bit subblock corresponding to a mapped information bit subblock, F is a generator matrix of a polar code, J is a positive integer and meets $K/Q=2^J$, P is a positive integer and meets $2^{P-1} \leq Q \leq 2^P$, and t meets $1 \leq t \leq 2^P$.

4. The method according to claim 1, further comprising:

when retransmission is required after sending the M second code blocks, placing the Q information bit subblocks of each information bit block into Q third to-be-encoded blocks in M third to-be-encoded blocks according to another second order, wherein the another second order used in the third to-be-encoded blocks is different from the second order used in the second to-be-encoded blocks;

separately performing polar code encoding on the M third to-be-encoded blocks to obtain M third code blocks; and sending the M third code blocks to the second communication device.

5. The method according to claim 4, further comprising:

when retransmission is required after sending the M second code blocks, mapping the Q information bit subblocks of each information bit block from a binary field to $2^w$ number system field to obtain the M mapped information bit blocks $[\bar{a}_1, \bar{a}_2, \ldots, \bar{a}_Q]$, wherein each $\bar{a}_q$ is a information bit subblock in the a mapped information bit block, each $\bar{a}_q$ is a sequence whose length is K/wQ, and w is a positive integer greater than 1;

converting Q information bit subblocks of each mapped information bit block, wherein Q information bit subblocks of the each mapped information bit block and the converted corresponding Q information bit subblocks meet the following relationship:

$$[\bar{A}_{n,1}, \bar{A}_{n,2}, \ldots, \bar{A}_{n,Q}] = [\bar{a}_1, \bar{a}_2, \ldots, \bar{a}_Q] * H_n, \text{ wherein}$$

each $\bar{A}_{n,q}$ is a corresponding information bit subblock after a corresponding $\bar{a}_q$ is converted, $H_n$ is a universal decoding matrix (UDM) of $K/w \times K/w$ in the $2^w$ number system field, and n indicates an $n^{th}$ times of transmission;

performing reverse mapping on $[\bar{A}_{n,1}, \bar{A}_{n,2}, \ldots, \bar{A}_{n,Q}]$ to obtain a corresponding information bit block $[A_{n,1}, A_{n,2}, \ldots, A_{n,Q}]$ after $[\bar{A}_{n,1}, \bar{A}_{n,2}, \ldots, \bar{A}_{n,Q}]$ is reversely mapped, wherein each $A_{n,Q}$ is a binary sequence whose length is K/Q;

placing Q information bit subblocks of each reversely-mapped information bit block into M $n^{th}$ to-be-encoded blocks according to the first order, wherein n meets $n \in [1, 2, \ldots, N]$, N is a total quantity of times of transmission performed by the first communication device, and N is a positive integer greater than 3;

separately performing polar code encoding on the M $n^{th}$ to-be-encoded blocks to obtain M $n^{th}$ code blocks; and sending the M $n^{th}$ code blocks to the second communication device.

6. The method according to claim 1, wherein each of the M first code blocks and the M second code blocks carries at least one information bit subblock and at most Q information bit subblocks.

7. The method according to claim 6, wherein the M first code blocks are sequentially arranged based on identifiers of the respective first code blocks, the M second code blocks are sequentially arranged based on identifiers of the respective second code blocks, a first position code block in the M first code blocks carries one information bit subblock, and a first position code block in the M second code blocks carries one information bit subblock;

wherein in the M first code blocks, quantities of information bit blocks carried in the first position code block to a $Q^{th}$ position code block in the M first code blocks successively increase by one based on an arrangement order of the M first code blocks, and the $Q^{th}$ position code block in the M first code blocks carries Q information bit subblocks;

wherein in the M second code blocks, quantities of information bit blocks carried in the first position code block to a $Q^{th}$ position code block in the M second code blocks successively increase by one based on an arrangement order of the M second code blocks, and the $Q^{th}$ position code block in the M second code blocks carries Q information bit subblocks;

wherein in the M first code blocks and the M second code blocks, quantities of information bit subblocks carried in a $(Q+1)^{th}$ code block to an $M^{th}$ code block successively decrease by one based on the arrangement order of the respective code blocks; and wherein in the M first code blocks and the M second code blocks, the $M^{th}$ code block carries one information bit subblock.

8. The method according to claim 7, wherein Q is a quantization order of a code rate R, and Q is a positive integer; a code rate of an $i^{th}$ code block is $r_i = i \times R/Q$, wherein i meets $1 \leq i \leq Q$; and a code rate of a $j^{th}$ code block is $r_j = (M-j+1) \times R/Q$, and wherein j meets $Q+1 \leq j \leq M$.

9. A method, applied to a second communication device, wherein the method comprises:

receiving M first code blocks initially transmitted by a first communication device, wherein the M first code blocks are obtained through polar code encoding on M first to-be-encoded blocks, the M first to-be-encoded blocks carry X information bit blocks, each information bit block is divided into Q information bit subblocks, the Q information bit subblocks of each information bit block are placed into Q first to-be-encoded blocks in the M first to-be-encoded blocks according to a first order, the first order is that each $q^{th}$ information bit subblock of each information bit block is located at $((q-1)*K/Q+1)^{th}$ to $(q*K/Q)^{th}$ reliable positions of the M first to-be-encoded blocks, q meets $1 \leq q \leq Q$, and M meets $M = X + Q - 1$;

receiving M second code blocks retransmitted by the first communication device, wherein the M second code blocks are obtained through polar code encoding on M second to-be-encoded blocks, the Q information bit subblocks of each information bit block are placed into Q second to-be-encoded blocks in the M second to-be-encoded blocks according to a second order, and the second order and the first order meet a mapping relationship; and combining and decoding the M first code blocks and the M second code blocks to obtain decoded data.

10. The method according to claim 9, wherein the second order is that each $q^{th}$ information bit subblock of each information bit block is located at $((Q-q)*K/Q+1)^{th}$ to $((Q-q+1)*K/Q)^{th}$ reliable positions of the M second to-be-encoded blocks.

11. The method according to claim 9, wherein the first order and the second order meet the following mapping relationship:

$$[A_1, A_2, \ldots, A_{2^P}] = [0, 0, \ldots, 0, a_1, a_2, \ldots, a_Q] F^{\otimes (J+P)},$$
wherein each $a_q$ is a information bit subblock in Q information bit subblocks of an information bit block, each $A_t$ is an information bit subblock corresponding to a mapped information bit subblock, F is a generator matrix of a polar code, J is a positive integer and meets $K/Q=2^J$, P is a positive integer and meets $2^{P-1} \le Q \le 2^P$, and t meets $1 \le t \le 2^P$.

12. The method according to claim 9, wherein combining and decoding the M first code blocks and the M second code blocks to obtain the decoded data comprises:

in response to a sum of channel capacities of two times of transmission performed by the first communication device being greater than or equal to a code rate R, obtaining, through decoding, $k_1$ information bit subblocks $[a_1, a_2, \ldots, a_{k_1}]$ comprised in each information bit block carried in the M first to-be-encoded blocks, wherein $k_1$ meets $1 \le k_1 \le Q$;

obtaining, through decoding, $k_2$ information bit subblocks $[a_Q, a_{Q-1}, \ldots a_{Q-k_2+1}]$ comprised in each information bit block carried in the M second to-be-encoded blocks, wherein $k_2$ meets $1 \le k_2 \le Q$ and $k_1 + k_2 \ge Q$; and obtaining Q information bit subblocks $[a_1, a_2, \ldots, a_Q]$ comprised in each information bit block.

13. The method according to claim 12, further comprising:

receiving M third code blocks retransmitted by the first communication device, wherein the M third code blocks are obtained through polar code encoding on M third to-be-encoded blocks, the Q information bit subblocks of each information bit block are placed into Q third to-be-encoded blocks in the M third to-be-encoded blocks according to a second order, and the second order used in the third to-be-encoded blocks is different from the second order used in the second to-be-encoded blocks;

in response to a sum of channel capacities of two times of transmission performed by the first communication device being less than the code rate R, and a sum of channel capacities of three times of transmission performed by the first communication device being greater than or equal to the code rate R, obtaining, through decoding, $k_1$ information bit subblocks $[a_1, a_2, \ldots, a_{k_1}]$ comprised in each information bit block carried in the M first to-be-encoded blocks and $k_2$ information bit subblocks $[a_Q, a_{Q-1}, \ldots, a_{Q-k_2+1}]$ comprised in each information bit block carried in the M second to-be-encoded blocks, wherein $k_1$ and $k_2$ meet $k_1 + k_2 < Q$;

obtaining, through decoding, $k_3$ information bit subblocks $[A_1, A_2, \ldots, A_{k_3}]$ comprised in information bit block carried in the M third to-be-encoded blocks, wherein $k_3$ meets $1 \le k_3 \le Q$, and $k_1$, $k_2$, and $k_3$ meet $k_1 + k_2 + k_3 \ge Q$;

obtaining, according to the mapping relationship between the first order and the second order, $k_3$ information bit subblocks $[a_{k_1+1}, a_{k_1+1}, \ldots, a_{Q-k_2}]$ corresponding to each $k_3$ information bit subblocks before mapping; and obtaining Q information bit subblocks $[a_1, a_2, \ldots, a_Q]$ comprised in each information bit block.

14. The method according to claim 9, wherein each of the M first code blocks and the M second code blocks carries at least one information bit subblock and at most Q information bit subblocks.

15. An apparatus, comprising:
one or more processors; and
a non-transitory memory storing a software program including instructions that, when executed by the one or more processors, cause the apparatus to:

obtain X information bit blocks, wherein each information bit block comprises K information bits, each information bit block is divided into Q information bit subblocks, and each information bit subblock is a binary sequence whose length is K/Q;

place the Q information bit subblocks of each information bit block into Q first to-be-encoded blocks in M first to-be-encoded blocks according to a first order, wherein the first order is that each $q^{th}$ information bit subblock of each information bit block is located at $((q-1)*K/Q+1)^{th}$ to $(q*K/Q)^{th}$ reliable positions of the M first to-be-encoded blocks, q meets $1 \le q \le Q$, and M meets $M = X + Q - 1$;

separately perform polar code encoding on the M first to-be-encoded blocks to obtain M first code blocks;

send the M first code blocks to a second communication device;

when retransmission is required, place the Q information bit subblocks of each information bit block into Q second to-be-encoded blocks in M second to-be-encoded blocks according to a second order, wherein the second order and the first order meet a mapping relationship;

separately perform polar code encoding on the M second to-be-encoded blocks to obtain M second code blocks; and send the M second code blocks to the second communication device.

16. The apparatus according to claim 15, wherein the second order is that each $q^{th}$ information bit subblock of each information bit block is located at $((Q-q)*K/Q+1)^{th}$ to $((Q-q+1)*K/Q)^{th}$ reliable positions of the M second to-be-encoded blocks.

17. The apparatus according to claim 15, wherein the first order and the second order meet the following mapping relationship:

$$[A_1, A_2, \ldots, A_{2^P}] = [0, 0, \ldots, 0, a_1, a_2, \ldots, a_Q] F^{\otimes (J+P)},$$
where each $a_q$ is an information bit subblock in Q information bit subblocks of any information bit block, each $A_t$ is an information bit subblock corresponding to any mapped information bit subblock, F is a generator matrix of a polar code, J is a positive integer and meets $K/Q = 2^J$, P is a positive integer and meets $2^{P-1} \le Q \le 2^P$, and t meets $1 \le t \le 2^P$.

18. The apparatus according to claim 15, wherein when the instructions are executed by the one or more processors, the instructions further cause the apparatus to:

when retransmission is required after sending the M second code blocks, place the Q information bit subblocks of each information bit block into Q third to-be-encoded blocks in M third to-be-encoded blocks according to a second order, wherein the second order used in the third to-be-encoded blocks is different from the second order used in the second to-be-encoded blocks;

separately perform polar code encoding on the M third to-be-encoded blocks to obtain M third code blocks; and send the M third code blocks to the second communication device.

19. The apparatus according to claim 15, wherein each of the M first code blocks and the M second code blocks carries at least one information bit subblock and at most Q information bit subblocks.

20. The apparatus according to claim 19, wherein the M first code blocks are sequentially arranged based on identifiers of the respective first code blocks, the M second code blocks are sequentially arranged based on identifiers of the respective second code blocks, a first position code block in the M first code blocks carries one information bit subblock, and a first position code block in the M second code blocks carries one information bit subblock;

wherein in the M first code blocks, quantities of information bit blocks carried in the first position code block to a $Q^{th}$ position code block in the M first code blocks successively increase by one based on an arrangement order of the M first code blocks, and the $Q^{th}$ position code block in the M first code blocks carries Q information bit subblocks;

wherein in the M second code blocks, quantities of information bit blocks carried in the first position code block to a $Q^{th}$ position code block in the M second code blocks successively increase by one based on an arrangement order of the M second code blocks, and the $Q^{th}$ position code block in the M second code blocks carries Q information bit subblocks;

wherein in the M first code blocks and the M second code blocks, quantities of information bit subblocks carried in a $(Q+1)^{th}$ code block to an $M^{th}$ code block successively decrease by one based on the arrangement order of the respective code blocks; and wherein in the M first code blocks and the M second code blocks, the $M^{th}$ code block carries one information bit subblock.

* * * * *

UNITED STATES PATENT AND TRADEMARK OFFICE
CERTIFICATE OF CORRECTION

PATENT NO. : 11,936,476 B2
APPLICATION NO. : 18/046255
DATED : March 19, 2024
INVENTOR(S) : Li et al.

It is certified that error appears in the above-identified patent and that said Letters Patent is hereby corrected as shown below:

In the Specification

Column 10, Lines 30-31; delete "$[\bar{a}_1, a_2, \ldots, \bar{a}_Q]$" and insert --$[\bar{a}_1,\bar{a}_2,\ldots,\bar{a}_Q]$--.

Column 10, Lines 47-48; delete "$[\bar{A}_{n,1}, A_{n,2}, \ldots, \bar{A}_{n,Q}]$" and insert --$[\bar{A}_{n,1},\bar{A}_{n,2},\ldots,\bar{A}_{n,Q}]$--.

Column 20, Line 43; delete

"$[A_1,A_2,\ldots,A_{2^P}]=[0,1,\ldots,0,a_1,a_2,\ldots,a_Q]F^{\otimes(J+P)}$," and insert --$\left[A_1,A_2,\ldots,A_{2^P}\right]=\left[0,0,\ldots,0,a_1,a_2,\ldots,a_Q\right]F^{\otimes(J+P)}$,--.

Column 21, Line 66; delete "pails" and insert --parts--.

Column 32, Lines 37-38; delete "$[\bar{A}_{1,1}, A_{1,2}, \ldots, \bar{A}_{1,k_1}]$," and insert --$\left[\bar{A}_{1,1},\bar{A}_{1,2},\ldots,\bar{A}_{1,k_1}\right]$--.

Column 32, Lines 43-44; delete "$[\bar{A}_{2,1}, A_{2,2}, \ldots, \bar{A}_{2,k_2}]$," and insert --$\left[\bar{A}_{2,1},\bar{A}_{2,2},\ldots,\bar{A}_{2,k_2}\right]$--.

Column 32, Lines 49-50; delete "$[\bar{A}_{3,1}, A_{3,2}, \ldots, \bar{A}_{3,k_3}]$," and insert Signed and Sealed this
Twenty-first Day of May, 2024

Katherine Kelly Vidal
*Director of the United States Patent and Trademark Office*

CERTIFICATE OF CORRECTION (continued)
U.S. Pat. No. 11,936,476 B2

Column 32, Lines 56-57; delete "$[\overline{A}_{4,1}, A_{4,2}, \ldots, \overline{A}_{4,k_4}]$," and insert --$[\overline{A}_{4,1}, \overline{A}_{4,2}, \ldots, \overline{A}_{4,k_4}]$--.

Column 32, Line 58-59; delete "[ā$_1$, a$_2$, . . . , ā$_Q$]" and insert --[$\bar{a}_1, \bar{a}_2, \ldots, \bar{a}_Q$]--.

Column 32, Lines 59-60; delete "[Ā$_{2,1}$, A$_{2,2}$, . . . ,Ā" and insert --$[\overline{A}_{2,1}, \overline{A}_{2,2}, \ldots, \overline{A}_{2,k_2}]$--.

Column 32, Line 60; delete "$\overline{A}_4 A_{4,2}, \ldots, \overline{A}_{4,k_4}]$" and insert --$[\overline{A}_{4,1}, \overline{A}_{4,2}, \ldots, \overline{A}_{4,k_4}]$--.

Column 39, Line 35; delete "[ā$_1$, a$_2$, . . . , ā$_Q$]" and" insert --[$\bar{a}_1, \bar{a}_2, \ldots, \bar{a}_Q$]--.

Column 39, Line 52; delete "[Ā$_{n,1}$, A$_{n,2}$, . . . , Ā$_{n,Q}$]'" and insert --[$\bar{A}_{n,1}, \bar{A}_{n,2}, \ldots, \bar{A}_{n,Q}$]--.

Column 42, Line 9; delete "[ā$_1$, a$_2$, . . . , ā$_Q$]" and insert --[$\bar{a}_1, \bar{a}_2, \ldots, \bar{a}_Q$]--.

Column 42, Line 66; delete "soils" and insert --sorts--.

In the Claims

Column 47, Claim 13, Line 60; delete "$[a_1, a_2, \ldots, a_{k_i}]$," and insert --$[a_1, a_2, \ldots, a_{k_1}]$--.

Column 48, Claim 17, Line 59; delete "any" and insert --an--.